US011922866B1

(12) United States Patent
Sohn et al.

(10) Patent No.: US 11,922,866 B1
(45) Date of Patent: Mar. 5, 2024

(54) PIXEL, DISPLAY DEVICE, AND DRIVING METHOD OF THE DISPLAY DEVICE

(71) Applicant: SAMSUNG DISPLAY CO., LTD., Yongin-si (KR)

(72) Inventors: Young Ha Sohn, Yongin-si (KR); Se Hyuk Park, Yongin-si (KR); Jin Wook Yang, Yongin-si (KR); Dong Gyu Lee, Yongin-si (KR); Jae Hyeon Jeon, Yongin-si (KR)

(73) Assignee: SAMSUNG DISPLAY CO., LTD., Gyeonggi-do (KR)

(*) Notice: Subject to any disclaimer, the term of this patent is extended or adjusted under 35 U.S.C. 154(b) by 0 days.

(21) Appl. No.: 18/133,593

(22) Filed: Apr. 12, 2023

(30) Foreign Application Priority Data

Sep. 20, 2022 (KR) ........................ 10-2022-0118788

(51) Int. Cl.
*G09G 3/32* (2016.01)

(52) U.S. Cl.
CPC ....... *G09G 3/32* (2013.01); *G09G 2300/0426* (2013.01); *G09G 2310/0267* (2013.01); *G09G 2310/0275* (2013.01); *G09G 2310/0278* (2013.01); *G09G 2320/0247* (2013.01); *G09G 2330/021* (2013.01)

(58) Field of Classification Search
CPC ......... G09G 3/3233; G09G 2300/0842; G09G 2300/0861
See application file for complete search history.

(56) References Cited

U.S. PATENT DOCUMENTS

| | | | | |
|---|---|---|---|---|
| 11,158,261 | B2 | 10/2021 | Kim et al. | |
| 11,185,772 | B2 | 11/2021 | Lee et al. | |
| 11,217,149 | B2 | 1/2022 | In et al. | |
| 11,295,673 | B2 | 4/2022 | Park et al. | |
| 11,417,283 | B2 | 8/2022 | Son et al. | |
| 2003/0197473 | A1 * | 10/2003 | Kitahara | G09G 3/3283 315/169.3 |
| 2006/0164359 | A1 * | 7/2006 | Kimura | G09G 3/2014 345/92 |
| 2020/0221554 | A1 * | 7/2020 | Chiang | H05B 45/44 |

(Continued)

FOREIGN PATENT DOCUMENTS

| | | | |
|---|---|---|---|
| KR | 1020210019639 | A | 2/2021 |
| KR | 1020210045805 | A | 4/2021 |

(Continued)

*Primary Examiner* — Van N Chow
(74) *Attorney, Agent, or Firm* — CANTOR COLBURN LLP

(57) ABSTRACT

A pixel includes: a first transistor including a gate electrode electrically connected to a first node, a second node to which a first power voltage for driving the light emitting element is applied, and a third node electrically connected to the light emitting element; a first emission control transistor having an on-off timing controlled by a first emission control signal; and a second emission control transistor having an on-off timing controlled by a second emission control signal. A time interval exists between a time at which the first emission control signal having a turn-on level is input such that a voltage of the second node is dropped from a bias voltage having a voltage level higher than a voltage level of the first power voltage and a time at which the second emission control signal having a turn-on level is input.

20 Claims, 35 Drawing Sheets

(56) References Cited

U.S. PATENT DOCUMENTS

| | | | | |
|---|---|---|---|---|
| 2020/0258451 | A1* | 8/2020 | Takahara | G09G 3/32 |
| 2021/0027719 | A1 | 1/2021 | Cho et al. | |

FOREIGN PATENT DOCUMENTS

| | | | |
|---|---|---|---|
| KR | 1020210054114 | A | 5/2021 |
| KR | 1020210106052 | A | 8/2021 |
| KR | 102438199 | B1 | 8/2022 |

* cited by examiner

FIG. 25

| | NOT VBIAS LEVEL SHIFT (@240Hz; REFERENCE) | NOT VBIAS LEVEL SHIFT (@30Hz) | VBIAS LEVEL SHIFT (@30Hz) |
|---|---|---|---|
| PLM | 100% | 115% | 110% |
| ALM | 100% | 109% | 112% |

FIG. 30

| | NOT VBIAS LEVEL SHIFT (@240Hz; REFERENCE) | NOT VBIAS LEVEL SHIFT WITHOUT EM GAP (@30Hz) | VBIAS LEVEL SHIFT WITHOUT EM GAP (@30Hz) | VBIAS LEVEL SHIFT WITH EM GAP (@30Hz) |
|---|---|---|---|---|
| PLM | 100% | 115% | 110% | Equal or less than 100% |
| ALM | 100% | 109% | 112% | 98% |

PIXEL, DISPLAY DEVICE, AND DRIVING METHOD OF THE DISPLAY DEVICE

The application claims priority to Korean patent application No. 10-2022-0118788, filed on Sep. 20, 2022, and all the benefits accruing therefrom under 35 U.S.C. § 119, the content of which in its entirety is herein incorporated by reference.

BACKGROUND

1. Technical Field

The present disclosure generally relates to a pixel, a display device, and a driving method of the display device.

2. Related Art

With the development of information technologies, the importance of a display device which is a connection medium between a user and information increases. Accordingly, a display device such as a liquid crystal display device and an organic light emitting display device is increasingly used.

The display device requires a function of high speed driving, which provides a user with an image having a frame frequency changed to a high frame frequency and a function of low speed driving, which provides the user with an image having a frame frequency changed to a low frame frequency, thereby reducing power consumption.

Accordingly, it is desirable to provide a display device capable of providing an image at various frame frequencies.

SUMMARY

Embodiments provide a pixel, a display device, and a driving method of the display device, which can display an image at various frame frequencies.

Embodiments also provide a pixel, a display device, and a driving method of the display device, which can reduce a flicker phenomenon when an image is displayed at various frame frequencies.

In accordance with an aspect of the present disclosure, there is provided a pixel including: a light emitting element; a first transistor including a gate electrode electrically connected to a first node, a second node to which a first power voltage for driving the light emitting element is applied, and a third node electrically connected to the light emitting element; a second transistor having an on-off timing controlled by a first scan signal, the second transistor being electrically connected to a data line to which a data voltage is applied, the second transistor being configured to transfer a voltage corresponding to the data voltage to the first node when the first scan signal having a turn-on level is applied; a first emission control transistor having an on-off timing controlled by a first emission control signal, the first emission control transistor being configured to switch an electrical connection between the second node of the first transistor and a first power line configured to supply the first power voltage; and a second emission control transistor having an on-off timing controlled by a second emission control signal, the second emission control transistor being configured to switch an electrical connection between the third node of the first transistor and the light emitting element, where a time interval exists between the time at which a first emission control signal having a turn-on level is input such that a voltage of the second node of the first transistor is dropped from a bias voltage having a voltage level higher than a voltage level of the first power voltage and a time at which the second emission control signal having a turn-on level is input.

The pixel may further include a third emission control transistor having an on-off timing controlled by a third emission control signal, the third emission control transistor being configured to apply the bias voltage to the second node of the first transistor.

In a period in which the first emission control signal having the turn-on level and the second emission control signal having the turn-on level are sequentially input, a current path may be formed in a direction from the second node of the first transistor to the first power line.

The pixel may further include a third transistor having an on-off timing controlled by a second scan signal, the third transistor being configured to switch an electrical connection between the first node and the third node of the first transistor. The time interval may be shorter than a length of a period in which the second scan signal having a turn-on level is applied.

The pixel may further include a fourth transistor having an on-off timing controlled by a third scan signal, the fourth transistor being configured to switch an electrical connection between a fourth power line to which a first initialization voltage is applied and the first node. The time interval may be shorter than a length of a period in which the third scan signal having a turn-on level is applied.

The pixel may further include a fifth transistor having an on-off timing controlled by a second scan signal, the fifth transistor being electrically connected to the second transistor at a fourth node, the fifth transistor being configured to switch an electrical connection between a third power line to which a reference voltage is applied and the fourth node of the second transistor. The time interval may be shorter than a length of a period in which a second scan signal having a turn-on level is applied.

The light emitting element may include a first electrode electrically connected to the second emission control transistor and a second electrode electrically connected to a second power line to which a second power voltage is applied. The pixel may further include an anode reset transistor having an on-off timing controlled by a third emission control signal, and the anode reset transistor may be configured to switch an electrical connection between a fifth power line to which a second initialization power voltage is supplied and the first electrode of the light emitting element. After the third emission control signal having a turn-on level is input to the anode reset transistor, the first emission control signal having the turn-on level and the second emission control signal having the turn-on level may be sequentially input.

In accordance with another aspect of the present disclosure, there is provided a display device including: a display panel in which a plurality of pixels, each including a light emitting element and a first transistor configured to drive the light emitting element, are disposed, a first power line configured to supply a first power voltage applied to the first transistor is disposed, a plurality of data lines electrically connected to the plurality of pixels are disposed, and a plurality of first scan lines electrically connected to the plurality of pixels are disposed; a data driving circuit configured to supply a data voltage to the plurality of data lines; a first scan driving circuit configured to output, to the plurality of first scan lines, a first scan signal for controlling a timing at which the data voltage is input to the plurality of pixels; a first emission driving circuit configured to output a first emission control signal for switching an electrical connection between the first power line and the first transistor to a plurality of first emission control lines disposed in the display panel; and a second emission driving circuit configured to output a second emission control signal for switching an electrical connection between the first transistor and the light emitting element to a plurality of second emission control lines disposed in the display panel, where a time interval exists between a time at which the first emission driving circuit outputs the first emission control signal having a turn-on level to a first emission control line electrically connected to any one pixel among the plurality of pixels, thereby inputting the first power voltage to the one pixel and a time at which the second emission driving circuit outputs the second emission control signal having a turn-on level to the second emission control line electrically connected to the one pixel.

The first emission driving circuit and the second emission driving circuit may output the first emission control signal having the turn-on level and the second emission control signal having the turn-on level, respectively and sequentially.

The first transistor may include a gate electrode electrically connected to a first node, a second node to which the first power voltage is applied, and a third node electrically connected to the light emitting element. The display device may further include a third emission driving circuit configured to output a third emission control signal to a plurality of third emission control lines disposed in the display panel. The third emission control signal may be a signal for switching an electrical connection between the second node of the first transistor and a power line to which a bias voltage is supplied.

After the third emission driving circuit outputs a third emission control signal having a turn-on level to a third emission control line electrically connected to any one pixel among the plurality of pixels, the first emission driving circuit may output a first emission control signal having a turn-on level to a first emission control signal electrically connected to the one pixel, and sequentially, the second emission driving circuit may output a second emission control signal having a turn-on level to a second emission control line electrically connected to the one pixel.

The time interval may be longer than a length of a period in which the third emission driving circuit outputs a third emission control signal having a turn-on level to any one third emission control line among the plurality of third emission control lines.

The display device may further include a power supply circuit configured to change the voltage level of the bias voltage into at least two voltage levels and output the changed voltage levels.

The display device may further include a timing controller configured to control operation timings of the first scan driving circuit and the power supply circuit.

The timing controller may include: an interface configured to receive input image data; a counter configured to calculate an input cycle of the input image data; and a signal output configured to output a power supply circuit control signal for controlling a timing at which the power supply circuit changes a level of the bias voltage, based on the input cycle calculated by the counter.

One frame may include one data writing cycle and at least two hold cycles after the one data writing cycle. When the number of the at least two hold cycles increase to be equal to or greater than a predetermined number, the power supply circuit may sequentially increase the voltage level of the bias voltage and output the bias voltage having the increased voltage level during the one frame.

In a period in which the first emission driving circuit and the second emission driving circuit output a first emission control signal having a turn-on level and a second emission control signal having a turn-on level, respectively and sequentially, a voltage of the power line for supplying the first power voltage may increase.

In accordance with still another aspect of the present disclosure, there is provided a method of driving a display device, the method including: outputting, by a data driving circuit, a data voltage for image display to a plurality of data lines disposed to extend in a first direction in a display panel, and outputting, by a first scan driving circuit, a first scan signal having a turn-on level to a first scan line disposed to extend in a second direction different from the first direction in the display panel, thereby writing a voltage corresponding to the data voltage to a first node of a first transistor of a pixel; outputting, a first emission driving circuit, a first emission control signal having a turn-on level to a first emission control line extending in the second direction in the display panel, thereby electrically connecting a second node of the first transistor and a first power line; and outputting, by a second emission driving circuit, a second emission control signal having a turn-on level to a second emission control line extending in the second direction in the display panel, thereby electrically connecting the first transistor and a light emitting element of the pixel to the first power line.

The pixel may include the light emitting element, the first transistor, a first emission control transistor for switching an electrical connection between the first transistor and the first power line, and a second emission control transistor for switching an electrical connection between the first transistor and the light emitting element.

The first transistor may include a gate electrode electrically connected to a first node, the second node to which a first power voltage for driving the light emitting element is applied, and a third node electrically connected to the light emitting element. The method may further include: a threshold voltage compensation phase of outputting, by a second scan driving circuit, a second scan signal having a turn-on level, thereby electrically connecting the first node and the third node of the first transistor; and a first node initialization phase of outputting, by a third scan driving circuit, a third scan signal having a turn-on level, thereby applying an initialization voltage to the first node.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 25 is a diagram illustrating a table describing an effect of the level-shifted sixth power voltage.

FIG. 30 is a diagram illustrating a table describing an effect of the level-shifted sixth power voltage and an effect when an EM gap exists.

DETAILED DESCRIPTION

Figure 1:
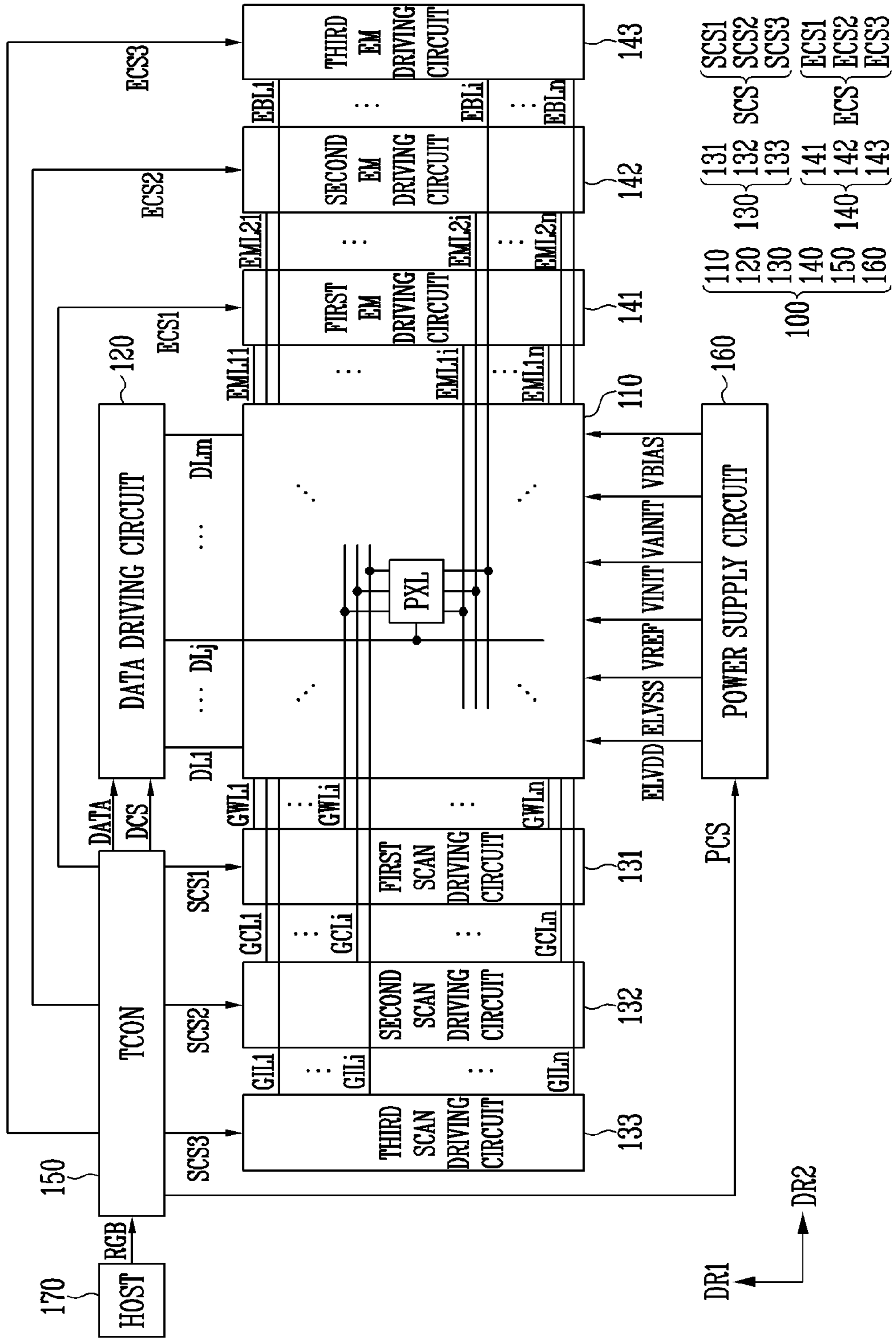
FIG. 1 is a system block diagram illustrating a display device in accordance with embodiments of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In description, the expression "equal" may mean "substantially equal." That is, this may mean equality to a degree to which those skilled in the art can understand the equality. Other expressions may be expressions in which "substantially" is omitted.

FIG. 1 is a system block diagram illustrating a display device 100 in accordance with embodiments of the present disclosure.

Referring to FIG. 1, the display device 100 may include a display panel 110, a data driving circuit 120, a scan driving circuit 130, an emission driving circuit 140, a timing controller ("TCON") 150, a power supply circuit 160, and the like.

The display panel 110 may include a plurality of first scan lines GWL1, . . . , and GWLn (n is an integer of 2 or more), a plurality of second scan lines GCL1, . . . , and GCLn, a plurality of third scan lines GIL1, . . . , GILn, a plurality of first emission control lines EML11, . . . , and EML1*n*, a plurality of second emission control lines EML21, . . . , and EML2*n*, a plurality of third emission control lines EBL1, . . . , and EBLn, a plurality of data lines DL1, . . . , DLm (m is an integer of 2 or more), and at least one pixel PXL.

Referring to FIG. 1, the pixel PXL may be electrically connected to each of a first scan line GWLi (i is an integer equal to or smaller than n), a second scan line GCLi, a third scan line GILi, a first emission control line EML1*i*, a second emission control line EML2*i*, a third emission control line EBLi, and a data line DLj (j is an integer equal to or smaller than m).

At least two pixels PXL may be disposed in the display panel 110. The at least two pixels PXL may be disposed in a matrix type, and be disposed in a diamond type. The at least two pixels PXL may be disposed in various types different from the above-described types according to designs.

The plurality of data lines DL1, . . . , and DLm may be disposed in the display panel 110 to extend in a first direction DR1. In an example, the first direction DR1 may be a direction connecting a top side and a bottom side of the display panel 110. In another example, the first direction DR1 may be a direction connecting a left side and a right side of the display panel 110. The first direction DR1 may be implemented as a direction different to the above-described directions. Hereinafter, for convenience of description, a case where the first direction DR1 is the direction connecting the top side and the bottom side of the display panel 110 is described as an example. However, the present disclosure is not limited thereto.

Meanwhile, that the plurality of data lines DL1, . . . , and DLm are disposed to extend in the first direction DR1 refers to that the plurality of data lines DL1, . . . , and DLm are entirely disposed to extend from the top side to the bottom side, and may include that the plurality of data lines DL1, . . . , and DLm partially extend in a direction different from the first direction DR1.

The plurality of first scan lines GWL1, . . . , and GWLn, the plurality of second scan lines GCL1, . . . , and GCLn, the plurality of third scan lines GIL1, . . . , and GILn, the plurality of first emission control lines EML11, . . . , and EML1*n*, the plurality of second emission control lines EML21, . . . , and EML2*n*, and the plurality of third emission control lines EBL1, . . . , and EBLn may be disposed in the display panel 110 to extend in a second direction DR2 different from the first direction DR1. The second direction DR2 is, for example, a direction intersecting the first direction DR1, and may be a direction perpendicular to the first direction DR1. In an example, the second direction DR2 may be a direction connecting the left side and the right side of the display panel 110. In another example, the second direction DR2 may be a direction connecting the top side and the bottom side of the display panel 110. The second direction DR2 may be implemented as a direction different from the above-described directions. Hereinafter, for convenience of description, a case where the second direction DR2 is the direction connecting the left side and the right side of the display panel 110 is described as an example. However, the present disclosure is not limited thereto.

That the plurality of first scan lines GWL1, . . . , and GWLn, the plurality of second scan lines GCL1, . . . , and GCLn, the plurality of third scan lines GIL1, . . . , and GILn, the plurality of first emission control lines EML11, . . . , and EML1*n*, the plurality of second emission control lines EML21, . . . , and EML2*n*, and the plurality of third emission control lines EBL1, . . . , and EBLn are disposed to extend in the second direction DR2 refers to that the plurality of first scan lines GWL1, . . . , and GWLn, the plurality of second scan lines GCL1, . . . , and GCLn, the plurality of third scan lines GIL1, . . . , and GILn, the plurality of first emission control lines EML11, . . . , and EML1*n*, the plurality of second emission control lines EML21, . . . , and EML2*n*, and the plurality of third emission control lines EBL1, . . . , and EBLn are entirely disposed to extend from the left side to the right side of the display panel 110, and may include that the plurality of first scan lines GWL1, . . . , and GWLn, the plurality of second scan lines GCL1, . . . , and GCLn, the plurality of third scan lines GIL1, . . . , and GILn, the plurality of first emission control lines EML11, . . . , and EML1*n*, the plurality of second emission control lines EML21, . . . , and EML2*n*, and the plurality of third emission control lines EBL1, . . . , and EBLn partially extend in a direction different from the second direction DR2.

The data driving circuit 120 may be configured to drive the plurality of data lines DL1, . . . , and DLm. For example, the data driving circuit 120 may generate a data voltage to display an image, and output the generated data voltage to the plurality of data lines DL1, . . . , and DLm. The data driving circuit 120 may receive image data DATA and a data driving circuit control signal DCS from the timing controller 150, to generate a data voltage, and output the generated data voltage to the plurality of data lines DL1, . . . , and DLm, corresponding to a timing.

The data driving circuit control signal DCS may include a data enable signal, a vertical synchronization signal, a horizontal synchronization signal, and the like.

The scan driving circuit 130 may include a first scan driving circuit 131, a second scan driving circuit 132, and a third scan driving circuit 133. The scan driving circuit 130. The scan driving circuit 130 may receive a scan driving circuit control signal SCS from the timing controller 150, to output a scan signal having a turn-on level or a turn-off level to the display panel 110, corresponding to a timing. The turn-on level or the turn-off level of the scan signal may vary according to a kind of transistor electrically connected to the corresponding scan line. This will be described in more detail below with reference to FIG. 2.

The first scan driving circuit 131 may be configured to drive the plurality of first scan lines GWL1, . . . , and GWLn. For example, the first scan driving circuit 131 may receive a first scan driving circuit control signal SCSI from the timing controller 150, to generate a first scan signal, and sequentially output the generated first scan signal to the plurality of first scan lines GWL1, . . . , and GWLn.

The second scan driving circuit 132 may be configured to drive the plurality of second scan lines GCL1, . . . , and GCLn. For example, the second scan driving circuit 132 may receive a second scan driving circuit control signal SCS2 from the timing controller 150, to generate a second scan signal, and sequentially output the generated second scan signal to the plurality of second scan lines GCL1, . . . , and GCLn.

The third scan driving circuit 133 may be configured to drive the plurality of third scan lines GIL1, . . . , and GILn. For example, the third scan driving circuit 133 may receive a third scan driving circuit control signal SCS3 from the timing controller 150, to generate a third scan signal, and sequentially output the generated third scan signal to the plurality of third scan lines GIL1, . . . , and GILn.

The emission driving circuit 140 may include a first emission ("EM") driving circuit 141, a second emission driving circuit 142, and a third emission driving circuit 143. The emission driving circuit 140 may receive an emission driving circuit control signal ECS from the timing controller 150, to output an emission control signal having a turn-on level or a turn-off level to the display panel 110, corresponding to a timing. The turn-on level or the turn-off level of the emission control signal may vary according to a kind of transistor electrically connected to the corresponding emission control line. This will be described in more detail below with reference to FIG. 2.

The first emission driving circuit 141 may be configured to drive the plurality of first emission control lines EML11, . . . , and EML1*n*. For example, the first emission driving circuit 141 may receive a first emission driving circuit control signal ECS1 from the timing controller 150, to generate a first emission control signal, and sequentially output the generated first emission control signal to the plurality of first emission control lines EML11, . . . , and EML1*n*.

The second emission driving circuit 142 may be configured to drive the plurality of second emission control lines EML21, . . . , and EML2*n*. For example, the second emission driving circuit 142 may receive a second emission driving circuit control signal ECS2 from the timing controller 150, to generate a second emission control signal, and sequentially output the generated second emission control signal to the plurality of second emission control lines EML21, . . . , and EML2*n*.

The third emission driving circuit 143 may be configured to drive the plurality of third emission control lines EBL1, . . . , and EBLn. For example, the third emission driving circuit 143 may receive a third emission driving circuit control signal ECS3 from the timing controller 150, to generate a third emission control signal, and sequentially output the generated third emission control signal to the plurality of third emission control lines EBL1, . . . , and EBLn.

The timing controller 150 may receive input image data RGB from a host system 170. The host system 170 may be disposed at the outside of the display device 100. The timing controller 150 may convert the input image data RGB into image data DATA, corresponding to a predetermined interface, and transmit the image data DATA to the data driving circuit 120. The predetermined interface may include, for example, at least one of a Low Voltage Differential Signal Interface ("LVDS"), a Serial Peripheral Interface ("SPI"), an I2C, and an embedded Display Port ("eDP"), but the present disclosure is not limited thereto.

The timing controller 150 may generate image data DATA by considering an arrangement of a plurality of pixels PXL. For example, the timing controller 150 may convert input image data RGB of an RGB type into image data DATA of an RGBG type, and transmit the image data DATA to the data driving circuit 120.

The host system 170 may receive original video data corresponding to an original image from the outside. The host system 170 may be, for example, an application processor ("AP"), a graphic processing unit ("GPU"), or the like, but the present disclosure is not limited thereto.

The data driving circuit 120 is, for example, an Integrated Circuit ("IC"), and may be disposed in the display device 100. For example, the data driving circuit 120 may be implemented as a Source Driver Integrated Circuit ("SDIC") to be disposed in the display device 100.

The data driving circuit 120 may be disposed directly on a substrate constituting the display panel 110, and be electrically connected to the display panel 110 through a connection member (not shown) or the like. The connection member may be, for example, a Flexible Flat Cable ("FFC"), a Flexible Printed Circuit ("FPC"), or the like.

The scan driving circuit 130 may receive the scan driving circuit control signal SCS from the timing controller 150 to generate a scan signal of a pulse type, and be configured to include at least one shift register (or referred to as a stage) so as to output the generated scan signal in a direction toward the display panel 110. The scan driving circuit control signal SCS may include a start signal, a clock signal, and the like.

The emission driving circuit 140 may receive the emission driving circuit control signal ECS from the timing controller 150 to generate an emission control signal of a pulse type, and be configured to include at least one shift register so as to output the generated emission control signal in the direction toward the display panel 110. The emission driving circuit control signal ECS may include a start signal, a clock signal, and the like. The emission driving circuit 140 may have a circuit structure substantially identical to the circuit structure of the scan driving circuit 130, but the present disclosure is not limited thereto.

The scan driving circuit 130 and the emission driving circuit 140 may be disposed at opposite sides (e.g., the left side and the right side) of the display panel 110, respectively. However, both the scan driving circuit 130 and the emission driving circuit 140 may be disposed one side (e.g., the left side or the right side) of the display panel 110 according to a design.

The timing controller 150 may be designed as an integrated circuit (IC) to be disposed in the display device 100. However, the timing controller 150 may be implemented as a processor, a logic or the like to be disposed in the display device 100. The timing controller 150 may include at least one register.

Referring to FIG. 1, the display device 100 in accordance with the embodiments of the present disclosure may further include the power supply circuit 160 configured to supply various power sources to the display panel 110.

The power supply circuit 160 may supply various power sources for driving the pixel PXL. For example, the power supply circuit 160 may supply, to the display panel 110, a first power voltage ELVDD, a second power voltage ELVSS, a third power voltage VREF, a fourth power voltage VINIT, a fifth power voltage VAINIT, a sixth power voltage VBIAS, and the like. Power lines (not shown) for transferring these power voltages to the plurality of pixels PXL may be further disposed in the display panel 110. The above-described first to sixth power voltages ELVDD, . . . , and VBIAS will be described in more detail with reference to FIG. 2.

The data driving circuit 120, the scan driving circuit 130, the emission driving circuit 140, the timing controller 150, and the like, which are described above, may be ones functionally distinguished from one another. In some cases, at least two components among the above-described components may be disposed in the form of one integrated circuit (IC) in the display device 100. For example, the data driving circuit 120 and the timing controller 150 may be implemented into one integrated circuit. For example, the emission driving circuit 140 may be included in the scan driving circuit 130.

The power supply circuit 160 may receive a power supply circuit control signal PCS from the timing controller 150, so that an operation timing of the power supply circuit 160 is controlled.

Figure 2:
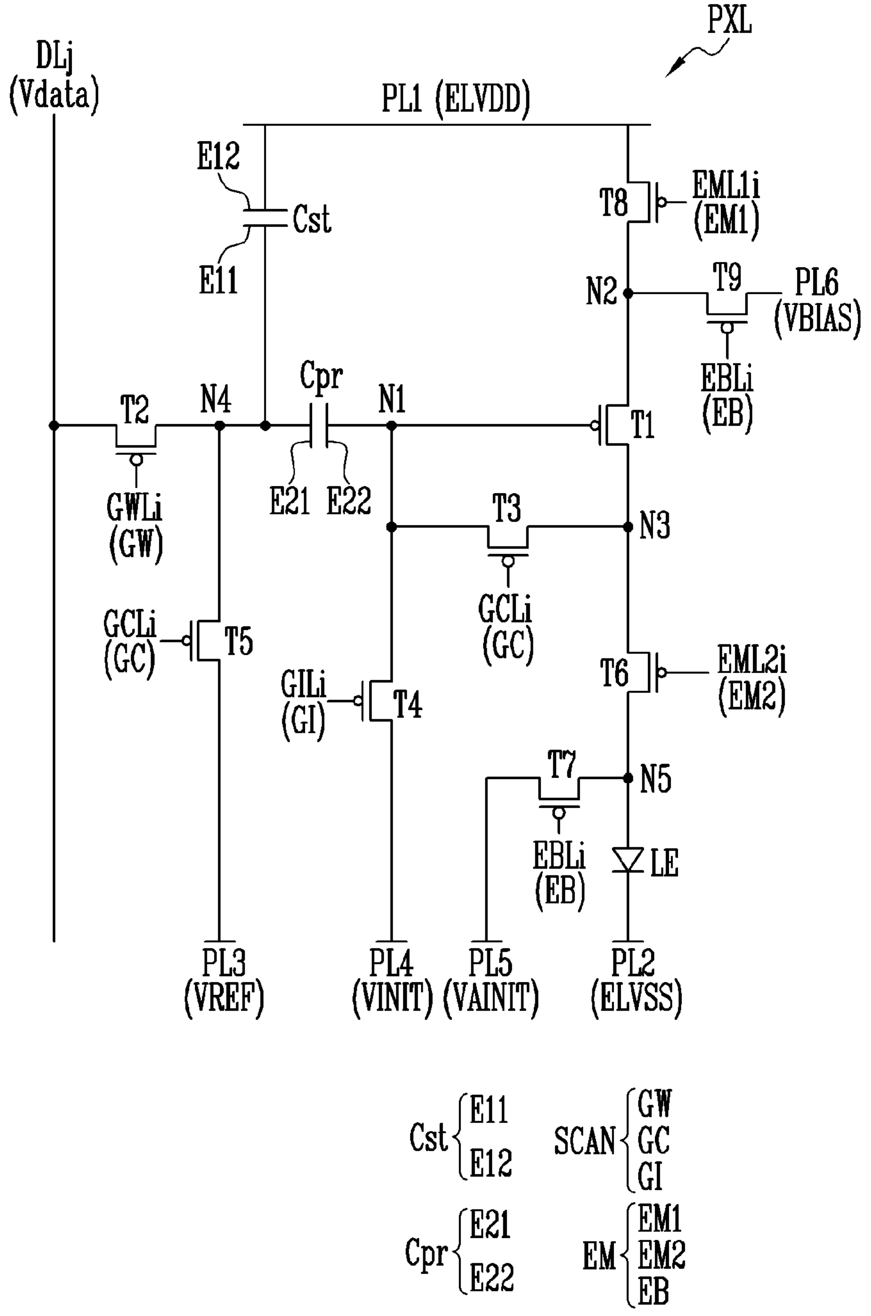
FIG. 2 is an example of a pixel structure in accordance with embodiments of the present disclosure.

FIG. 2 is an example of a pixel structure in accordance with embodiments of the present disclosure.

In FIG. 2, when a plurality of pixels PXL are disposed in a matrix type of n×m in the above-described display panel 110 (see FIG. 1), a pixel PXL disposed on an i-th pixel row and a j-th pixel column is exemplarily illustrated.

Referring to FIG. 2, the pixel PXL may include at least one light emitting element LE and a pixel circuit (or referred to as a pixel driving circuit) configured to control an amount of current flowing through the at least one light emitting element LE.

Referring to FIG. 2, the light emitting element LE may include a first electrode and a second electrode. The first electrode of the light emitting element LE may be electrically connected to a fifth node N5, and the second electrode of the light emitting element LE may be electrically connected to a second power line PL2. The first electrode of the light emitting element LE may be an anode electrode or a cathode electrode, and the second electrode of the light emitting element LE may be the cathode electrode or the anode electrode. Hereinafter, for convenience of description, a case where the first electrode of the light emitting element LE is the anode electrode and the second electrode of the light emitting element LE is the cathode electrode is assumed and described. However, the present disclosure is not limited thereto. The light emitting element LE may emit light with a luminance corresponding to a driving current provided from the pixel circuit.

The light emitting element LE may further include a light emitting layer. The light emitting layer may be located between the first electrode and the second electrode. The light emitting element LE may be an organic light emitting diode including an organic light emitting layer. The light emitting element LE may include a GaN or AlGaInP based inorganic material, and be configured as an inorganic light emitting diode such as a micro LED (light emitting diode) or a quantum dot light emitting diode. The light emitting element LE may be configured as a light emitting diode made of a combination of an organic material and an inorganic material. Although a case where the pixel PXL includes a single light emitting element LE is illustrated in FIG. 2, the pixel PXL may include a plurality of light emitting elements, and the plurality of light emitting elements may be connected in series, parallel, or series/parallel to each other.

The second power line PL2 is a line to which the second power voltage ELVSS is applied. The second power voltage ELVSS may be a low potential voltage as compared with the first power voltage ELVDD. The second power voltage ELVSS may be a base voltage (or ground voltage).

Meanwhile, the pixel circuit in accordance with the embodiments of the present disclosure may include at least two transistors and at least one capacitor.

The pixel circuit in accordance with the embodiments of the present disclosure may include, for example, first to ninth transistors T1, . . . , and T9 and first and second capacitors Cst and Cpr. The pixel circuit may generate a driving current supplied to the light emitting element LE.

At least one transistor among the first to ninth transistors T1, . . . , and T9 may be implemented with a p-type thin film transistor including a p-type semiconductor. In some cases, at least one transistor among the first to ninth transistors T1, . . . , and T9 may be implemented with an n-type thin film transistor including an n-type semiconductor.

In the case of the p-type thin film transistor, a turn-on level may be a low level voltage, and a turn-off level may be a high level voltage. In the case of the n-type thin film transistor, the turn-on level may be a high level voltage, the turn-off level may be a low level voltage.

Referring to FIG. 2, for convenience of description, a case where the first to ninth transistors T1, . . . , and T9 are implemented with a p-type thin film transistor in the pixel PXL in accordance with the embodiments of the present disclosure is illustrated as an example. However, the present disclosure is not limited thereto, and at least one of the first to ninth transistors T1, . . . , and T9 may be implemented with an n-type thin film transistor.

Meanwhile, at least one transistor among the first to ninth transistors T1, . . . , and T9 may include a poly-silicon semiconductor. In some cases, at least one transistor among the first to ninth transistors T1, . . . , and T9 may include a single crystalline silicon semiconductor, include an oxide semiconductor, or include an amorphous silicon semiconductor or the like.

The first transistor T1 may include a gate electrode, a first electrode, and a second electrode. The first transistor T1 may include a first node N1 electrically connected to the gate electrode, a second node N2 at which the first electrode is electrically connected to a first power line PL1, and a third node N3 at which the second electrode is electrically connected to the light emitting element LE. The first transistor T1 may be referred to as a driving transistor. The first electrode of the first transistor T1 may be any one of a source electrode and a drain electrode, and the second electrode of the first transistor T1 may be the other of the source electrode and the drain electrode. For example, the first electrode may be the source electrode, and the second electrode may be the drain electrode. The first transistor T1 may control a current amount of driving current flowing through the light emitting element LE in response to a difference between a voltage of the source electrode and a voltage of the gate electrode.

The first power line PL1 is a line to which the first power voltage ELVDD is applied. The first power voltage ELVDD may be a high potential voltage as compared with the second power voltage ELVSS. A voltage difference between the first power voltage ELVDD and the second power voltage ELVSS may be higher than a threshold voltage of the light emitting element LE.

The second transistor T2 may be configured to switch an electrical connection between a data line DLj and a fourth node N4. A gate electrode of the second transistor T2 may be electrically connected to a first scan line GWLi. An operation timing of the second transistor T2 may be controlled by a first scan signal GW. When the second transistor T2 is turned on, a data voltage Vdata applied to the data line DLj may be transferred to the fourth node N4. The second transistor T2 may be referred to as a scan transistor.

The third transistor T3 may be configured to switch an electrical connection between the first node N1 and the third node N3 of the first transistor T1. An operation timing of the third transistor T3 may be controlled by a second scan signal GC. In an example, a gate electrode of the third transistor T3 may be electrically connected to an i-th second scan line GCLi. When the third transistor T3 is turned on, the first node N1 and the third node N3 of the first transistor T1 may be electrically connected to each other. When the third transistor T3 is turned on, the first transistor T1 may be turned on in a diode form, and a voltage of the second node N2 (e.g., a voltage corresponding between the first power voltage ELVDD and a threshold voltage of the first transistor T1) may be sampled at the first node N1 of the first transistor T1. As described above, the third transistor T3 may perform a function of compensating for a change in characteristic value (e.g., threshold voltage) of the first transistor T1. The third transistor T3 is referred to as a compensation transistor.

The fourth transistor T4 may be configured to switch an electrical connection between the first node N1 of first transistor and a fourth power line PL4. A gate electrode of the fourth transistor T4 may be electrically connected to a third scan line GILi. An operation timing of the fourth transistor T4 may be controlled by a third scan signal GI. When the fourth transistor T4 is turned on, the fourth power voltage VINIT may be applied to the gate electrode of the first transistor T1. The fourth power voltage VINIT may be referred to as a first initialization voltage, and the fourth transistor T4 may be referred to as a first initialization transistor. When the fourth transistor T4 is turned on, a voltage applied to the gate electrode of the first transistor T1 may be initialized to the fourth power voltage VINIT.

The fifth transistor T5 may be configured to switch an electrical connection between the fourth node N4 and a third power line PL3. An operation timing of the fifth transistor T5 may be controlled by the second scan signal GC. In an example, a gate electrode of the fifth transistor T5 may be electrically connected to the i-th second scan line GCLi. When the fifth transistor T5 is turned on, the third power voltage VREF may be applied to the fourth node N4. The third power voltage VREF may be referred to as a reference voltage.

The first capacitor Cst may include a first electrode E11 electrically connected to the fourth node N4 and a second electrode E12 electrically connected to the first power line PL1. As the second electrode E12 of the first capacitor Cst is electrically connected to the first power line PL1, so that a static voltage is applied, the first capacitor Cst may store a voltage (e.g., the data voltage Vdata) applied to the fourth node N4. The first capacitor Cst may be referred to as a storage capacitor.

The second capacitor Cpr may include a first electrode E21 electrically connected to the fourth node N4 and a second electrode E22 electrically connected to the first node N1. As the second capacitor Cpr is further disposed between the fourth node N4 and the first node N1 of the first transistor T1, any voltage fluctuation of the first node N1 may not be reflected on the first electrode E11 of the first capacitor Cst even when a voltage of the first node N1 of the first transistor T1 fluctuates. Accordingly, as will be described later, a data writing period and a threshold voltage compensation period of the first transistor T1 may be temporally separated from each other. Accordingly, high resolution and excellent display quality can be implemented. The second capacitor Cpr may be referred to as a hold capacitor.

The sixth transistor T6 may be configured to switch an electrical connection between the third node N3 of the first transistor T1 and the light emitting element LE. The sixth transistor T6 may be electrically connected to the first electrode of the light emitting element LE at the fifth node N5. A gate electrode of the sixth transistor T6 may be electrically connected to a second emission control line EML2*i*. An operation timing of the sixth transistor T6 may be controlled by a second emission control signal EM2. When the sixth transistor T6 is turned on, a driving current may flow through the light emitting element LE. The sixth transistor T6 may be referred to as a "second emission control transistor."

The seventh transistor T7 may be configured to switch an electrical connection between the first electrode of the light emitting element LE and a fifth power line PL5. The seventh transistor T7 may be electrically connected to the first electrode of the light emitting element LE at the fifth node N5. An operation timing of the seventh transistor T7 may be controlled by a third emission control signal EB. In an example, a gate electrode of the seventh transistor T7 may be electrically connected to an i-th third emission control line EBLi. When the seventh transistor T7 is turned on, the fifth power voltage VAINIT is applied to the first electrode of the light emitting element LE. The seventh transistor T7 may be referred to as a second initialization transistor (or anode reset transistor).

The fifth power line PL5 is a line to which the fifth power voltage VAINIT is applied. The fifth power voltage VAINIT may be a voltage for initializing a voltage applied to the first electrode (e.g., the anode electrode) of the light emitting element LE. The fifth power voltage VAINIT may be referred to as a second initialization voltage. A voltage level of the fifth power voltage VAINIT may be set close to a voltage level of the second power voltage ELVSS. The voltage level of the fifth power voltage VAINIT may be set different from the voltage level of the second power voltage ELVSS according to a design. The voltage level of the fifth power voltage VAINIT may be set equal to a voltage level of the fourth power voltage VINIT, and be set different from the voltage level of the fourth power voltage VINIT.

The eighth transistor T8 may be configured to switch an electrical connection between the first power line PL1 and the second node N2 of the first transistor T1. A gate electrode of the eighth transistor T8 may be electrically connected to a first emission control line EML1*i*. An operation timing of the eighth transistor T8 may be controlled by a first emission control signal EM1. When the eighth transistor T8 is turned on, the first power voltage ELVDD may be applied to the second node N2 of the first transistor T1. The eighth transistor T8 may be referred to as a "first emission control transistor."

The ninth transistor T9 is configured to switch an electrical connection between the second node N2 of the first transistor T1 and a sixth power line PL6. An operation timing of the ninth transistor T9 may be controlled by the third emission control signal EB. In an example, a gate electrode of the ninth transistor T9 may be electrically connected to the i-th third emission control line EBLi. However, the operation timing of the ninth transistor T9 may be controlled by a signal different from the third emission control signal EB. Hereinafter, a case where the operation timings of both the ninth transistor T9 and the seventh transistor T7 are controlled by the third emission control signal EB is assumed and described. However, the present disclosure is not limited thereto. When the ninth transistor T9 is turned on, the sixth power voltage VBIAS may be applied to the second node N2 of the first transistor T1.

The sixth power line PL6 is a line to which the sixth power voltage VBIAS. The sixth power voltage VBIAS is a bias voltage applied to the first transistor T1, and may be a voltage applied to the first transistor T1 so as to reduce hysteresis of the first transistor T1. A change in transfer characteristic of the first transistor T1 may be reduced by the sixth power voltage VBIAS. The sixth power voltage VBIAS may be a direct current ("DC") voltage of which voltage level is higher than a voltage level of the first power voltage ELVDD.

When the sixth power voltage VBIAS is periodically applied to the first transistor T1, the hysteresis of the first transistor T1 may be reduced. Accordingly, the transfer characteristic of the first transistor T1 is adjusted such that the first transistor T1 has a specific voltage-current transfer characteristic, so that a phenomenon in which the threshold voltage of the first transistor T1 is shifted during an emission period can be reduced. Thus, a phenomenon in which the driving current flowing through the light emitting element LE varies during the emission period can be reduced, and accordingly, visibility can be improved in terms of the display device 100 (see FIG. 1).

Meanwhile, referring to FIG. 2, a scan signal SCAN may include the first scan signal GW, the second scan signal GC, and the third scan signal GI. An emission control signal EM may include the first emission control signal EM1, the second emission control signal EM2, and the third emission control signal EB.

A case where the third transistor T3 and the fifth transistor T5 are electrically connected to the same second scan line GCLi is illustrated. However, the third transistor T3 and the fifth transistor T5 may be electrically connected to different second scan lines (e.g., GCLi, GCL(i+6) and the like).

The above-described first to ninth transistors T1, . . . , and T9 may be formed as transistor having structures and sizes, which are similar to one another. Alternatively, at least one of the first to ninth transistors T1, . . . , and T9 may be formed as a transistor having a structure and a size, which are different from a structure and a size of the other transistors.

At least one transistor among the first to ninth transistors T1, . . . , and T9 may be implemented with a dual gate transistor (or a transistor including a plurality of sub-transistors connected in series).

The above-described structure of the pixel PXL is merely an example, and the pixel structure of the present disclosure is not limited to the above-described pixel structure.

Figure 3:
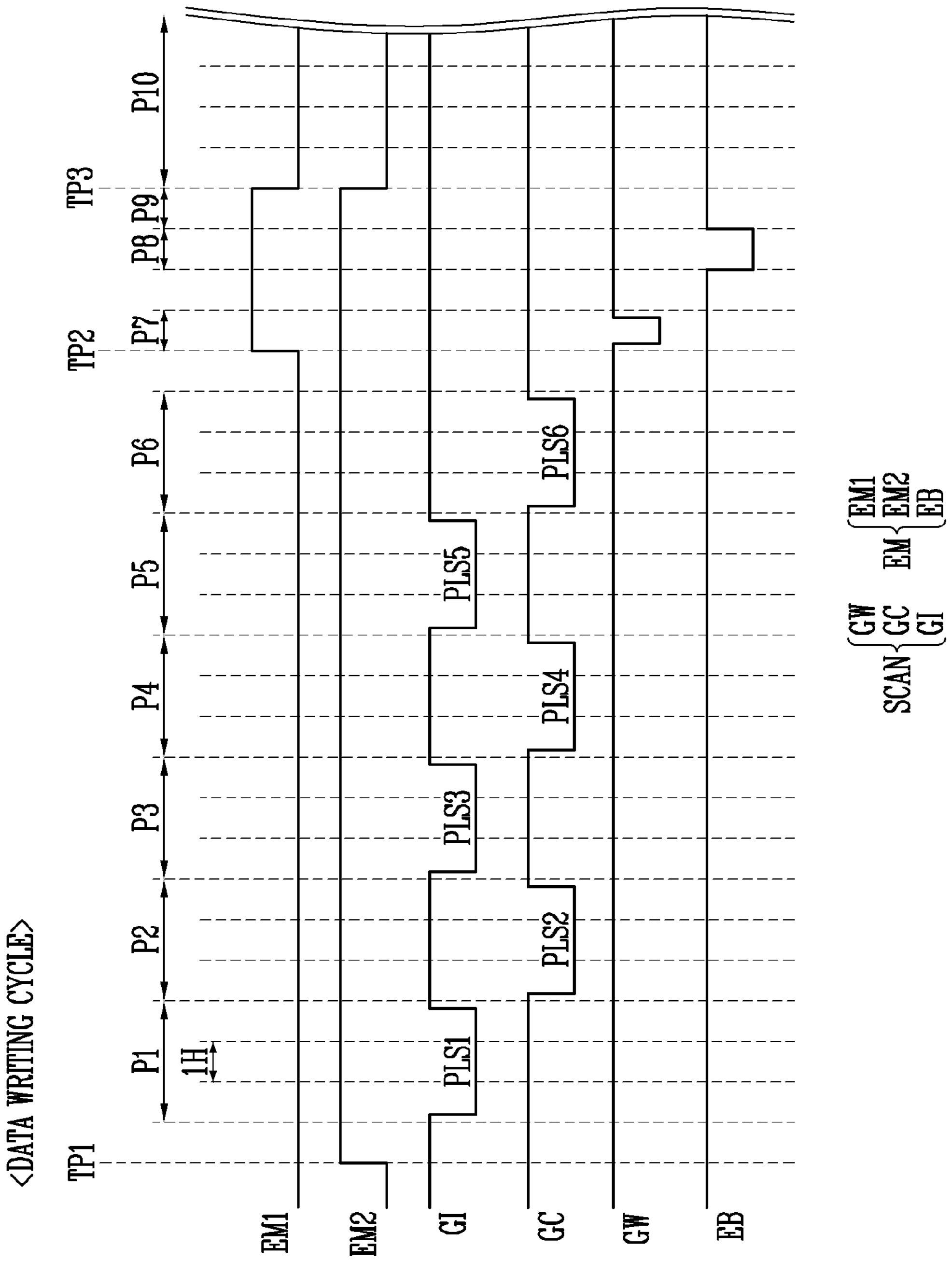
FIG. 3 is an example of a timing diagram of a data writing cycle for driving a pixel shown in FIG. 2.

FIG. 3 is an example of a timing diagram of a data writing cycle DATA WRITING CYCLE for driving the pixel shown in FIG. 2.

In FIG. 3, waveforms of a scan signal SCAN and an emission control signal EM in the data writing cycle DATA WRITING CYCLE are illustrated.

Referring to FIG. 3, the data writing cycle DATA WRITING CYCLE may include first to tenth periods P1 to P10.

The first to sixth periods P1, . . . , and P6 may be included in a period between a first time TP1 and a second time TP2. The period between the first time TP1 (or first timing TP1) and the second time TP2 (or second timing TP2) may be a threshold voltage compensation period of the first transistor (hereinafter, abbreviated as "threshold voltage compensation period").

The seventh to ninth periods P7, P8, and P9 may be included in a period between the second time TP2 and a third time TP3 (or third timing TP3). The period between the second time TP2 and the third time TP3 may be a data writing period.

The tenth period P10 may be included in a period after the third time TP3. The tenth period P10 may be an emission period.

A low level voltage of each of the scan signal SCAN and the emission control signal EM corresponds to a turn-on level, and a high level of each of the scan signal SCAN and the emission control signal EM corresponds to a turn-off level.

Meanwhile, referring to FIG. 3, a time interval between dotted lines is illustrated as one horizontal period 1H. The one horizontal period 1H may mean a time interval between sequentially scanned pixel rows, or be a time allocated to apply a data signal to one pixel row. For example, when the display device 100 (see FIG. 1) reproduces an image at a frequency of 240 Hz, the one horizontal period 1H may be about 1.84 microseconds (μs).

Although it is illustrated that each of the first to sixth periods P1, . . . , and P6 has a length of about three horizontal periods (3H), each of the first to sixth periods P1, . . . , and P6 may have a value greater than the three horizontal periods (3H) or have a value smaller than the three horizontal periods (3H) according to a driving method. In addition, at least one period among the first to sixth periods P1, . . . , and P6 may have a length different from a length of the other periods.

Hereinafter, the first to tenth periods P1, . . . , and P10 will be described in more detail with reference to FIGS. 4 to 13.

Figure 4:
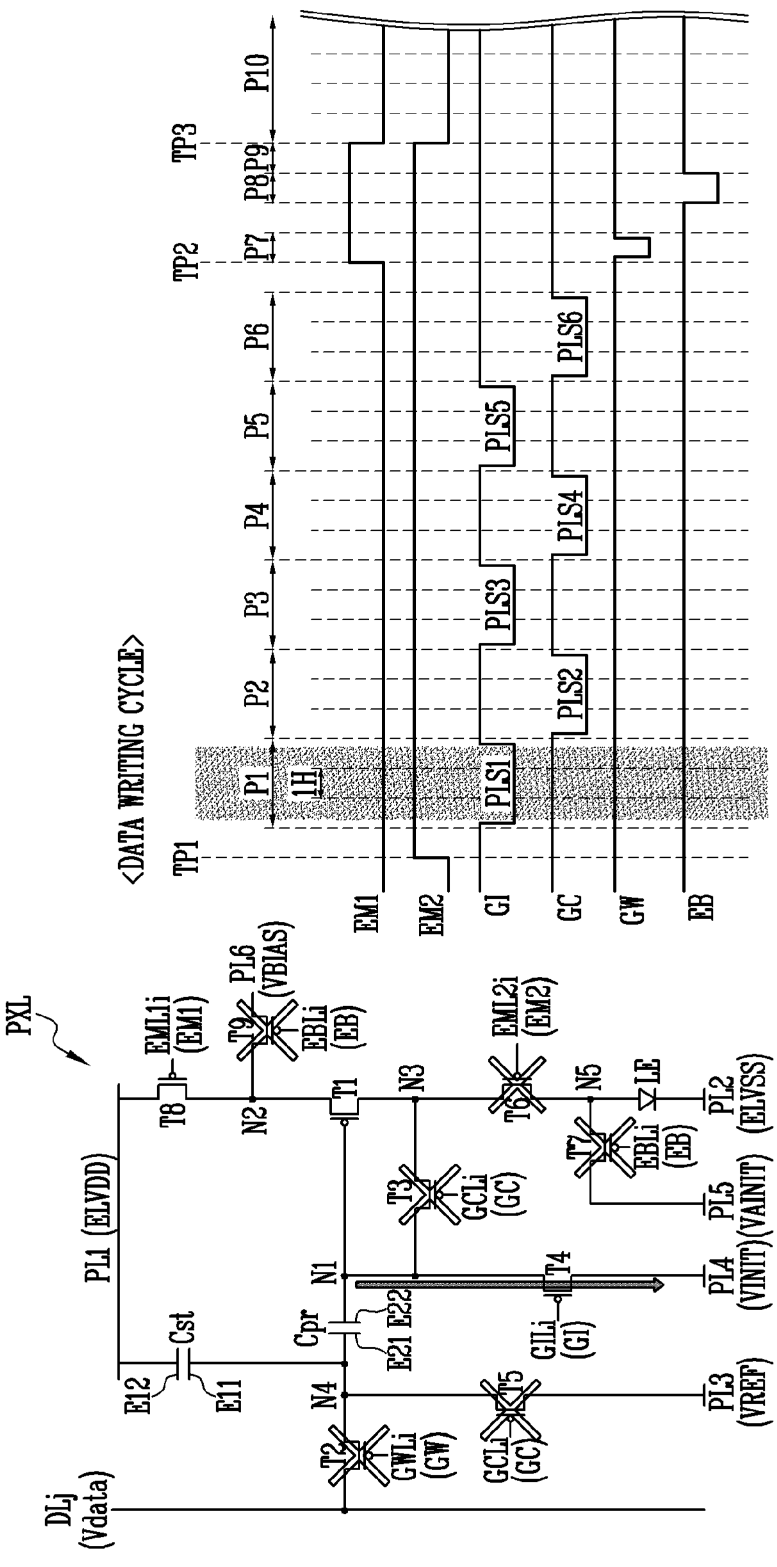
FIG. 4 is a diagram illustrating a first period of the timing diagram shown in FIG. 3 together with the pixel structure shown in FIG. 2.

FIG. 4 is a diagram illustrating the first period P1 of the timing diagram shown in FIG. 3 together with the pixel PXL structure shown in FIG. 2.

The first period P1 may be a period configured to initialize a voltage of the first node N1 of the first transistor T1. For example, the first period P1 may be a period for initializing the voltage of the first node N1 to the fourth power voltage VINIT.

Referring to FIG. 4, in the first period P1, the first emission control signal EM1 having the turn-on level may be input, and a third scan signal GI (or a third scan signal pulse PLS1) having the turn-on level may be input.

In the first period P1, the second emission control signal EM2 having the turn-off level, the first scan signal GW having the turn-off level, the second scan signal GC having the turn-off level, and the third emission control signal EB having the turn-off level may be input.

The first emission control signal EM1 having the turn-on level is input, so that the first power voltage ELVDD is applied to the second node N2 of the first transistor T1. The third scan signal GI (or the third scan signal pulse PLS1) having the turn-on level is input, so that the fourth power voltage VINIT is applied to the first node N1 of the first transistor T1. Meanwhile, a data voltage Vdata of a previous frame is stored in the first capacitor Cst. The fourth node N4 electrically connected to the first electrode E21 of the second capacitor Cpr may be in a floating state, and a voltage of the fourth node N4 may be slightly decreased from the data voltage Vdata of the previous frame as the first initialization voltage VINIT is applied to the first node N1.

Referring to FIG. 4, a length of a period in which the third scan signal PLS1 having the turn-on level is input may be set slightly shorter than the length of the first period P1 having three horizontal periods (3H). A margin period may exist, in which the third scan signal GI having the turn-off level is input before and/or after the period in which the third scan signal PLS1 having the turn-on level is input.

Figure 5:
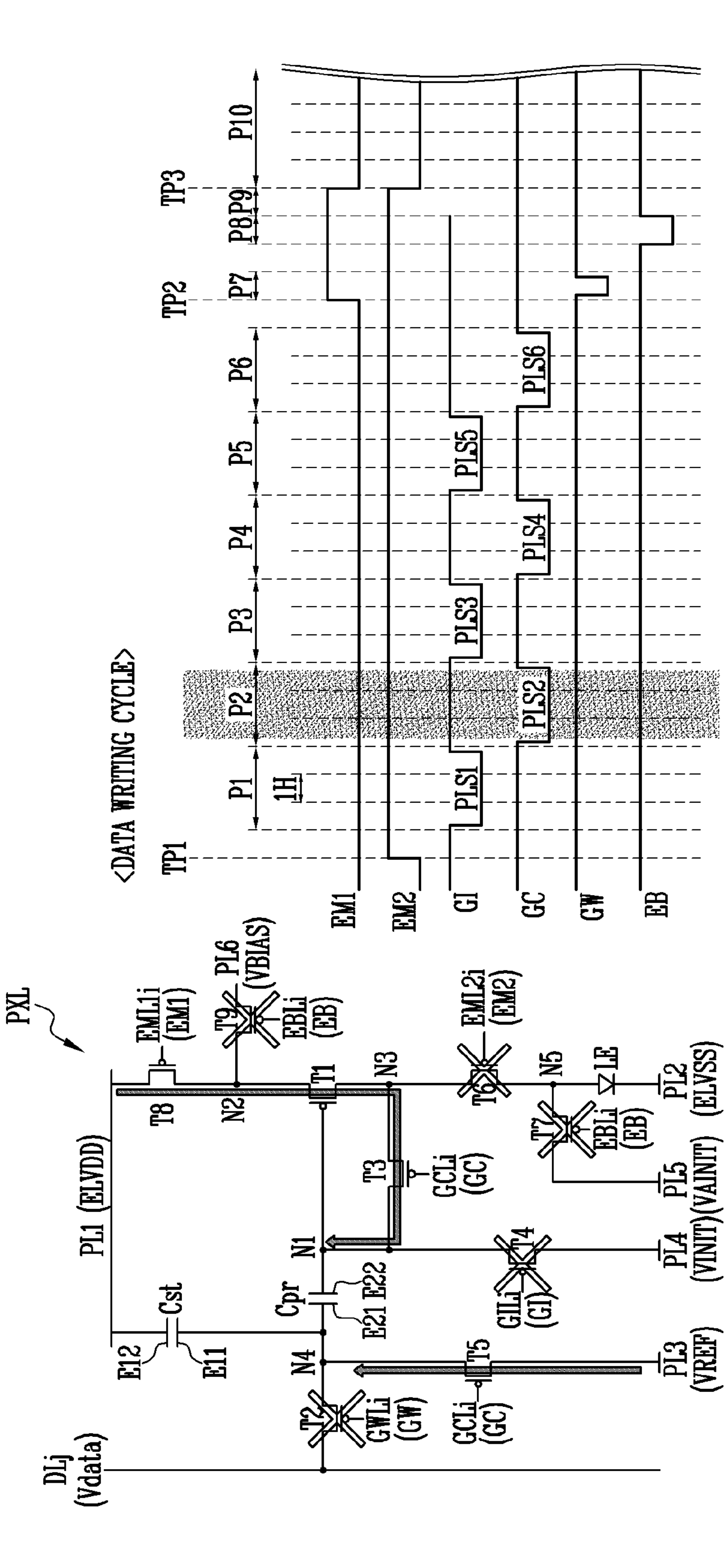
FIG. 5 is a diagram illustrating a second period of the timing to diagram shown in FIG. 3 together with the pixel structure shown in FIG. 2.

FIG. 5 is a diagram illustrating the second period P2 of the timing diagram shown in FIG. 3 together with the pixel PXL structure shown in FIG. 2.

The second period P2 may be a period for compensating for a threshold voltage change of the first transistor T1 and applying the third power voltage VREF (or reference voltage VREF) to the fourth node N4.

Referring to FIG. 5, in the second period P2, the first emission control signal EM1 having the turn-on level may be input, and a second scan signal GC (or a second scan signal pulse PLS2) having the turn-on level may be input.

In the second period, the second emission control signal EM2 having the turn-off level and the third scan signal GI having the turn-off level may be input, the first scan signal GW having the turn-off level may be input, and the third emission control signal EB having the turn-off level may be input.

In the second period P2, the first emission control signal EM1 having the turn-on level, and the second scan signal GC (or the second scan signal pulse PLS2) having the turn-on level is input, so that the first node N1 and the third node N3 of the first transistor T1 are connected in a diode form. Accordingly, a voltage corresponding to a voltage difference between the first power voltage ELVDD and the threshold voltage (also, referred to as "Vth") of the first transistor T1 (i.e., ELVDD-Vth) may be applied to the first node N1 of the first transistor T1.

Meanwhile, the fifth transistor T5 is turned on together with the operation, so that the third power voltage VREF is applied to the fourth node N4. In this process, the voltage of the first node N1 of the first transistor T1 may fluctuate.

Specifically, the voltage of the fourth node N4 may be changed from the data voltage Vdata of the previous frame to the third power voltage VREF. The first electrode E21 of the second capacitor Cpr is electrically connected to the fourth node N4, and the second electrode E22 of the second capacitor Cpr is electrically connected to the first node N1 of the first transistor T1, so that the voltage of the first node N1 is also changed by the voltage change of the fourth node N4. Accordingly, in the second period P2, a voltage different from the voltage corresponding to the voltage difference between the first power voltage ELVDD and the threshold voltage of the first transistor T1 (i.e., ELVDD-Vth).

Therefore, it is desirable to provide a plan for performing a threshold voltage compensation operation of the first transistor T1 in a state in which the voltage of the fourth node N4 is fixed to the third power voltage VREF.

Figure 6:
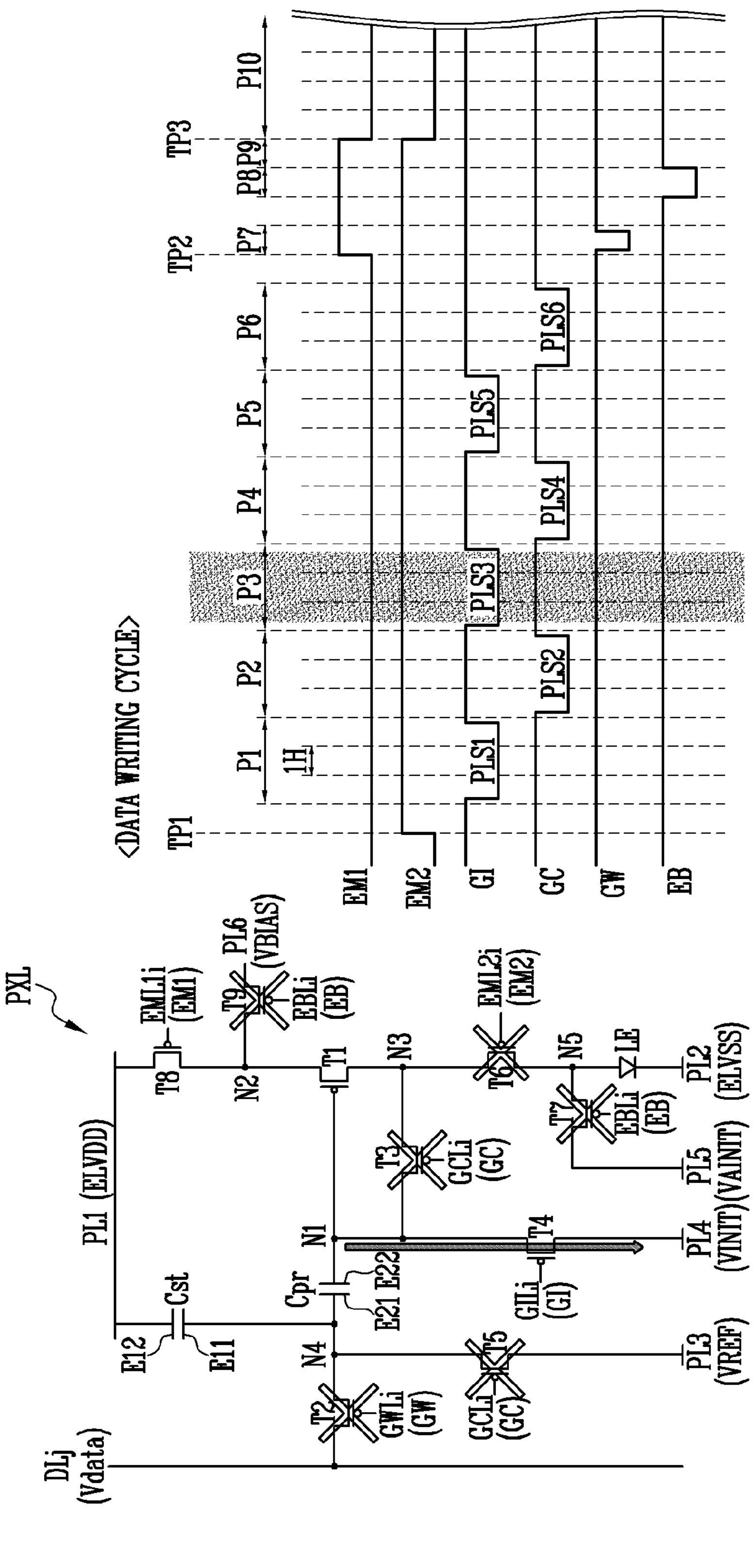
FIG. 6 is a diagram illustrating a third period of the timing diagram shown in FIG. 3 together with the pixel structure shown in FIG. 2.
Figure 7:
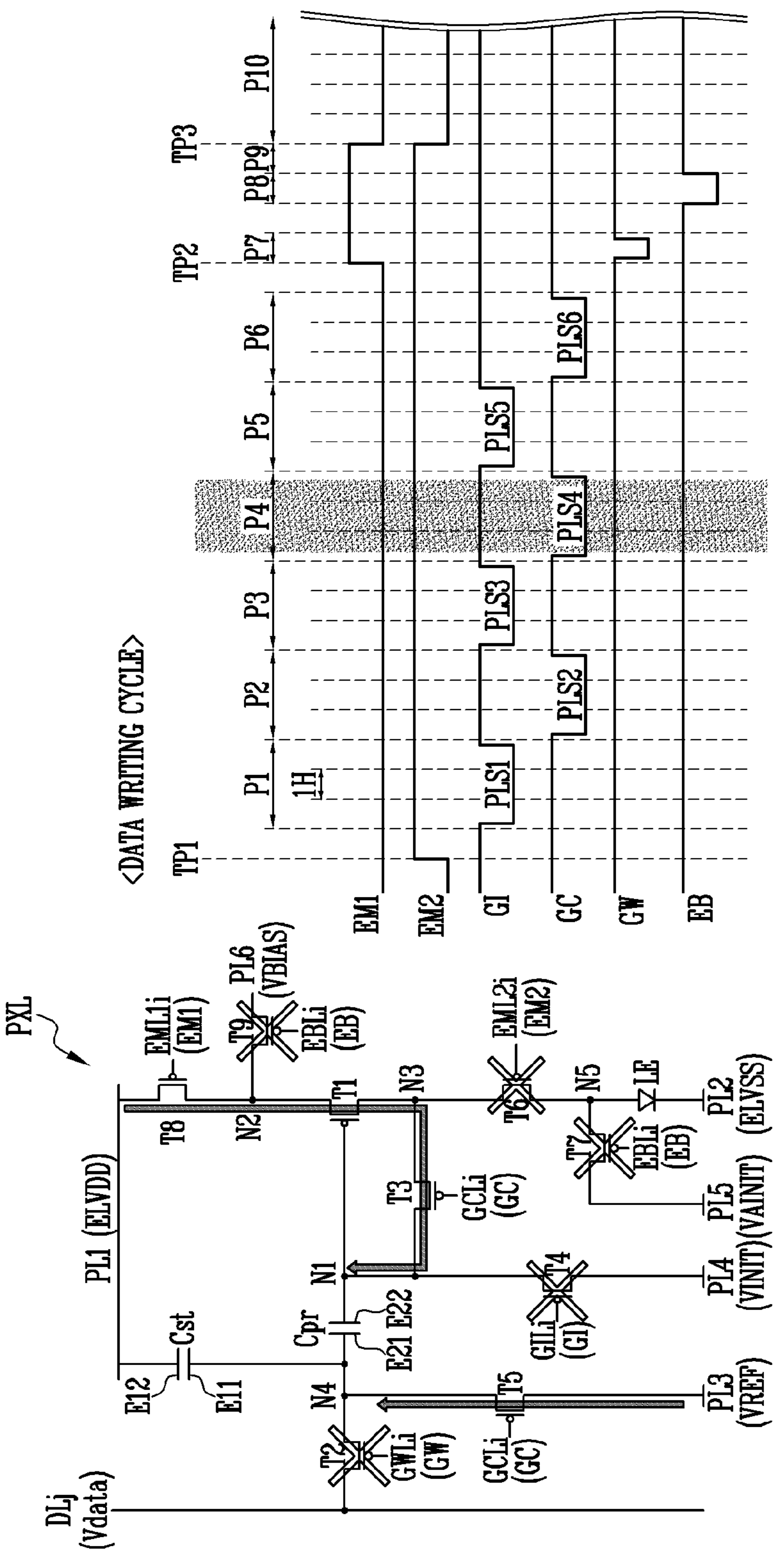
FIG. 7 is a diagram illustrating a fourth period of the timing diagram shown in FIG. 3 together with the pixel structure shown in FIG. 2.

FIG. 6 is a diagram illustrating the third period P3 of the timing diagram shown in FIG. 3 together with the pixel PXL structure shown in FIG. 2. FIG. 7 is a diagram illustrating the fourth period P4 of the timing diagram shown in FIG. 3 together with the pixel PXL structure shown in FIG. 2.

Referring to FIG. 6, in the third period P3, signals may be supplied to the pixel PXL in a manner identical or similar to the above-described manner shown in FIG. 4.

That is, in the third period P3, the first emission control signal EM1 having the turn-on level may be input, and a third scan signal GI (or a third scan signal pulse PLS3) having the turn-on level may be input.

In the third period P3, the second emission control signal EM2 having the turn-off level, the first scan signal GW having the turn-off level, the second scan signal GC having the turn-off level, and the third emission control signal EB having the turn-off level may be input.

Accordingly, the fourth power voltage VINIT is applied to the first node N1 of the first transistor T1.

Referring to FIG. 7, in the fourth period P4, signals may be supplied to the pixel PXL in a manner identical or similar to the above-described manner shown in FIG. 5.

That is, in the fourth period P4, the first emission control signal EM1 having the turn-on level may be input, and a second scan signal GC (or a second scan signal pulse PLS4) having the turn-on level may be input.

In the fourth period P4, the second emission control signal EM2 having the turn-off level, the third scan signal GI having the turn-off level, the first scan signal GW having the turn-off level, and the third emission control signal EB having the turn-off level may be input.

Accordingly, the third power voltage VREF may be applied to the fourth node N4 once again, and the voltage corresponding to the voltage difference between the first power voltage ELVDD and the threshold voltage of the first transistor T1 (i.e., ELVDD-Vth) may be applied to the first node N1 of the first transistor T1.

As the above-described third and fourth periods P3 and P4 are provided, the threshold voltage change of the first transistor T1 can be more accurately compensated.

A length of the third period P3 may be set equal to the length of the first period P1, or be set different from the length of the first period P1. A length of the fourth period P4 may be set equal to the length of the second period P2, or be set different from the length of the second period P2.

Figure 8:
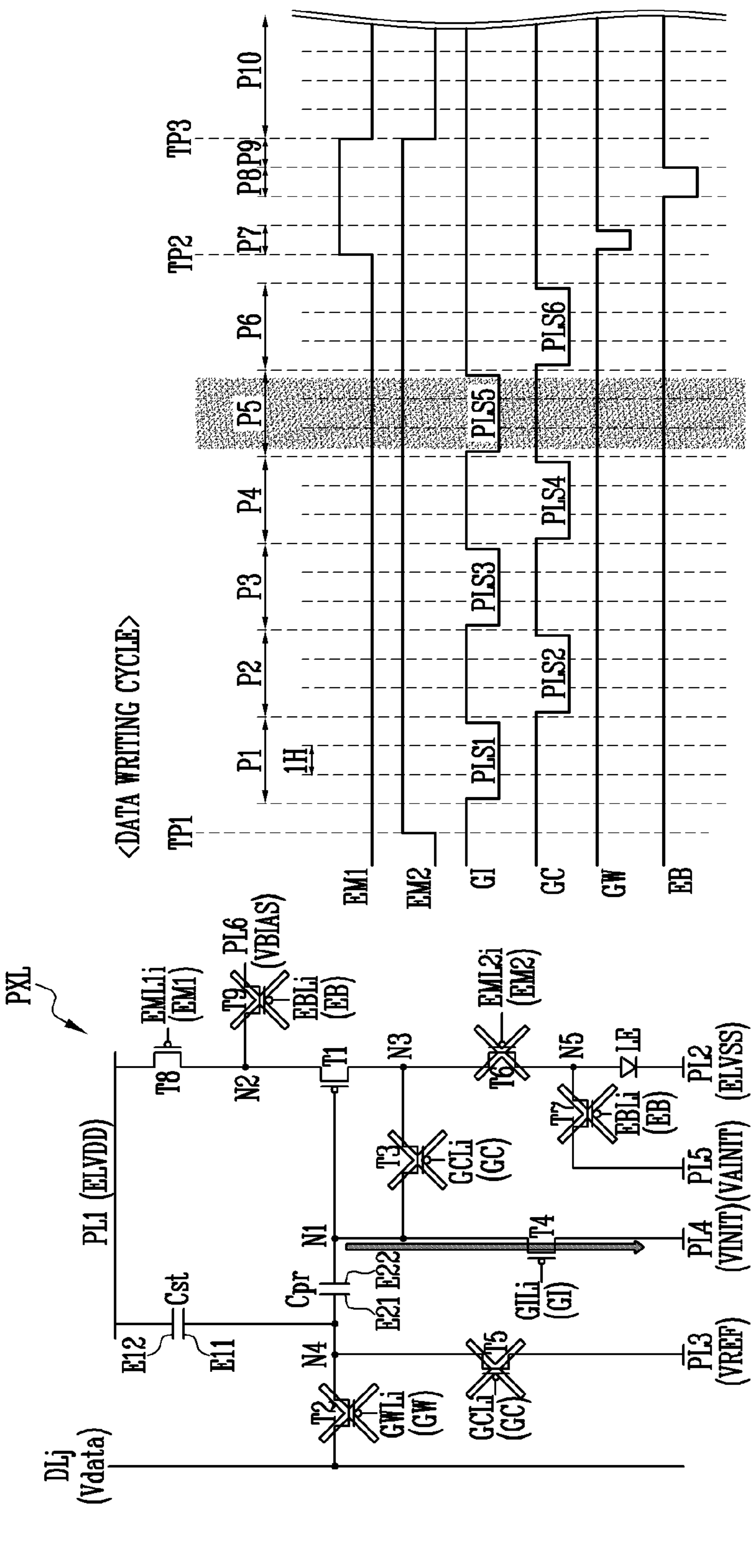
FIG. 8 is a diagram illustrating a fifth period of the timing diagram shown in FIG. 3 together with the pixel structure shown in FIG. 2.
Figure 9:
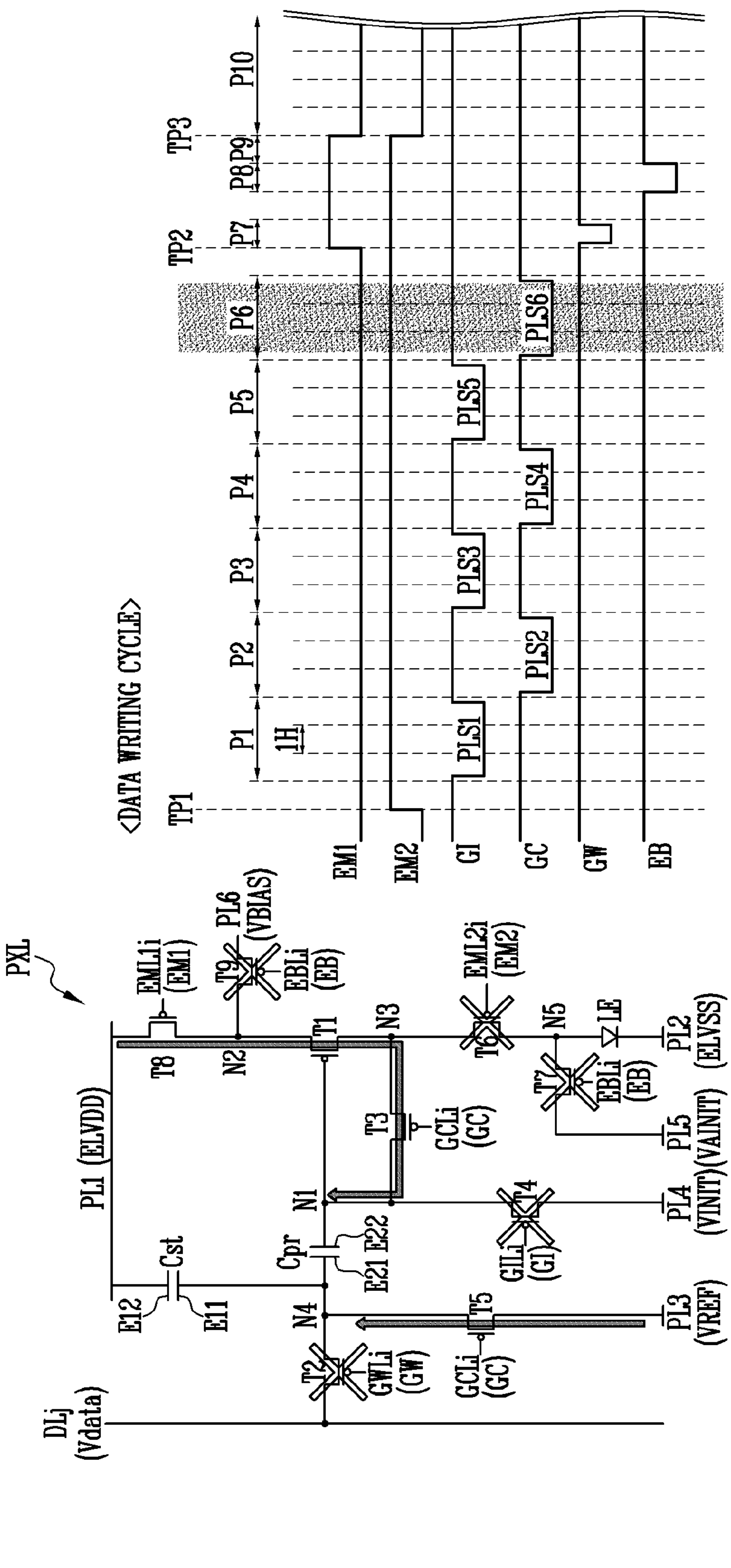
FIG. 9 is a diagram illustrating a sixth period of the timing diagram shown in FIG. 3 together with the pixel structure shown in FIG. 2.

FIG. 8 is a diagram illustrating the fifth period P5 of the timing diagram shown in FIG. 3 together with the pixel PXL structure shown in FIG. 2. FIG. 9 is a diagram illustrating the sixth period P6 of the timing diagram shown in FIG. 3 together with the pixel PXL structure shown in FIG. 2.

Referring to FIG. 8, in the fifth period P5, signals may be supplied to the pixel PXL in a manner identical or similar to the above-described manners shown in FIGS. 4 and 6.

That is, in the fifth period P5, the first emission control signal EM1 having the turn-on level may be input, and a third scan signal GI (or a third scan signal pulse PLS5) having the turn-on level may be input.

In the fifth period P5, the second emission control signal EM2 having the turn-off level, the first scan signal GW having the turn-off level, the second scan signal GC having the turn-off level, and the third emission control signal EB having the turn-off level may be input.

Accordingly, the fourth power voltage VINIT is applied to the first node N1 of the first transistor T1.

Referring to FIG. 9, in the sixth period P6, signals may be supplied to the pixel PXL in a manner identical or similar to the above-described manners shown in FIGS. 5 and 7.

That is, in the sixth period P6, the first emission control signal EM1 having the turn-on level may be input, and a second scan signal GC (or a second scan signal pulse PLS6) having the turn-on level may be input.

In the sixth period P6, the second emission control signal EM2 having the turn-off level, the third scan signal GI having the turn-off level, the first scan signal GW having the turn-off level, and the third emission control signal EB having the turn-off level may be input.

Accordingly, the third power voltage VREF may be applied to the fourth node N4 once again, and the voltage corresponding to the voltage difference between the first power voltage ELVDD and the threshold voltage of the first transistor T1 (i.e., ELVDD-Vth) may be applied to the first node N1 of the first transistor T1.

As the above-described fifth and sixth periods P5 and P6 are provided, the threshold voltage change of the first transistor T1 can be more accurately compensated.

A length of the fifth period P5 may be set equal to the length of each of the first period P1 and the third period P3, or be set different from the period of any one of the first period P1 and the third period P3. A length of the sixth period P6 may be set equal to the length of each of the second period P2 and the fourth period P4, or be set different from the period of any one of the second period P2 and the fourth period P4.

Meanwhile, in some cases, the fifth period P5 and the sixth period P6 may be omitted. The seventh period P7 may be continued after the fourth period P4.

The above-described first, third, and fifth periods P1, P3, and P5 may correspond to first node initialization phase for initializing the voltage of the first node N1 of the first transistor T1.

The above-described second, fourth, and sixth periods P2, P4, and P6 may correspond to a threshold voltage compensation phase for substantially compensating for the threshold voltage change of the first transistor T1 by turning on the third transistor T3, thereby electrically connecting the first node N1 and the third node N3.

The first node initialization phase and the threshold voltage compensation phase may be consecutively performed. The first node initialization phase and the threshold voltage compensation phase may be repeated twice or more.

Figure 10:
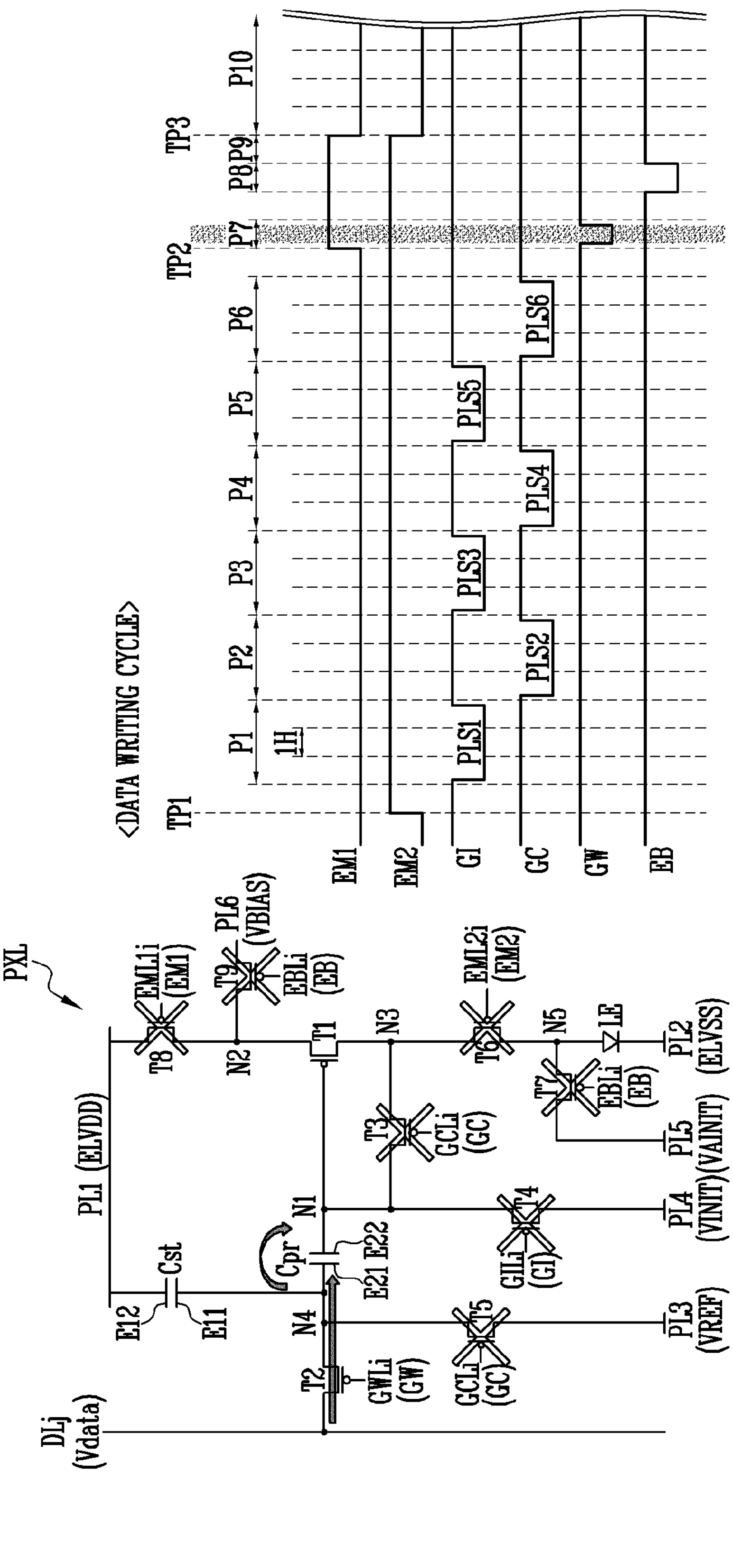
FIG. 10 is a diagram illustrating a seventh period of the timing diagram shown in FIG. 3 together with the pixel structure shown in FIG. 2.

FIG. 10 is a diagram illustrating the seventh period P7 of the timing diagram shown in FIG. 3 together with the pixel PXL structure shown in FIG. 2.

In the seventh period P7, the first scan signal GW having the turn-on level may be input. In the seventh period P7, the first emission control signal EM1 having the turn-off level, the second emission control signal EM2 having the turn-off level, the third scan signal GI having the turn-off level, the second scan signal GC having the turn-off level, and the third emission control signal EB having the turn-off level may be input.

When the first scan signal GW having the turn-on level is input, a data voltage Vdata applied to the data line DLj may be applied to the fourth node N4, and the first capacitor Cst may store a voltage corresponding to the data voltage Vdata.

Meanwhile, as the voltage of the fourth node N4 is changed from the third power voltage VREF to the data voltage Vdata, the voltage level of the second electrode E22 of the second capacitor Cpr is changed by a voltage level corresponding to that the voltage level of the first electrode E21 is changed. This may result from a coupling phenomenon of a capacitor. Accordingly, the voltage level of the second electrode E22 of the second capacitor Cpr is changed by a voltage corresponding to a voltage difference between the data voltage Vdata and the third power voltage VREF (i.e., Vdata-VREF).

Therefore, the voltage of the second electrode E22 of the second capacitor Cpr (i.e., the voltage of the first node N1; briefly designated as N1 in the following Expression 1) is shown in the following Expression 1:

$$N1{:}ELVDD-Vth+Vdata-VREF \quad \text{Expression 1}$$

In Expression 1, ELVDD corresponds to the first power voltage ELVDD, Vth corresponds to the threshold voltage of the first transistor T1, Vdata corresponds to a data voltage input to the pixel PXL in a corresponding frame, and VREF corresponds to the third power voltage VREF.

Thus, the threshold voltage Vth change of the first transistor T1 can be compensated, and a voltage corresponding to the data voltage Vdata can be applied to the first node N1 of the first transistor T1.

Moreover, the seventh period P7 in which the data voltage Vdata is input to the pixel PXL is distinguished from the first to sixth period P1, . . . , and P6 as the "threshold voltage compensation period." Accordingly, although a length of the seventh period P7 in which the data voltage Vdata is input to the pixel PXL is shortened, the length of the "threshold voltage compensation period" can be sufficiently secured. Thus, the display device 100 (see FIG. 1) having a high resolution, in which a plurality of pixel rows is arranged, can be implemented. In addition, the display device 100 capable of displaying an image at a high frame frequency can be provided.

Figure 11:
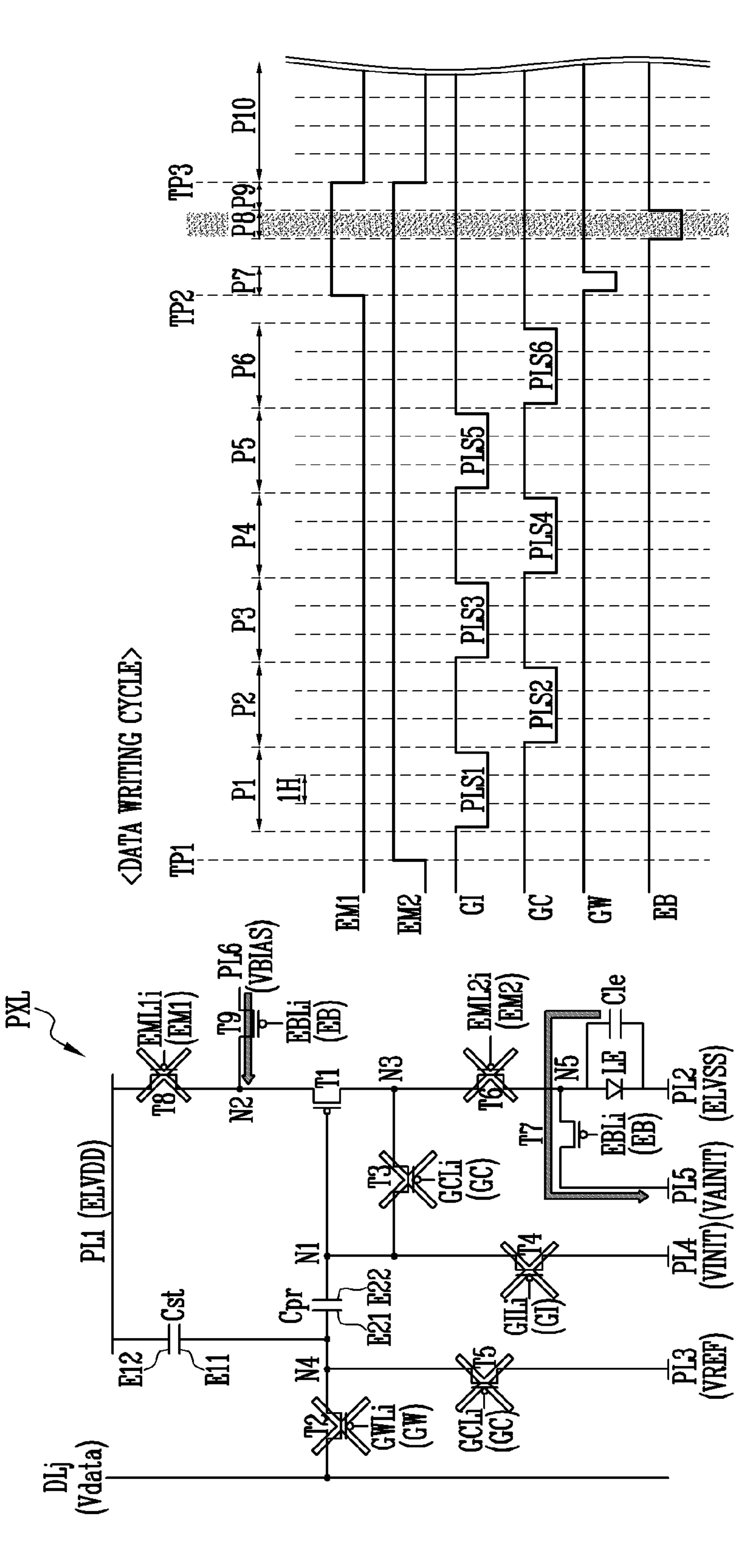
FIG. 11 is a diagram illustrating an eighth period of the timing diagram shown in FIG. 3 together with the pixel structure shown in FIG. 2.

FIG. 11 is a diagram illustrating the eighth period P8 of the timing diagram shown in FIG. 3 together with the pixel PXL structure shown in FIG. 2.

In the eighth period P8, the third emission control signal EB having the turn-on level may be input. In the eighth period P8, the first emission control signal EM1 having the turn-off level, the second emission control signal EM2 having the turn-off level, the third scan signal GI having the turn-off level, the second scan signal GC having the turn-off level, and the first scan signal GW having the turn-off level may be input.

As the third emission control signal EB having the turn-on level is input, the sixth power voltage VBIAS may be input to the second node N2. Accordingly, the first transistor T1 can be pre-adjusted to have a specific voltage-current transfer characteristic.

Figure 12:
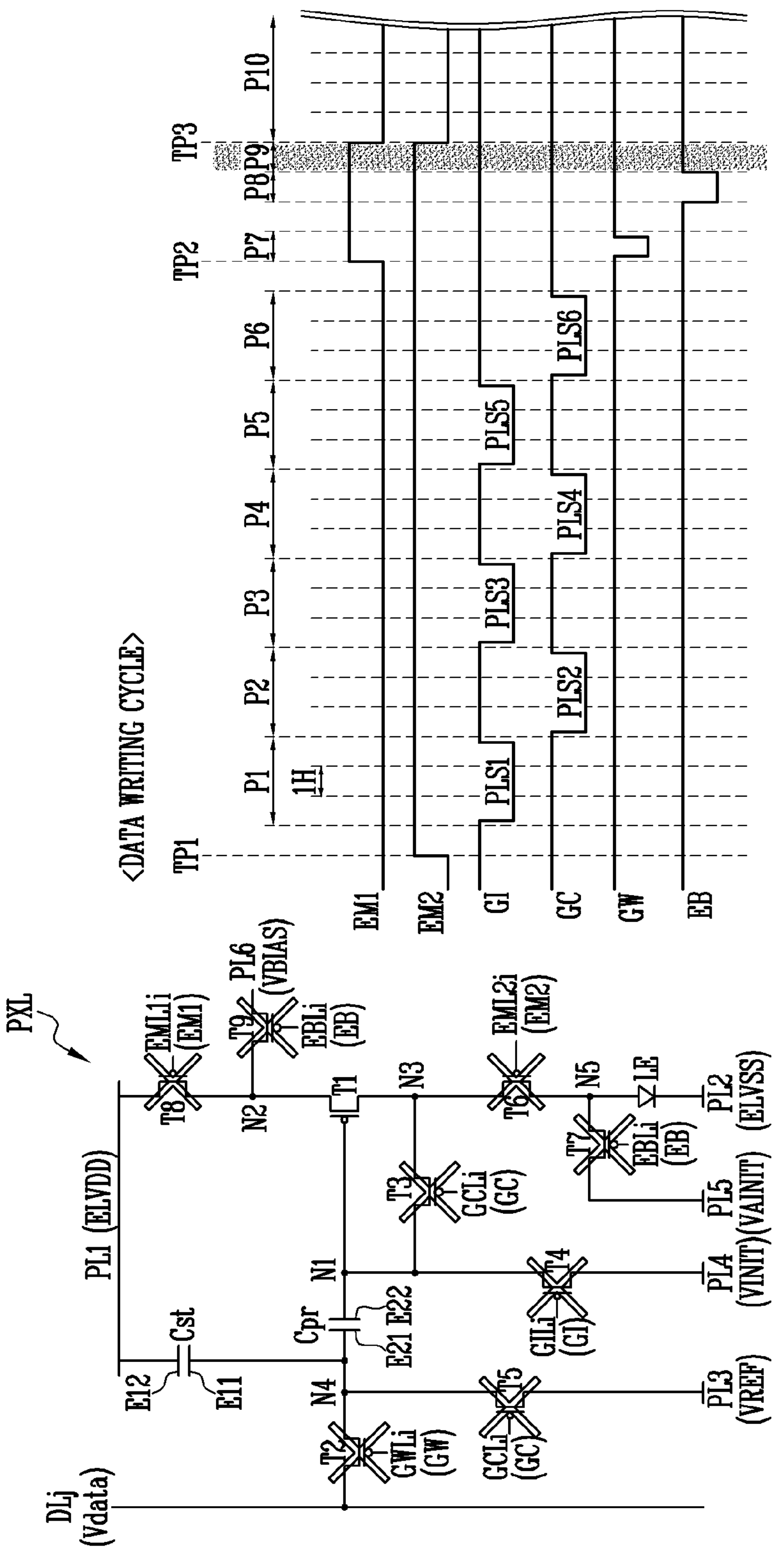
FIG. 12 is a diagram illustrating a ninth period of the timing diagram shown in FIG. 3 together with the pixel structure shown in FIG. 2.

FIG. 12 is a diagram illustrating the ninth period P9 of the timing diagram shown in FIG. 3 together with the pixel PXL structure shown in FIG. 2.

In the ninth period P9, the first emission control signal EM1 having the turn-off level, the second emission control signal EM2 having the turn-off level, the third scan signal GI having the turn-off level, the second scan signal GC having the turn-off level, the first scan signal GW having the turn-off level, and the third emission control signal EB having the turn-off level may be input.

As the ninth period P9 exists between the eighth period P8 and the tenth period P10, a temporal margin can be secured between a period in which the sixth power voltage VBIAS is applied to the second node N2 of the first transistor T1 and a period in which the light emitting element LE emits light.

Figure 13:
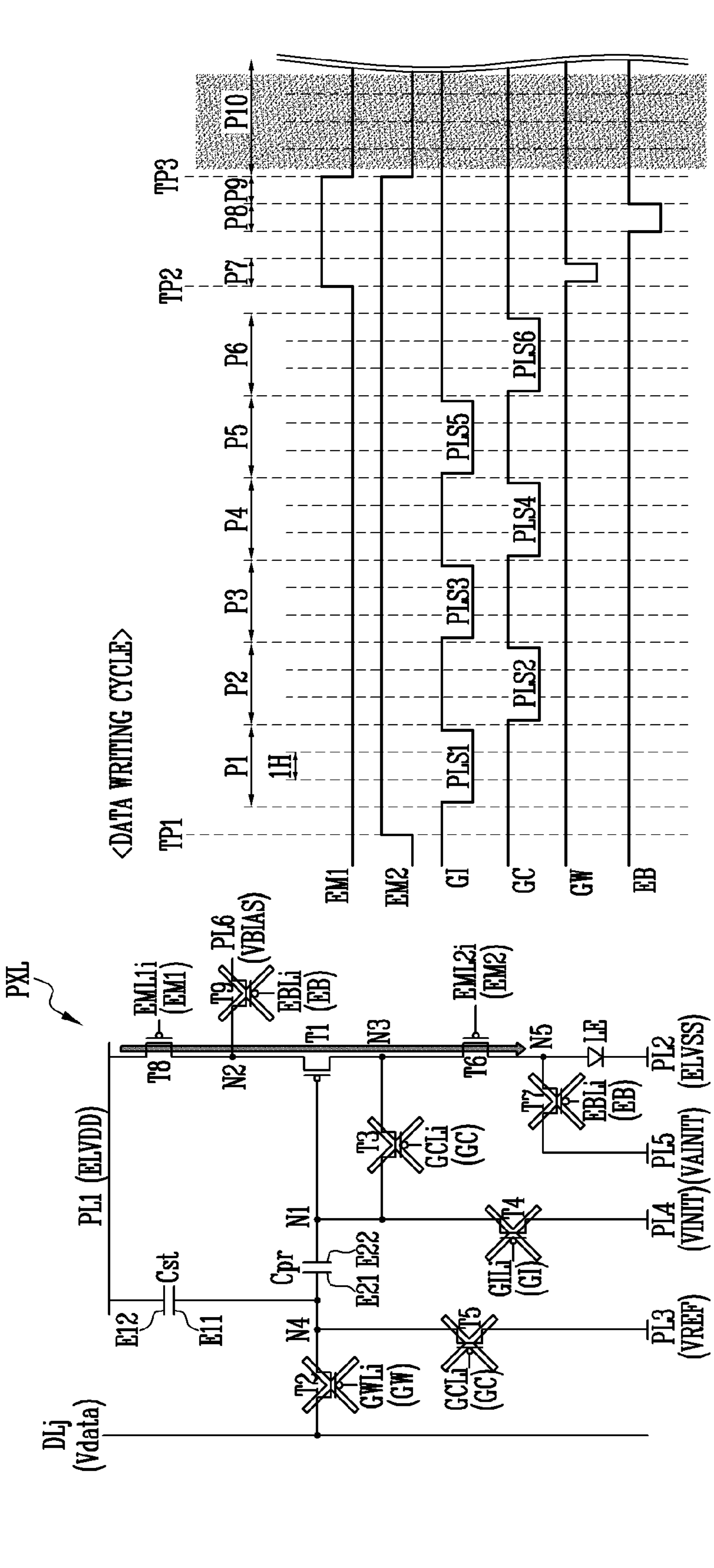
FIG. 13 is a diagram illustrating a tenth period of the timing diagram shown in FIG. 3 together with the pixel structure shown in FIG. 2.

FIG. 13 is a diagram illustrating the tenth period P10 of the timing diagram shown in FIG. 3 together with the pixel PXL structure shown in FIG. 2.

In the tenth period P10, the first emission control signal EM1 having the turn-on level and the second emission control signal EM2 having the turn-on level may be input.

In the tenth period P10, the third scan signal GI having the turn-off level, the second scan signal GC having the turn-off level, the first scan signal GW having the turn-off level, and the third emission control signal EB having the turn-off level may be input.

As the first emission control signal EM1 having the turn-on level is input in the tenth period P10, the voltage of the second node N2 of the first transistor T1 is changed from the sixth power voltage VBIAS to the first power voltage ELVDD.

As the first emission control signal EM1 having the turn-on level and the second emission control signal EM2 having the turn-on level are input in the tenth period P10, a driving current may flow through the light emitting element LE from the first transistor T1. For such a reason, the tenth period P10 is referred to as an emission period.

Meanwhile, the driving current flowing through the light emitting element LE in the tenth period P10 may be calculated to according to the following Expression 2:

$$\begin{aligned} I_{LE} &= \frac{1}{2}uCox\frac{W}{L}(Vsg - Vth)^2 \\ &= \frac{1}{2}uCox\frac{W}{L}((ELVDD) - \\ &\quad (ELVDD - Vth + Vdata - VREF) - Vth)^2 \\ &= \frac{1}{2}uCox\frac{W}{L}(VREF - Vdata)^2 \end{aligned} \quad \text{Expression 2}$$

In Expression 2, "ILE" denotes the driving current flowing through the light emitting element LE, "u" denotes a mobility of the first transistor T1, "Cox" denotes a parasitic capacitance of the first transistor T1, "W" denotes a channel width of the first transistor T1, "L" denotes a channel length of the first transistor T1, "Vsg" denotes a voltage difference (i.e., Vs−Vg) between the source electrode and the gate electrode of the first transistor T1, and "Vth" denotes the threshold voltage of the first transistor T1.

In addition, "ELVDD" denotes the first power voltage ELVDD as the voltage of the second node N2 of the first transistor T1 (i.e., a voltage of a source node of the first transistor T1), and "ELVDD-Vth+Vdata-VREF" denotes the voltage of the first node N1 of the first transistor T1 (i.e., the voltage of the gate electrode of the first transistor T1).

Accordingly, the driving current ILE flowing through the light emitting element LE is not influenced by the threshold Vth change of the first transistor T1, so that visibility can be improved.

The data writing cycle DATA WRITING CYCLE may include the first to tenth periods P1 to P10, so that a compensation operation of the threshold voltage Vth change of the first transistor T1, a data writing operation, an emission operation, and the like can be performed.

Figure 14:
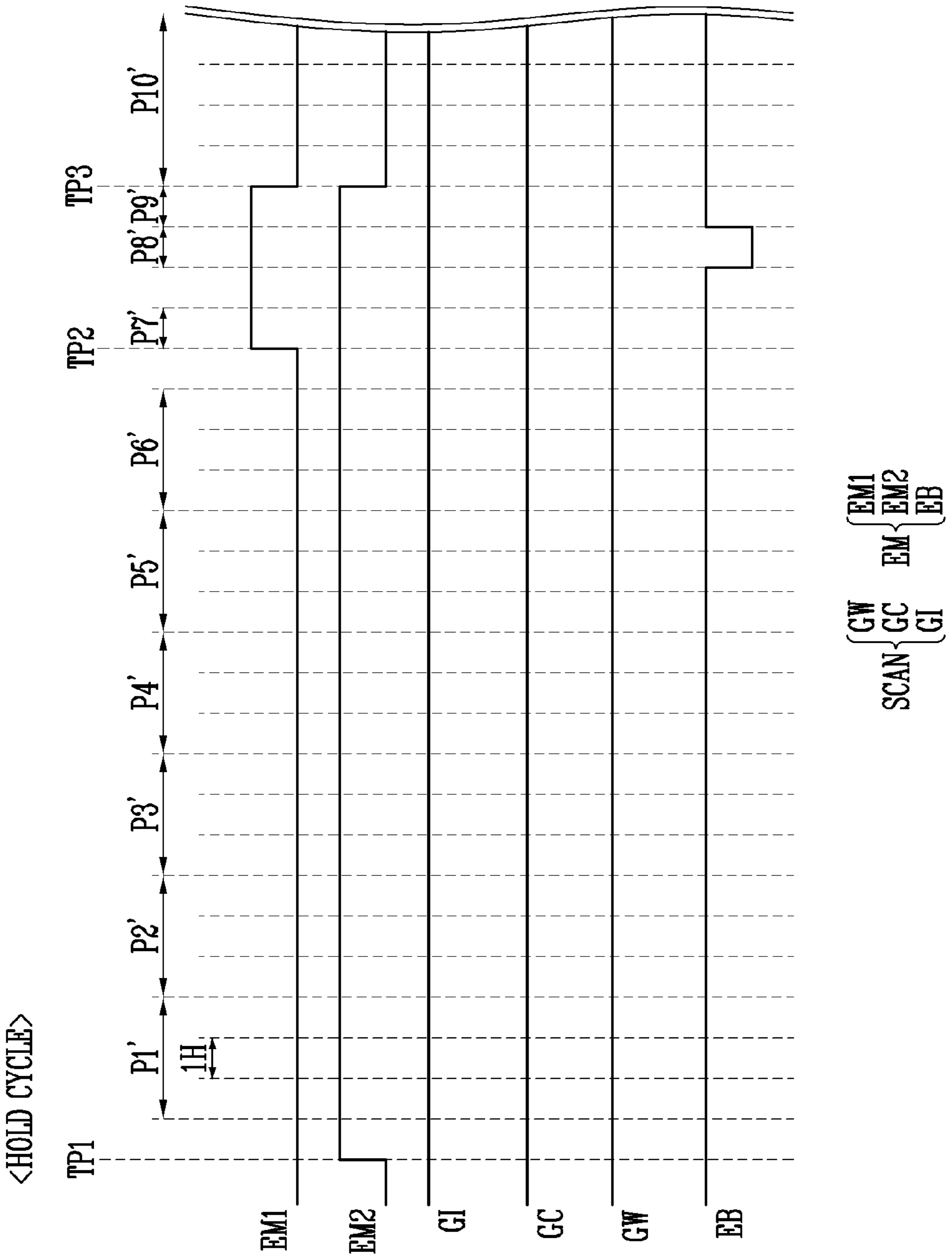
FIG. 14 is an example of a timing diagram of a hold cycle for driving the pixel shown in FIG. 2.

FIG. 14 is an example of a timing diagram of a hold cycle HOLD CYCLE for driving the pixel shown in FIG. 2.

The hold cycle HOLD CYCLE is a period in which light is emitted by using data written in the pixel in a previous data writing cycle as it is, so that an image is again displayed without changing any frame. That is, one frame may include one data writing cycle, and include at least one hold cycle HOLD CYCLE. The at least one hold cycle HOLD CYCLE may consecutively exist after the data writing cycle.

As compared with the above-described data writing cycle DATA WRITING CYCLE, in the hold cycle HOLD CYCLE, an operation for compensating for the threshold voltage of the first transistor and an operation for writing data are omitted, and an emission operation may be performed.

A length of the hold cycle HOLD CYCLE may be equal to the length of the data writing cycle DATA WRITING CYCLE (see FIG. 3). The hold cycle HOLD CYCLE may include first to tenth periods P1', . . . , and P10' corresponding to the first to tenth periods P1, . . . , and P10 in the data writing cycle DATA WRITING CYCLE. The first to sixth periods P1', . . . , and P6' may exist between a first time TP1 (or a first timing TP1) and a second time TP2 (or a second timing TP2). The seventh to ninth periods P7', P8', and P9' may exist between the second time TP2 and a third time TP3 (or a third timing TP3). The tenth period P10' may exist after the third time TP3.

Figure 15:
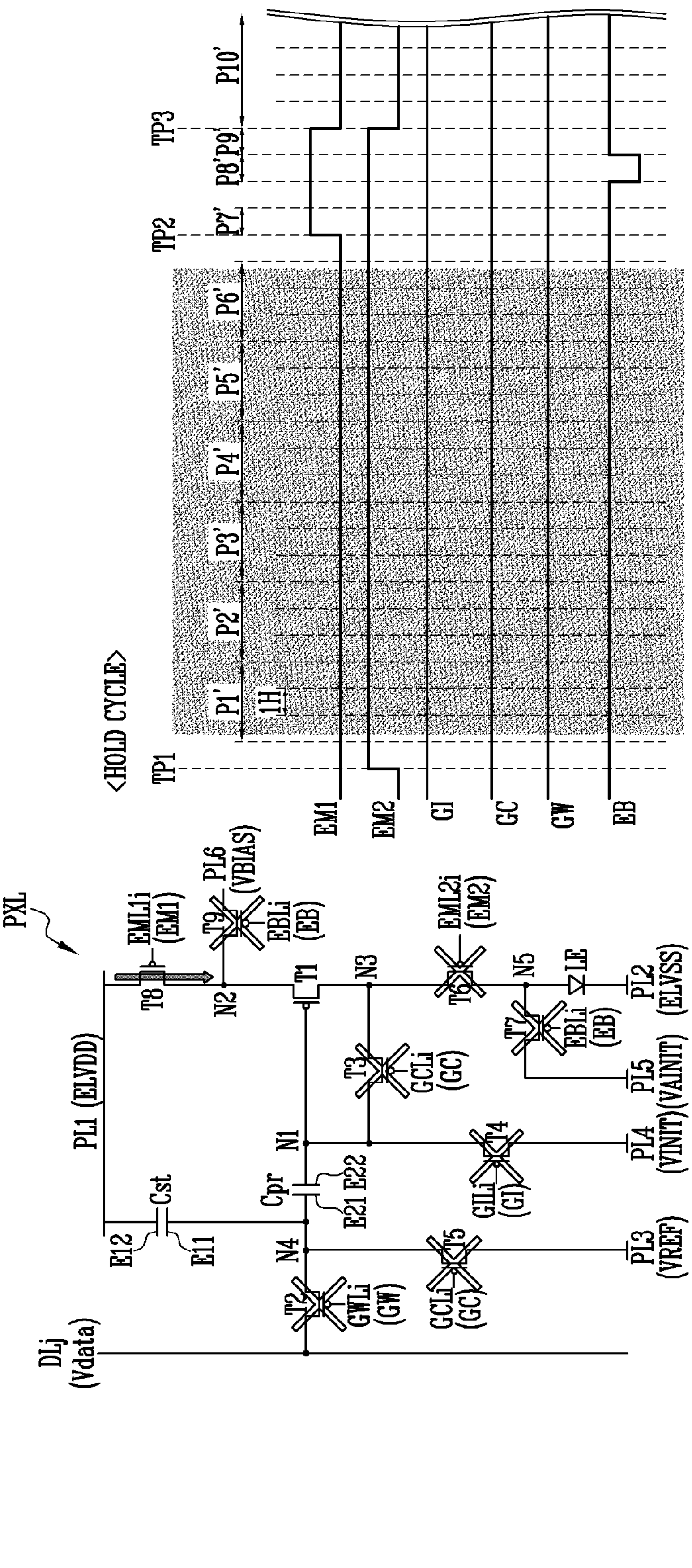
FIG. 15 is a diagram illustrating first to sixth periods of the timing diagram shown in FIG. 14 together with the pixel structure shown in FIG. 2.

FIG. 15 is a diagram illustrating the first to sixth periods P1', . . . , and P6' of the timing diagram shown in FIG. 14 together with the pixel PXL structure shown in FIG. 2.

In the first to sixth periods P1', . . . , and P6', the first emission control signal EM1 having the turn-on level may be input. In the first to sixth periods P1, . . . , and P6, the second emission control signal EM2 having the turn-off level, the third scan signal GI having the turn-off level, the second scan signal GC having the turn-off level, the first scan signal GW having the turn-off level, and the third emission control signal EB having the turn-off level may be input.

As the first emission control signal EM1 is input in the first to sixth periods P1', . . . , and P6', the first power voltage ELVDD is applied to the second node N2 of the first transistor T1.

Since the first scan signal GW having the turn-off level, the second scan signal GC having the turn-off level, and the third scan signal GI having the turn-off level are input in the hold cycle HOLD CYCLE, the voltage of the first node N1 of the first transistor T1 may be equal or similar to the voltage applied to the first node N1 in the emission period of the data writing cycle DATA WRITING CYCLE (see FIG. 13). That is, in the first to sixth periods P1', . . . , and P6', the voltage of the first node N1 of the first transistor T1 may be equal or similar to "ELVDD-Vth+Vdata-VREF" (see the above-described Expression 2).

Figure 16:
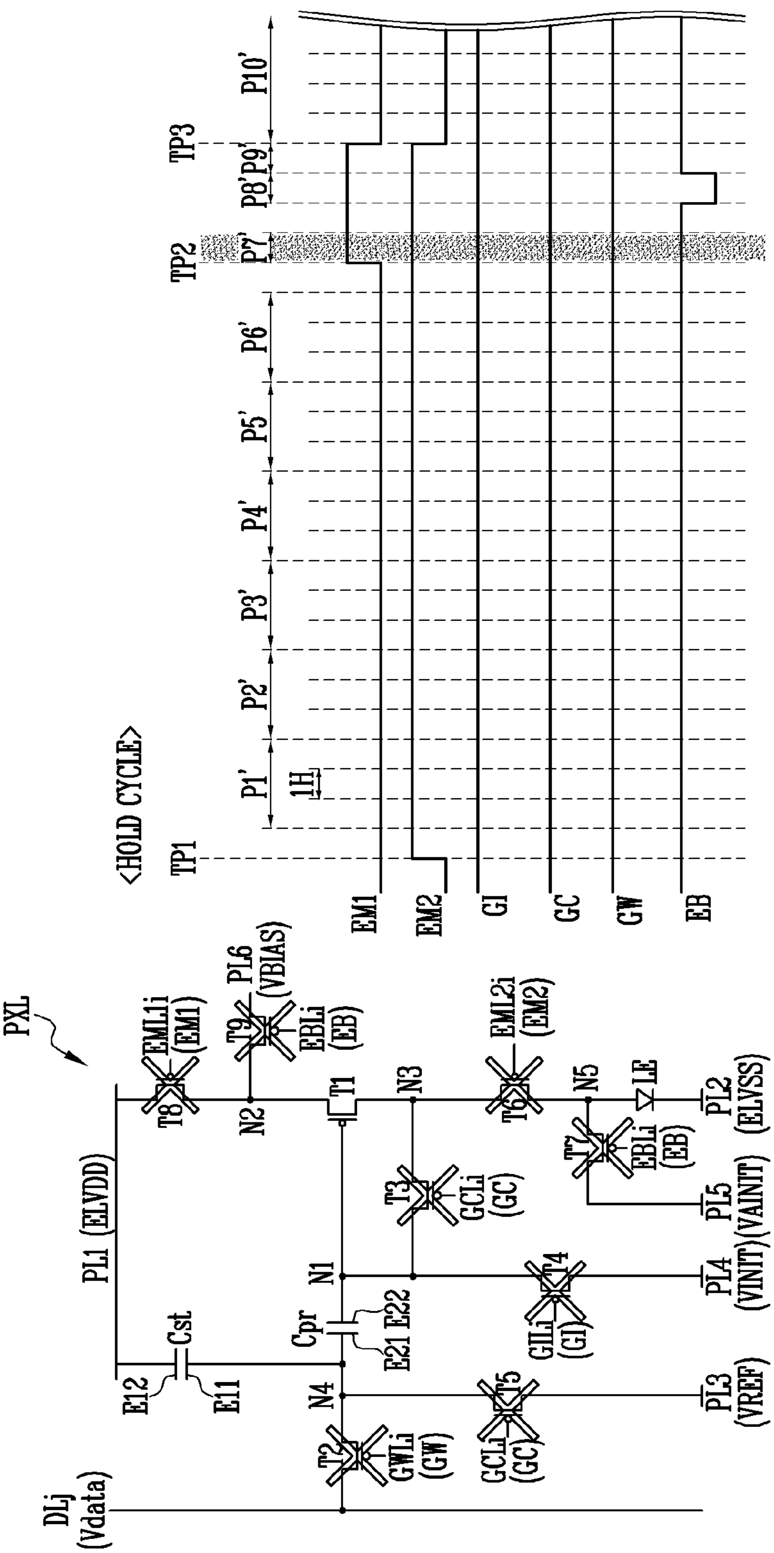
FIG. 16 is a diagram illustrating a seventh period of the timing diagram shown in FIG. 14 together with the pixel structure shown in FIG. 2.

FIG. 16 is a diagram illustrating the seventh period P7' of the timing diagram shown in FIG. 14 together with the pixel PXL structure shown in FIG. 2.

The seventh period P7' may be a period in which a margin is provided to temporally separate the first to sixth periods P1', . . . , and P6' and the eighth period P8' from each other.

In the seventh period P7', the first emission control signal EM1 having the turn-off level, the second emission control signal EM2 having the turn-off level, the third scan signal GI having the turn-off level, the second scan signal GC having the turn-off level, the first scan signal GW having the turn-off level, and the third emission control signal EB having the turn-off level may be input to the pixel PXL.

The seventh period P7' may be a state in which any static voltage is not applied to the second node N2 of the first transistor T1.

Figure 17:
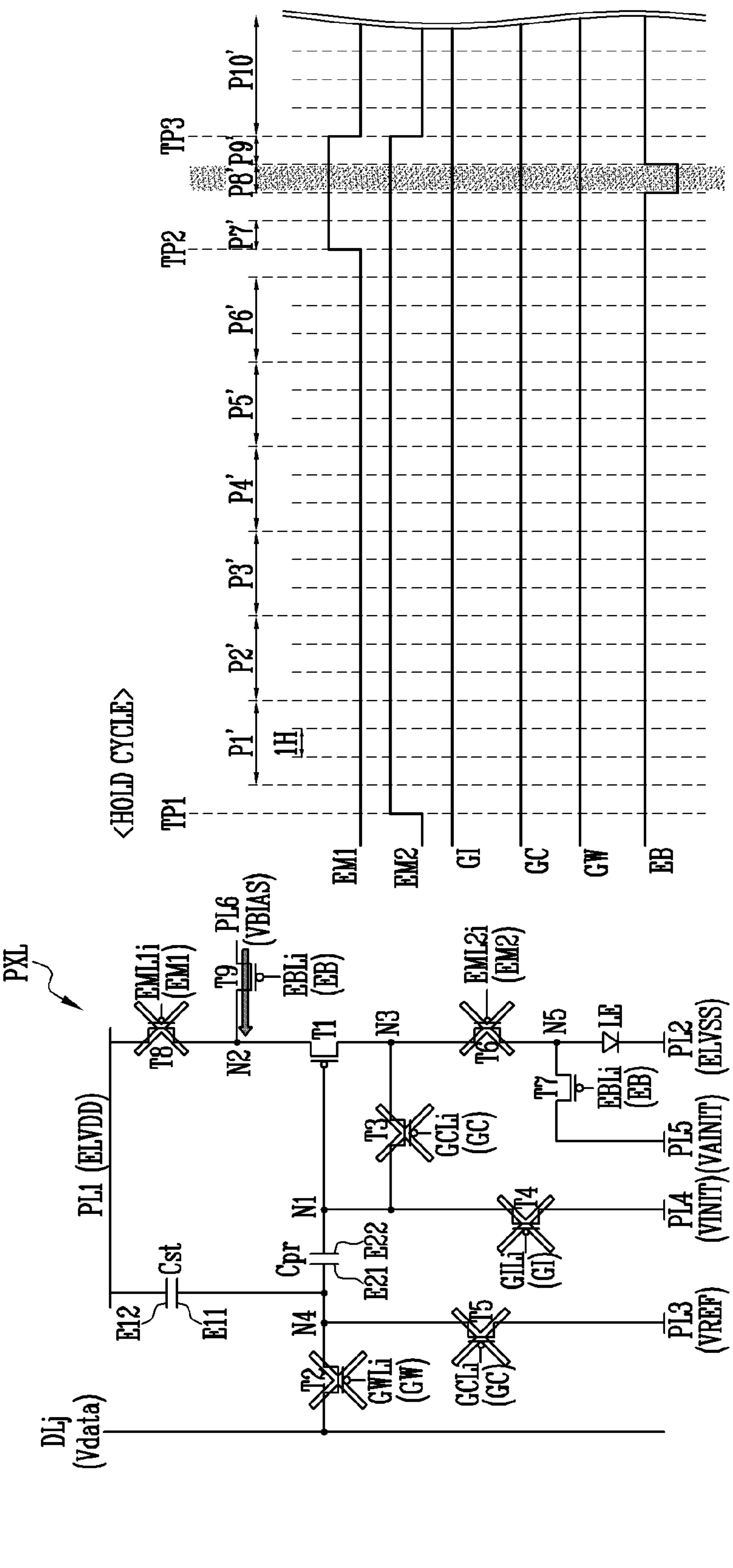
FIG. 17 is a diagram illustrating an eighth period of the timing diagram shown in FIG. 14 together with the pixel structure shown in FIG. 2.

FIG. 17 is a diagram illustrating the eighth period P8' of the timing diagram shown in FIG. 14 together with the pixel PXL structure shown in FIG. 2.

The eighth period P8' may be a period in which the sixth power voltage VBIAS is applied to the second node N2 of the first transistor T1, thereby adjusting a transfer characteristic of the first transistor T1 such that the first transistor T1 has a specific voltage-current transfer characteristic. Accordingly, a phenomenon in which the threshold voltage of the first transistor T1 is shifted during emitting light can be reduced.

In the eighth period P8', the third emission control signal EB having the turn-on level may be input. In the eighth period P8', the first emission control signal EM1 having the turn-off level, the second emission control signal EM2 having the turn-off level, the third scan signal GI having the turn-off level, the second scan signal GC having the turn-off level, and the first scan signal GW having the turn-off level may be input.

Figure 18:
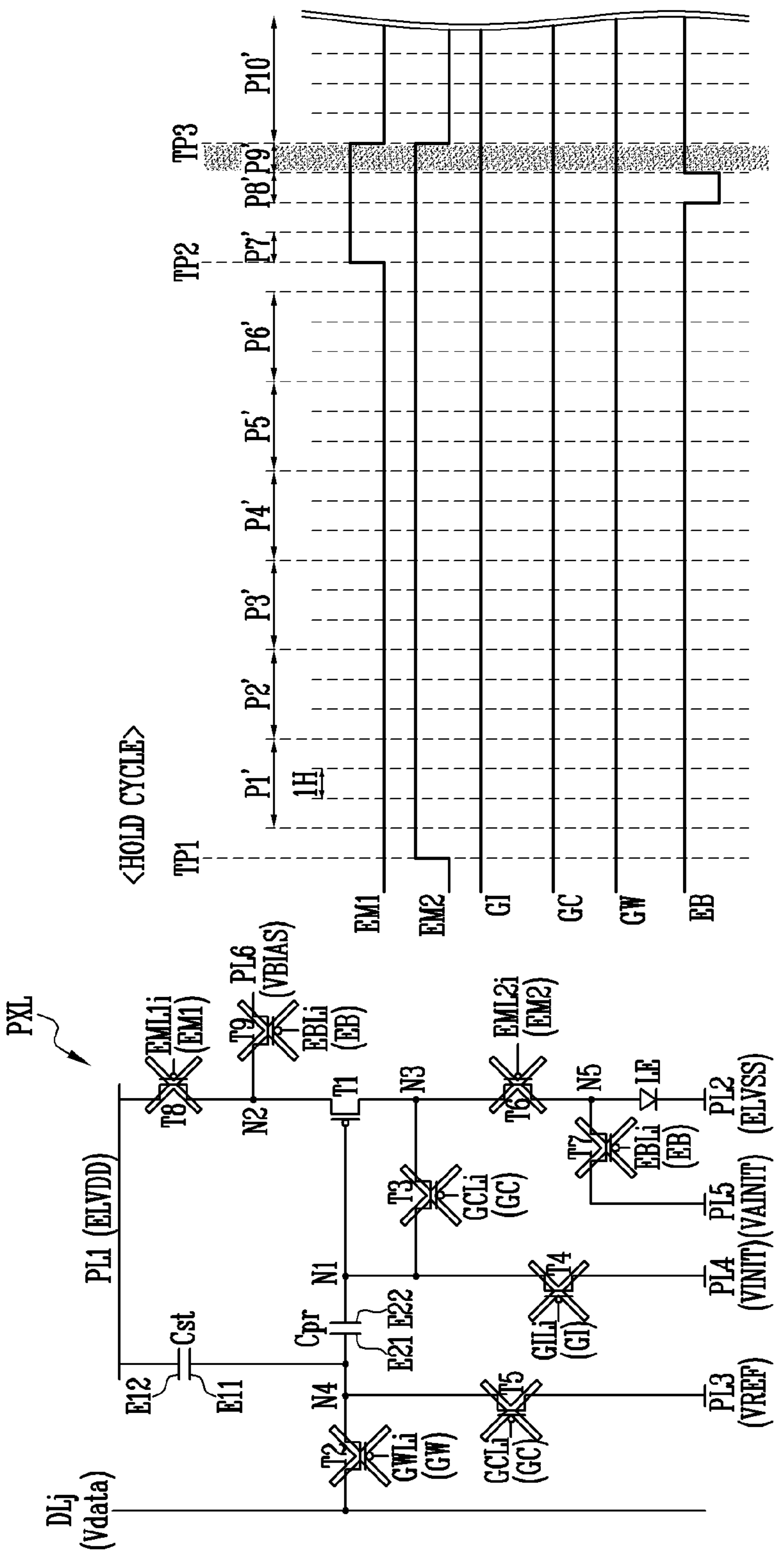
FIG. 18 is a diagram illustrating a ninth period of the timing diagram shown in FIG. 14 together with the pixel structure shown in FIG. 2.

FIG. 18 is a diagram illustrating the ninth period P9' of the timing diagram shown in FIG. 14 together with the pixel PXL structure shown in FIG. 2.

The ninth period P9' may be a period in which a margin is provided to temporally separate the eighth period P8' and the tenth period P10' from each other.

In the ninth period P9', the first emission control signal EM1 having the turn-off level, the second emission control signal EM2 having the turn-off level, the third scan signal GI having the turn-off level, the second scan signal GC having the turn-off level, the first scan signal GW having the turn-off level, and the third emission control signal EB having the turn-off level may be input.

Figure 19:
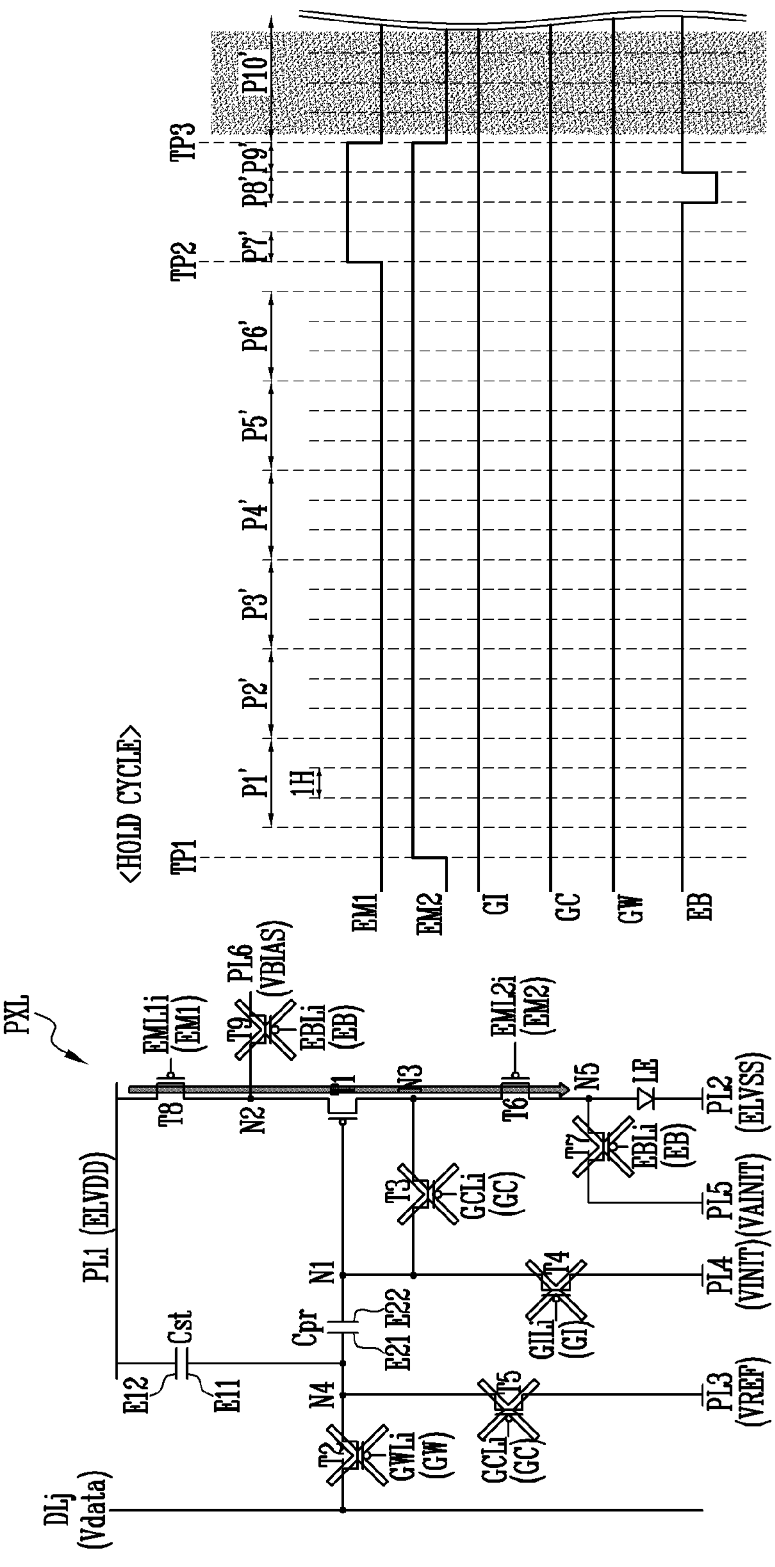
FIG. 19 is a diagram illustrating a tenth period of the timing diagram shown in FIG. 14 together with the pixel structure shown in FIG. 2.

FIG. 19 is a diagram illustrating the tenth period P10' of the timing diagram shown in FIG. 14 together with the pixel PXL structure shown in FIG. 2.

The tenth period P10' may be a period in which the light emitting element LE emits light. The light emitting element LE may emit light, based on a data voltage Vdata stored in a data writing cycle before a corresponding hold cycle HOLD CYCLE.

When the hold cycle HOLD CYCLE enters into the tenth period P10, the voltage of the second node N2 of the first transistor T1 is changed to the first power voltage ELVDD. A magnitude of a driving current flowing through the light emitting element LE is calculated like the above-described Expression 2, and therefore, its descriptions will be omitted.

Accordingly, the display device 100 (see FIG. 1) in accordance with the embodiments of the present disclosure is provided with the data writing cycle DATA WRITING CYCLE (see FIG. 3) and the hold cycle HOLD CYCLE, thereby implementing various frame frequencies.

In the hold cycle HOLD CYCLE, the first scan signal GW having the turn-off level, the second scan signal GC having the turn-off level, and the third scan signal GI having the turn-off level are consecutively input to the pixel PXL. Thus, in the hold cycle HOLD CYCLE, the scan driving circuit 130 (see FIG. 1) can be easily controlled.

Also, in the hold cycle HOLD CYCLE, the first emission control signal EM1 having the turn-on level, the second emission control signal EM2 having the turn-on level, and the third emission control signal EB having the turn-on level may be input to the pixel PXL at the same timing as the data writing cycle DATA WRITING CYCLE (see FIG. 3).

Accordingly, in the data writing cycle DATA WRITING CYCLE and the hold cycle HOLD CYCLE, the emission driving circuit 140 (see FIG. 1) can be equally controlled, and thus simplified display device 100 (see FIG. 1) can be provided.

Figure 20:
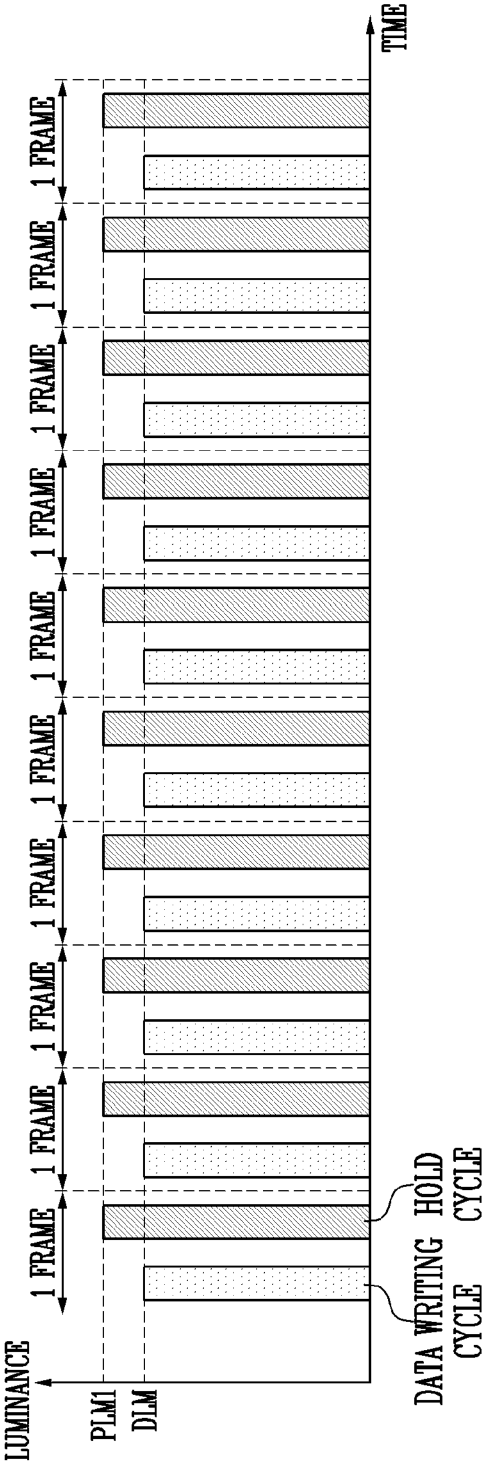
FIG. 20 is a diagram exemplarily illustrating high speed driving in the display device in accordance with embodiments of the present disclosure.

FIG. 20 is a diagram exemplarily illustrating high speed driving in the display device 100 (see FIG. 1) in accordance with embodiments of the present disclosure.

In the high speed driving, one frame 1 FRAME may include one data writing cycle DATA WRITING CYCLE and at least one hold cycle HOLD CYCLE. In some cases, in the high speed driving, the one frame 1 FRAME may include only one data writing cycle DATA WRITING CYCLE.

In FIG. 20, a case where the one frame 1 FRAME may include one data writing cycle DATA WRITING CYCLE and one hold cycle HOLD CYCLE is exemplarily illustrated.

For example, when an image is displayed at a frame frequency of 240 Hz, each of the data writing cycle DATA WRITING CYCLE and the hold cycle HOLD CYCLE may have a frequency of 480 Hz. Alternatively, when an image is displayed at a frame frequency of 144 Hz, each of the data writing cycle DATA WRITING CYCLE and the hold cycle HOLD CYCLE may have a frequency of 288 Hz.

That is, the display device 100 (see FIG. 1) in accordance with the embodiments of the present disclosure may display an image in the data writing cycle DATA WRITING CYCLE and the hold cycle HOLD CYCLE, which have a frequency faster than a maximum frame frequency.

Hereinafter, for convenience of description, a case where the frame frequency shown in FIG. 20 is 240 Hz is assumed and described. However, the present disclosure is not limited thereto.

Referring to FIG. 20, a luminance DLM in the data writing cycle DATA WRITING CYCLE and a first peak luminance PLM1 in the hold cycle HOLD CYCLE when an image having the same grayscale is continuously displayed in the high speed driving are illustrated.

The first peak luminance PLM1 in the hold cycle HOLD CYCLE has a value higher than a value of the luminance DLM in the data writing cycle DATA WRITING CYCLE. Such a difference in luminance may result from that the first voltage ELVDD is applied as a bias voltage to the second node N2 of the first transistor T1 during the first to sixth periods P1', . . . , and P6' of the hold cycle HOLD CYCLE (see FIG. 15).

In the data writing cycle DATA WRITING CYCLE and the hold cycle HOLD CYCLE, voltage-current transfer characteristics of the first transistor T1 may be different from each other in the eighth periods P8 and P8' (respectively see FIGS. 11 and 17) in which the sixth power voltage VBIAS is applied as a bias voltage to the first transistor T1. It is identified that the value of the luminance DLM in the data writing cycle DATA WRITING CYCLE and the value of the first peak luminance PLM1 in the hold cycle HOLD CYCLE are differently represented.

A user of the display device 100 (see FIG. 1) may recognize a luminance of one frame 1 FRAME as any value (e.g., an average value) between the luminance DLM in the data writing cycle DATA WRITING CYCLE and the first peak luminance PLM1 in the hold cycle HOLD CYCLE.

Figure 21A:
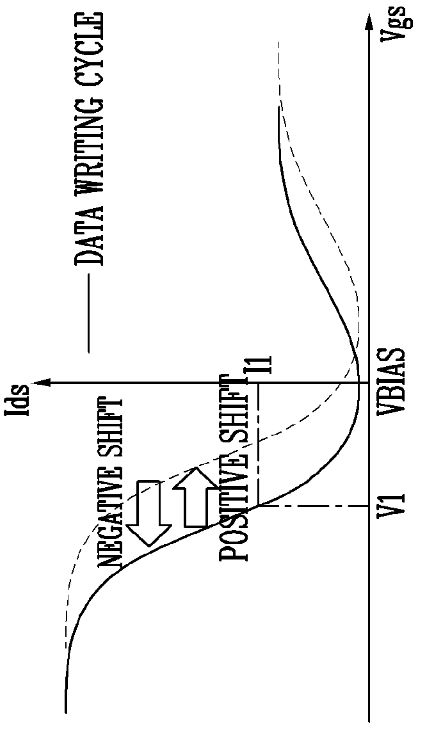
FIGS. 21A and 21B are diagrams briefly illustrating a cause due to which a luminance difference occurs between a data writing cycle and a hold cycle.
Figure 21B:
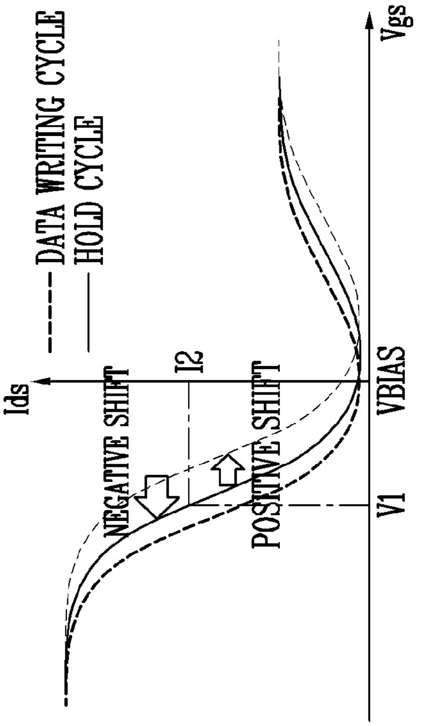

FIGS. 21A and 21B are diagrams briefly illustrating a cause due to which a luminance difference occurs between the data writing cycle DATA WRITING CYCLE and the hold cycle HOLD CYCLE.

A graph shown in FIGS. 21A and 21B represent a transfer characteristic of the first transistor T1 (see FIG. 2) of the pixel.

A graph shown in FIG. 21A is a diagram illustrating that the voltage-current transfer characteristic of the first transistor T1 is entirely negative-shifted and then positive shifted by applying the sixth power voltage VBIAS as the bias voltage in the data writing cycle DATA WRITING CYCLE.

A graph shown in FIG. 21B is a diagram illustrating that the voltage-current transfer characteristic of the first transistor T1 is entirely negative-shifted and then positive shifted by applying the sixth power voltage VBIAS as the bias voltage in the hold cycle HOLD CYCLE.

From the viewpoint of the threshold voltage of the first transistor T1, the threshold voltage of the first transistor T1 is relatively largely negative-shifted in the data writing cycle DATA WRITING CYCLE, and is relatively slightly negative-shifted in the hold cycle HOLD CYCLE.

Although the same sixth power voltage VBIAS is applied as the bias voltage in the data writing cycle DATA WRITING CYCLE and the hold cycle HOLD CYCLE, times to be positive-shifted up to a level at which voltage-current transfer characteristics are the same in the data writing cycle DATA WRITING CYCLE and the hold cycle HOLD CYCLE may be different from each other.

A voltage difference Vgs of the gate-source electrodes of the first transistor T1 (see FIG. 2) and a drain current Ids corresponding to the driving current will be described. When the same voltage difference Vgs of the gate-source electrodes is provided, a magnitude of the drain current Ids in the hold cycle HOLD CYCLE may be greater than a magnitude of the drain current Ids in the data writing cycle DATA WRITING CYCLE. The drain current Ids may correspond to the above-described driving current ILE (see Expression 2).

Referring to FIGS. 21A and 21B, in a condition in which the voltage difference Vgs of the gate-source electrodes of the first transistor is a first voltage V1 as a turn-on level voltage, the magnitude of the drain current Ids in the data writing cycle DATA WRITING CYCLE is a first current I1. On the other hand, in the same condition, the magnitude of the drain current Ids in the hold cycle HOLD CYCLE is a second current I2 greater than the first current I1.

Accordingly, although the same sixth power voltage VBIAS is applied in the data writing cycle DATA WRITING CYCLE and the hold cycle HOLD CYCLE, a luminance of the pixel in the hold cycle HOLD CYCLE may be greater than a luminance of the pixel in the data writing cycle DATA WRITING CYCLE.

Figure 22:
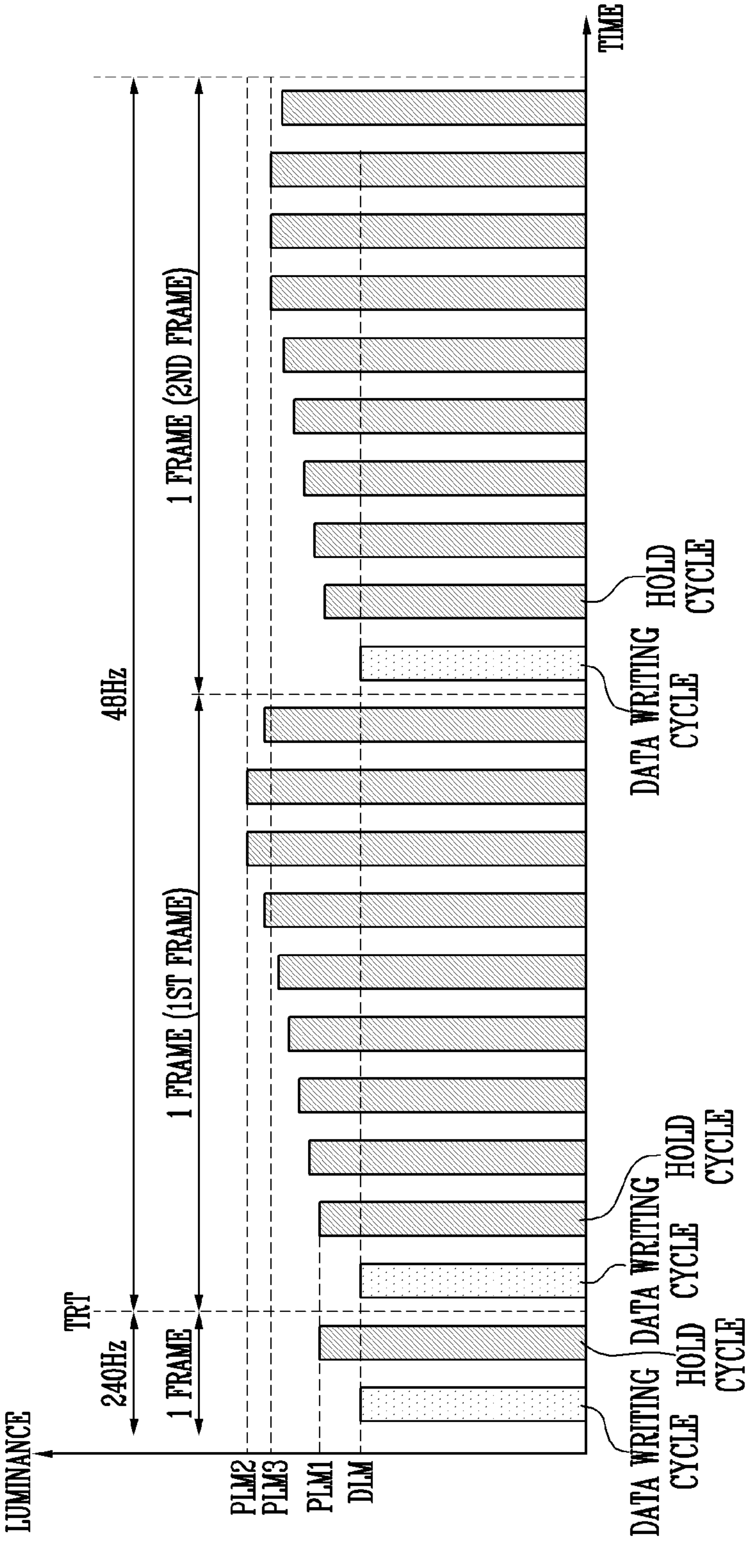
FIG. 22 is a diagram illustrating comparison of high speed driving and low speed driving in the display device in accordance with embodiments of the present disclosure.

FIG. 22 is a diagram illustrating comparison of high speed driving and low speed driving in the display device 100 (see FIG. 1) in accordance with embodiments of the present disclosure.

In the low speed driving, one frame 1 FRAME may include one data writing cycle DATA WRITING CYCLE and at least two hold cycles HOLD CYCLE.

The high speed driving and the low speed driving may be concepts related to each other. In some cases, the high speed driving and the low speed driving may be distinguished from each other with respect to a predetermined frame frequency. Even when different frame frequencies are provided, all the frame frequencies may correspond to the high speed driving or correspond to the low speed driving.

Hereinafter, a frequency of 240 Hz will be described as an example of the high speed driving, and a frequency of 48 Hz or lower will be described as an example of the low speed driving. However, the present disclosure is not limited thereto, and frequencies of the high speed driving and the low speed driving may be determined by using several methods as described above.

Referring to FIG. 22, a transition time TRT (or a transition timing TRT) at which driving of the display device is changed from the high speed driving to the low speed driving is illustrated. A frequency of 240 Hz is exemplarily used for the high speed driving, and a frequency of 48 Hz is exemplarily used for the low speed driving. That is, with respect to the transition time TRT, the high speed driving is made in a precedent period, and the low speed driving is made in a subsequent period.

In the high speed driving, one frame 1 FRAME may include one data writing cycle DATA WRITING CYCLE and one hold cycle HOLD CYCLE. In addition, in the low speed driving, one frame 1 FRAME may include one data writing cycle DATA WRITING CYCLE and consecutive nine hold cycles HOLD CYCLE.

FIG. 22 illustrates a case for displaying an image having the same grayscale in a high speed driving period (240 Hz driving period) and a low speed driving period (48 Hz driving period), and therefore, luminances DLM in data writing cycles DATA WRITING CYCLE are all the same (or the same level).

Meanwhile, in a first frame 1ST FRAME after the transition time TRT, luminances of the nine hold cycles HOLD CYCLE are gradually increased. In the first frame 1ST FRAME after the transition time TRT, a second peak luminance PLM2 is formed at a value higher than a value of a first peak luminance PLM1.

In a second frame 2ND FRAME after the transition time TRT, luminances of the nine hold cycles HOLD CYCLE are gradually increased. In the second frame 2ND FRAME after the transition time TRT, a third peak luminance PLM3 is lower than the second peak luminance PLM2 but is formed at a value higher than the value of the first peak luminance PLM1.

Accordingly, a phenomenon in which the luminance is temporarily largely increased in the first frame 1ST FRAME after the transition time TRT may be viewed. This is viewed as flicker, and such a phenomenon is referred to as a "flicker phenomenon."

Therefore, a plan for decreasing a peak luminance (e.g., PLM2, PLM3 or the like) after the transition time TRT is desirable.

Figure 23:
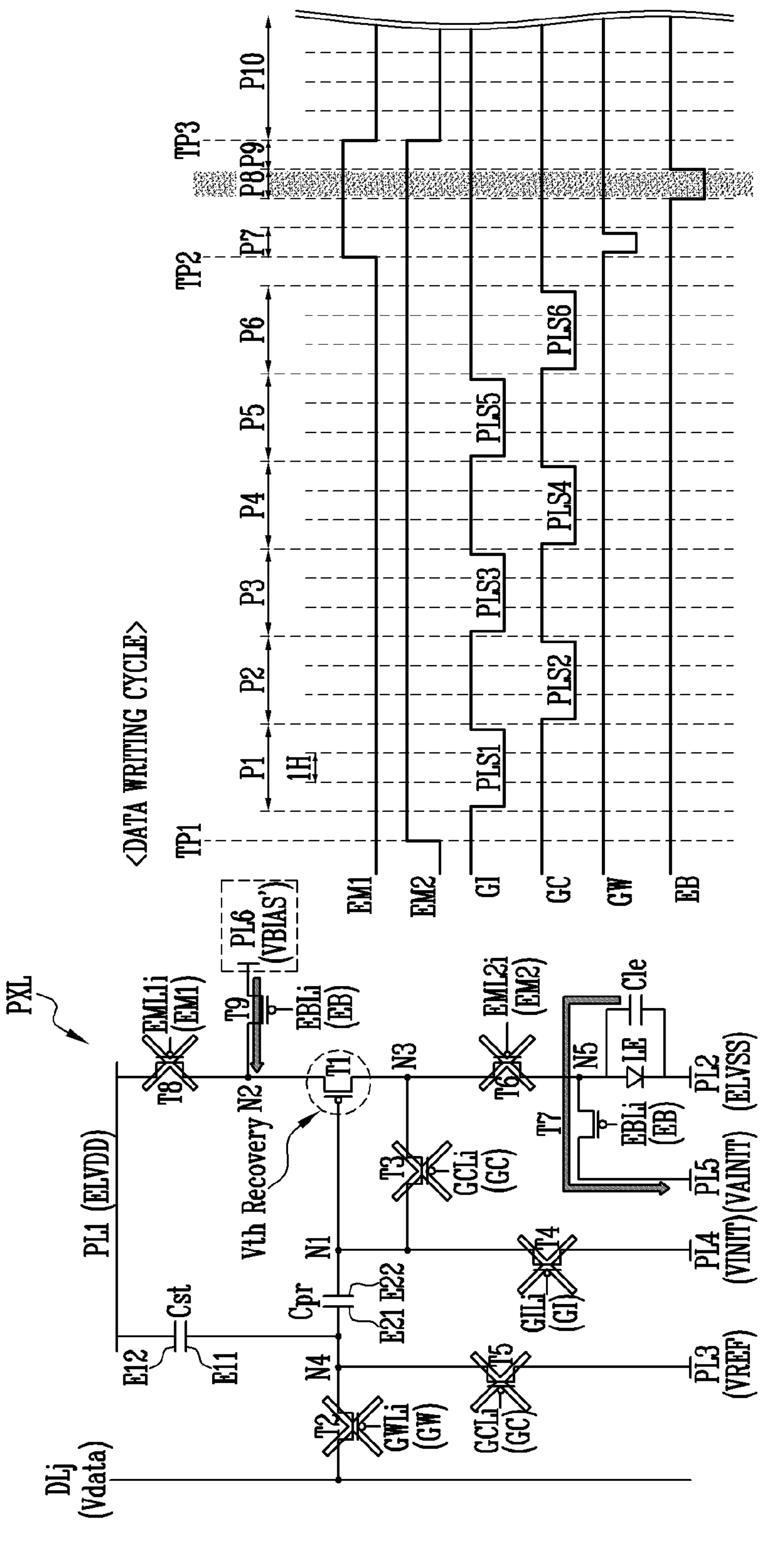
FIG. 23 is a diagram illustrating a threshold voltage recovery phenomenon according to application of a level-shifted sixth power voltage to the pixel in the display device in accordance with embodiments of the present disclosure.

FIG. 23 is a diagram illustrating a threshold voltage recovery phenomenon according to application of a level-shifted sixth power voltage VBIAS' to the pixel in the display device 100 (see FIG. 1) in accordance with embodiments of the present disclosure.

Referring to FIG. 23, the level-shifted sixth power voltage VBIAS' may be applied to the sixth power line PL6.

The level-shifted sixth power voltage VBIAS' may be applied to the second node N2 of the first transistor T1 in the eighth period P8 of the data writing cycles DATA WRITING CYCLE.

The level-shifted sixth power voltage VBIAS' is a voltage higher than the sixth power voltage VBIAS, and may allow the threshold voltage (Vth) of the first transistor T1 to be more rapidly positive-shifted. That is, referring to FIG. 2 described above, as the level-shifted sixth power voltage VBIAS' is applied as a bias voltage of the first transistor T1, a threshold voltage recovery phenomenon (or referred to as a Vth Recovery, or a threshold voltage restoration phenomenon) may be promoted.

Figure 24:
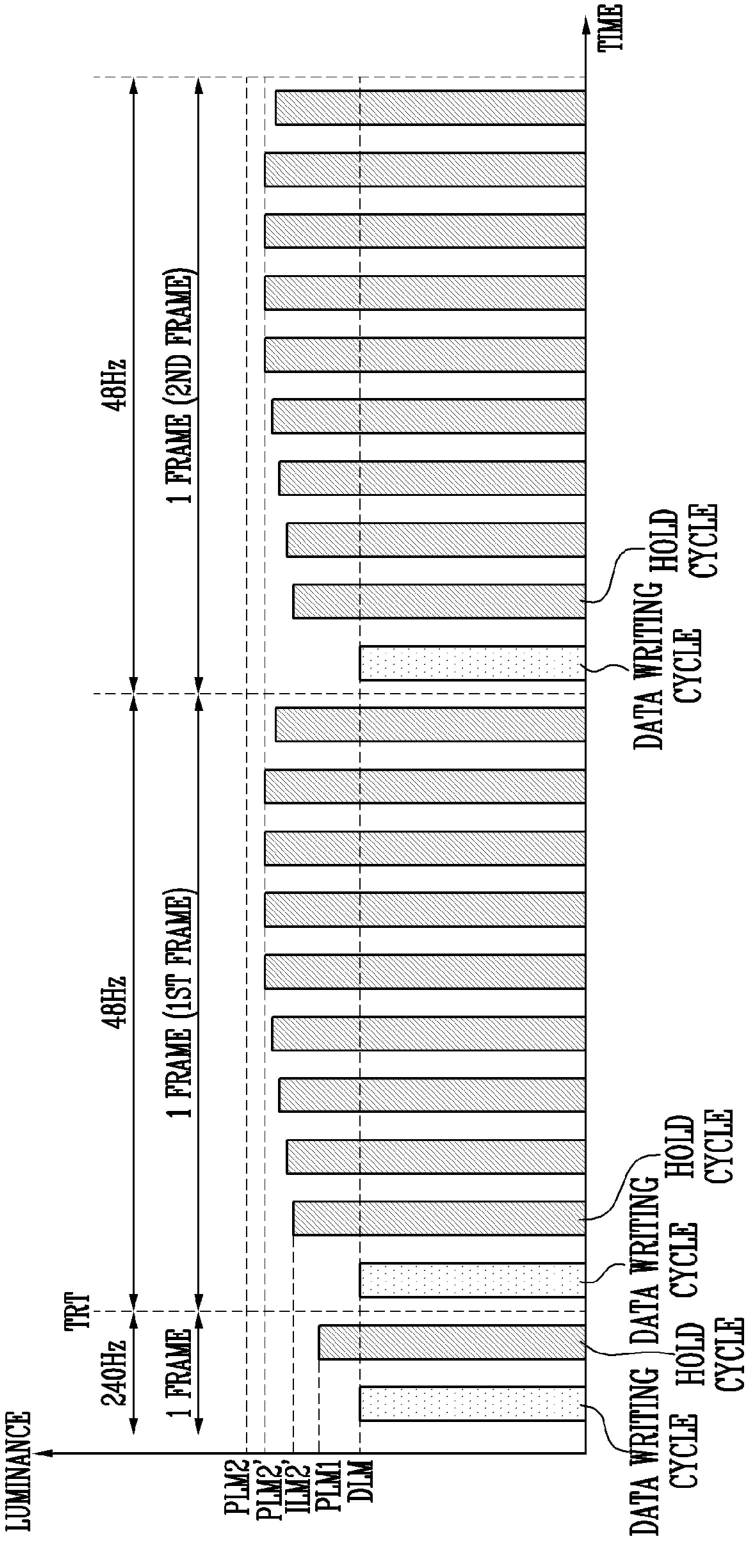
FIG. 24 is a diagram illustrating luminance of the pixel when the level-shifted sixth power voltage is applied to the pixel.

FIG. 24 is a diagram illustrating luminance of the pixel when the level-shifted sixth power voltage is applied to the pixel.

FIG. 24 illustrates luminance change of the pixel when the level-shifted sixth power voltage VBIAS' (see FIG. 23) is applied to the sixth power line PL6 (see FIG. 23) in the first frame 1ST FRAME just after the transition time TRT.

Referring to FIG. 24, in the first frame 1ST FRAME just after the transition time TRT at which the driving of the display device 100 (see FIG. 1) is changed from the high speed driving to the low speed driving, the luminance DLM of the data writing cycles DATA WRITING CYCLE is constant. On the other hand, in the first frame 1ST FRAME, a value of a second peak luminance PLM2' of the hold cycle HOLD CYCLE is lower than the value of the second peak luminance PLM2.

Thus, in terms that the peak luminance PLM2' of the first frame 1ST FRAME is lowered, it is effective that the level-shifted sixth power voltage VBIAS' is supplied to the sixth power line PL6 (see FIG. 23 together with FIG. 24).

The level-shifted sixth power voltage VBIAS' means that a voltage level of the level-shifted sixth power voltage VBIAS' is higher than a voltage level of the sixth power voltage VBIAS. The level-shifted sixth power voltage VBIAS' is not limited to a voltage generated by being level-shifted by a level shifter.

However, when the level-shifted sixth power voltage VBIAS' is applied in the first frame 1ST FRAME just after the transition time TRT, an initial luminance ILM2 may be rapidly increased in transition from the data writing cycles DATA WRITING CYCLE to the hold cycle HOLD CYCLE.

Referring to FIG. 23 together with FIG. 24, the reason why the initial luminance ILM2' is rapidly increased is that the first emission control signal EM1 having the turn-on level and the second emission control signal EM2 having the turn-on level are simultaneously input in the tenth period P10.

This will be described in more detail as follows.

After the level-shifted sixth power voltage VBIAS' is input to the second node N2 of the first transistor T1 in the eighth period P8, the first emission control signal EM1 having the turn-on level and the second emission control signal EM2 having the turn-on level may be simultaneously input in the tenth period P10.

At a time at which the data writing cycles DATA WRITING CYCLE enters into the tenth period P10, the voltage of the second node N2 of the first transistor T1 may be lowered to the first power voltage ELVDD, and a voltage corresponding to a difference between the level-shifted sixth power voltage VBIAS' and the first power voltage ELVDD (i.e., VBIAS'-ELVDD) may be stored in a capacitor component Cle of the light emitting element LE.

Due to charges stored in the capacitor component Cle of the light emitting element LE, there may occur a phenomenon in which the magnitude of the driving current flowing through the light emitting element LE is increased in the continued hold cycle HOLD CYCLE, and therefore, the initial luminance ILM2' is slightly rapidly increased. This results in an increase in average luminance in one frame 1 FRAME.

In a certain case, there may occur a phenomenon in which the peak luminance PLM2' is decreased but the average luminance is increased, and therefore, the flicker phenomenon becomes more serious.

FIG. 25 is a diagram illustrating a table describing an effect of the level-shifted sixth power voltage.

Referring to FIG. 25, when the high speed driving is made without shifting the level of the sixth power voltage VBIAS, each of a peak luminance PLM and an average luminance ALM may be set to 100%, which corresponds to a reference value REFERENCE.

When the low speed driving is made without shifting the level of the sixth power voltage VBIAS, the peak luminance PLM may be increased by about 15% to become 115%, and the average luminance ALM may be increased by about 9% to become 109%.

Meanwhile, when the low speed driving is made by shifting the level of the sixth power voltage VBIAS, the peak luminance PLM may be increased by about 10% to become 110%, and the average luminance ALM may be increased by about 12% to become 112%.

Therefore, the shifting of the level of the sixth power voltage VBIAS has a clear effect in terms of improvement of the peak luminance PLM, but may be similar or be slightly degraded in terms of improvement of the average luminance ALM. Accordingly, it is desirable to provide the display device 100 (see FIG. 1) capable of lowering the peak luminance PLM and lowering the average luminance ALM.

Figure 26:
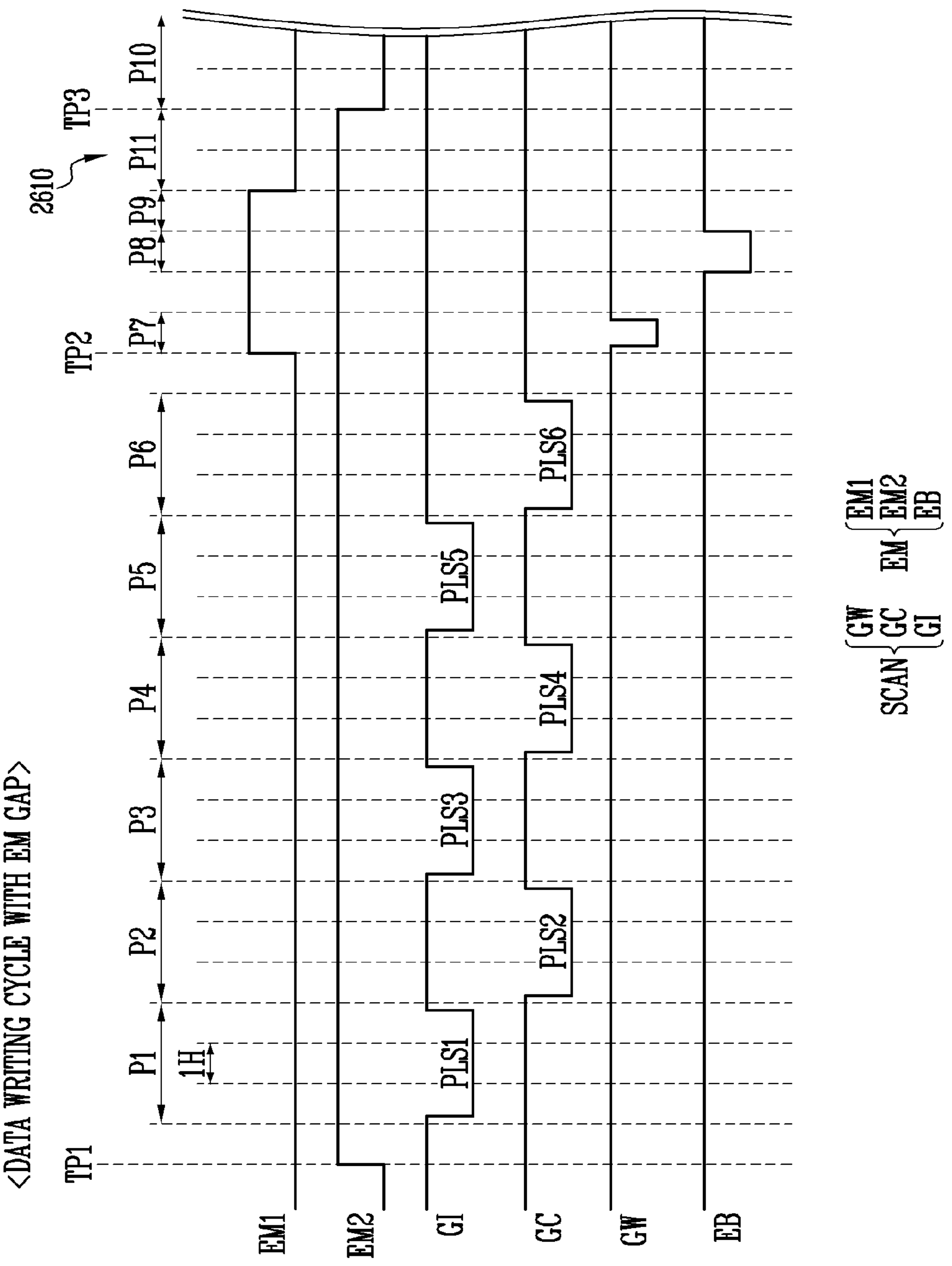
FIG. 26 is another example of the timing diagram of the data writing cycle for driving the pixel shown in FIG. 2.

FIG. 26 is another example of the timing diagram of the data writing cycle DATA WRITING CYCLE for driving the pixel shown in FIG. 2.

In a timing diagram shown in FIG. 26, an eleventh period P11 is further added as compared with the timing diagram shown in FIG. 3. That is, the data writing cycle DATA WRITING CYCLE may further include the eleventh period P11.

The eleventh period P11 may be a period in which the first emission control signal EM1 having the turn-on level and the second emission control signal EM2 having the turn-off level are input.

The eleventh period P11 may be a period in which the third scan signal GI having the turn-off level, the second scan signal GC having the turn-off level, the first scan signal GW having the turn-off level, and the third emission control signal EB having the turn-off level are input.

Referring to FIG. 26, a time at which the first emission control signal EM1 having the turn-on level is input and a time at which the second emission control signal EM2 having the turn-on level is input are temporally separated from each other. Hereinafter, a difference between the two times is designated a "time interval 2610" or "EM gap 2610."

The eleventh period P11 may be located between the ninth period P9 and the tenth period P10, which are described above. In an example, although it is illustrated that a length of the eleventh period P11 corresponds to two horizontal periods (2H), the length of the eleventh period P11 may vary.

The length of the eleventh period P11 may be shorter than a length of periods provided to compensate for the threshold voltage of the first transistor. For example, the length of the eleventh period P11 may be shorter than the length of the first period P1. The length of the eleventh period P11 may be shorter than the length of the second period P2. The length of the eleventh period P11 may be shorter than the length of each of the third to sixth periods P3, . . . , and P6.

The length of the eleventh period P11 may be longer than the length of the data writing period. For example, the length of the eleventh period P11 may be longer than the length of the seventh period P7.

The length of the eleventh period P11 may be longer than a length of a period in which the bias voltage is applied to the first transistor T1 (see FIG. 2). For example, the length of the eleventh period P11 may be longer than the length of the eighth period P8.

The length of the eleventh period P11 may be longer than a length of a period provided to initialize the voltage of the first electrode (or anode electrode) of the light emitting element LE (see FIG. 2). For example, the length of the eleventh period P11 may be longer than the length of the eighth period P8.

The length of the eleventh period P11 may be set differently from the above-described length. The length of the eleventh period 11 is not limited to the above-described embodiments.

Figure 27:
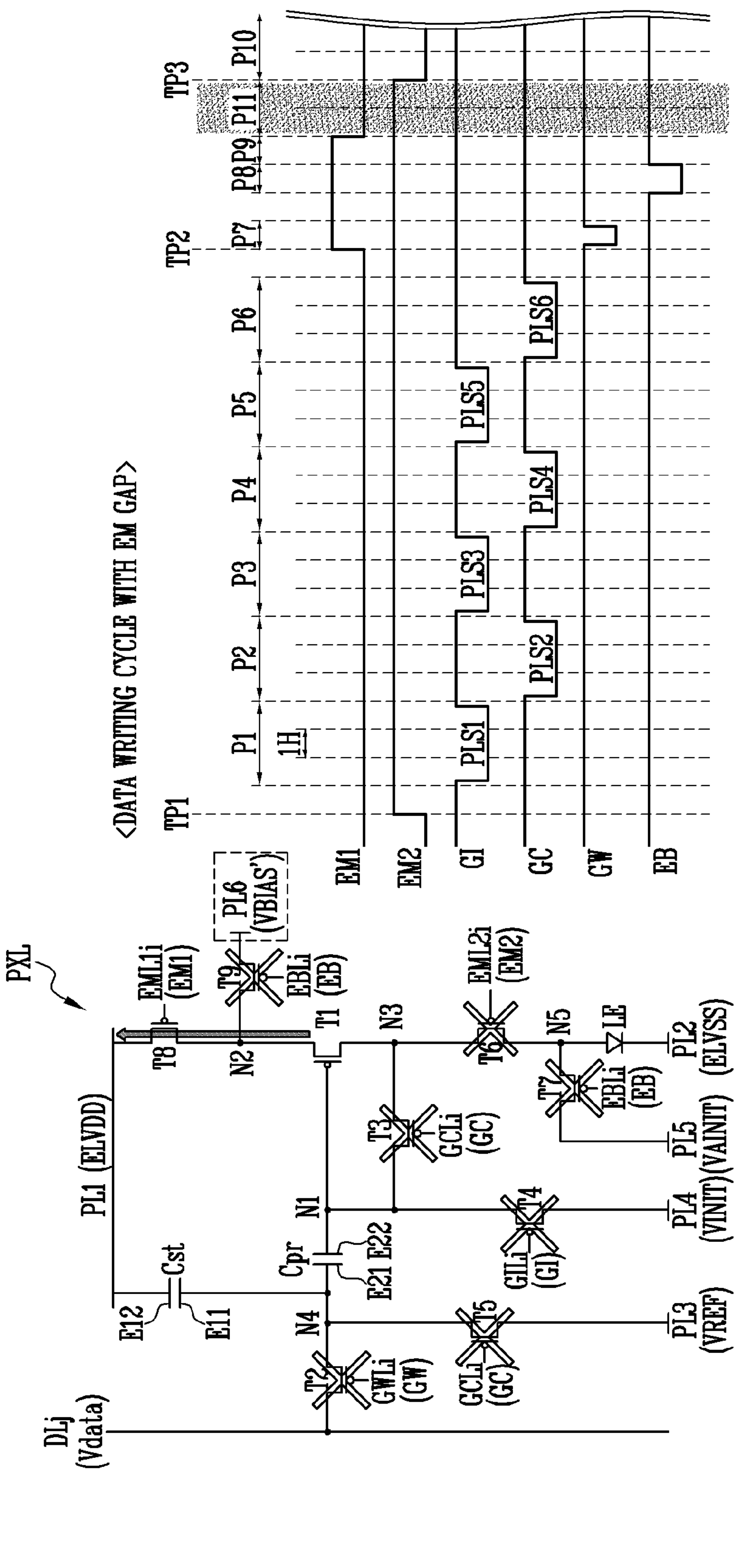
FIG. 27 is a diagram illustrating an eleventh period of the timing diagram shown in FIG. 26 together with the pixel structure shown in FIG. 2.

FIG. 27 is a diagram illustrating the eleventh period P11 of the timing diagram shown in FIG. 26 together with the pixel PXL structure shown in FIG. 2.

In the eleventh period P11, the first emission control signal EM1 having the turn-on level may be input. In the eleventh period P11, the second emission control signal EM2 having the turn-off level, the third scan signal GI having the turn-off level, the second scan signal GC having the turn-off level, the first scan signal GW having the turn-off level, and the third emission control signal EB having the turn-off level may be input to the pixel PXL.

As the first emission control signal EM1 having the turn-on level is input and the second emission control signal EM2 having the turn-off level is input in the eleventh period P11, a current path in a direction toward the first power line PL1 may be formed at the second node N2 of the first transistor T1. In the eleventh period P11, the voltage of the first power line PL1 may be temporarily increased from the first power voltage ELVDD.

In other words, the eleventh period P11 may be a period between a time at which the voltage of the second node N2 of the first transistor T1 is dropped from the sixth power voltage VBIAS (or bias voltage VBIAS) having a voltage level higher than the voltage level of the first power voltage ELVDD and a time at which the second emission control signal EM2 having the turn-on level is input to the pixel PXL.

From the viewpoint of the display device 100 (see FIG. 1), the eleventh period P11 may be a period between a time at which the first emission driving circuit 141 (see FIG. 1) outputs the first emission control signal EM1 having the turn-on level to the first emission control line EML1*i* electrically connected to any one pixel PXL among the plurality of pixels PXL, thereby inputting the first power voltage ELVDD to the one pixel PXL and a time at which the second emission driving circuit 142 (see FIG. 1) outputs the second emission control signal EM2 having the turn-on level to the second emission control line EML2*i* electrically connected to the one pixel PXL.

In the eighth period P8, the level-shifted sixth power voltage VBIAS' is applied to the second node N2. The level-shifted sixth power voltage VBIAS' has a voltage level higher than the voltage level of the first power voltage ELVDD. Therefore, in the eleventh period P11, a current path in a direction toward the first power line PL1 may be formed at the second node N2 of the first transistor T1.

Accordingly, the voltage level of the second node N2 is lowered down to the first power voltage ELVDD from the level shifted sixth power voltage VBIAS'.

Accordingly, the voltage of the second node N2 of the first transistor T1 is the first power voltage ELVDD at a time at which the data writing cycle DATA WRITING CYCLE WITH EM GAP enters into the tenth period P10 after the eleventh period P11, and therefore, charges corresponding to the above-described voltage difference (i.e., VBIAS'−ELVDD) (see FIG. 23) are not charged in the capacitor component of the light emitting element LE.

In summary, a phenomenon in which the luminance of the light emitting element LE suddenly becomes bright as the data writing cycle DATA WRITING CYCLE WITH EM GAP is provided with the eleventh period P11 can be prevented, and accordingly, the average luminance in one frame can be lowered.

Meanwhile, as the voltage of the second node N2 of the first transistor T1 varies in the eleventh period P11, the voltage of the first node N1 of the first transistor T1 may fluctuate due to a capacitor component (may be a parasitic capacitor component) between the first node N1 and the second node N2 of the first transistor T1. However, as the first node N1 of the first transistor T1 is electrically connected to a physical capacitor element (e.g., the second electrode E22 of the second capacitor Cpr (or hold capacitor Cpr)), the voltage fluctuation of the first node N1 may reach a very small level. Thus, although the voltage of the second node N2 of the first transistor T1 fluctuated in the eleventh period P11, a concern that the voltage of the first node N1 of the first transistor T1 fluctuates together with the voltage of the second node N2 of the first transistor T2 can be solved.

Figure 28A:
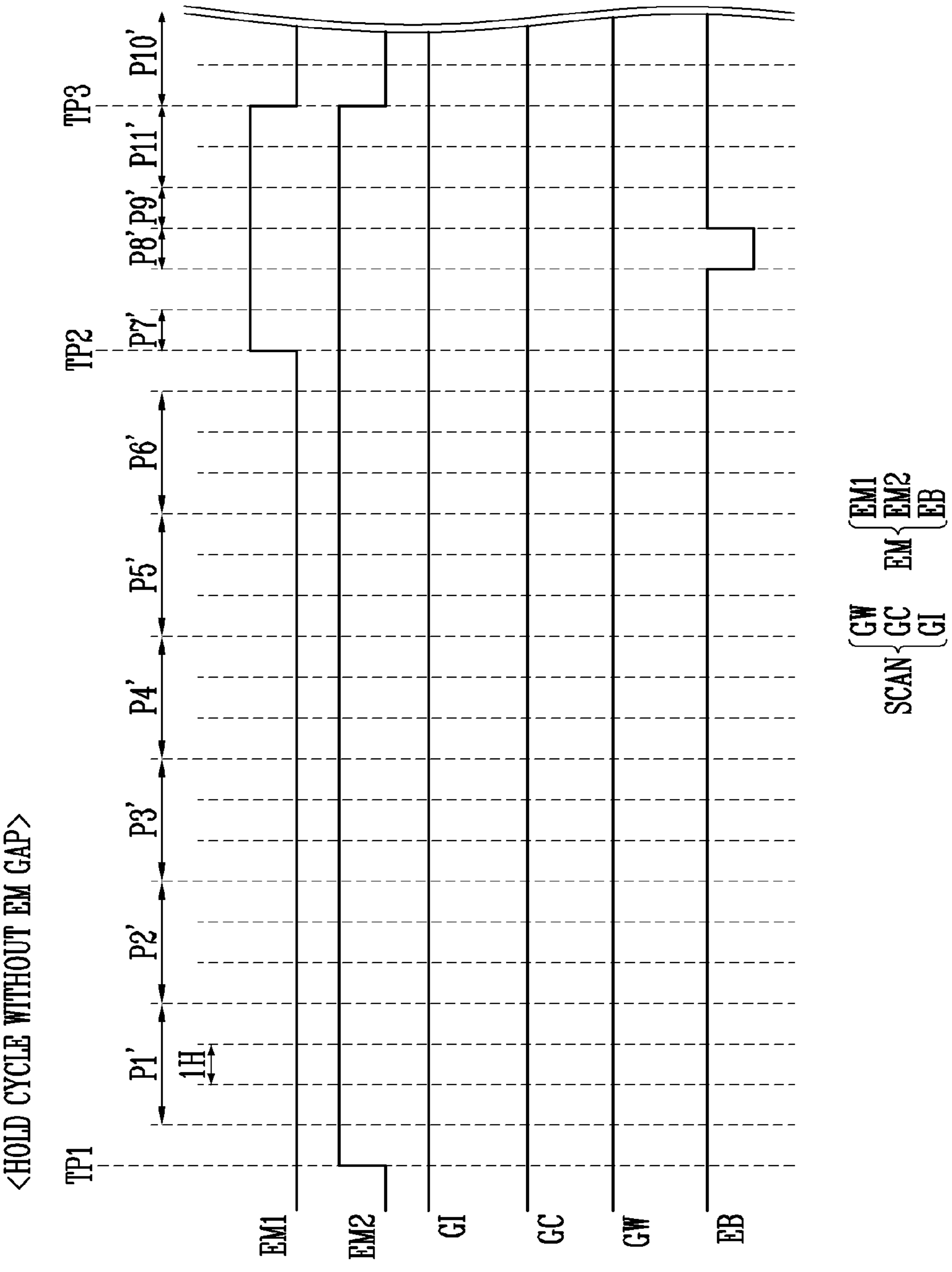
FIG. 28A is another example of the timing diagram of the hold cycle for driving the pixel shown in FIG. 2.

FIG. 28A is another example of the timing diagram of the hold cycle HOLD CYCLE for driving the pixel shown in FIG. 2.

In a timing diagram shown in FIG. 28A, an eleventh period P11' is further added as compared with the timing diagram shown in FIG. 14. That is, the hold cycle HOLD CYCLE WITHOUT EM GAP may further include the eleventh period P11'.

The eleventh period P11' of the hold cycle HOLD CYCLE WITHOUT EM GAP may be a period corresponding to the eleventh period P11 of the data writing cycle DATA WRITING CYCLE WITH EM GAP (see FIG. 26). The eleventh period P11' may be a period existing between the ninth period P9' and the tenth period P10'.

Meanwhile, the eleventh period P11' of the hold cycle HOLD CYCLE WITHOUT EM GAP may be a period in which the first emission control signal EM1 having the turn-off level and the second emission control signal EM2 having the turn-off level are input. The emission control signal EM of the hold cycle HOLD CYCLE may have a waveform different from a waveform of the emission control signals EM1 and EM2 of the data writing cycle DATA WRITING CYCLE WITH EM GAP (see FIG. 26).

A length of the eleventh period P11' in the hold cycle HOLD CYCLE WITHOUT EM GAP may be equal to the length of the eleventh period P11 in the data writing cycle DATA WRITING CYCLE WITH EM GAP (see FIG. 26). Description of the length of the eleventh period P11' in the hold cycle HOLD CYCLE WITHOUT EM GAP may be applied substantially identically to the description of the length of the eleventh period P11 in the data writing cycle DATA WRITING CYCLE WITH EM GAP, and therefore, its description will be omitted.

As the eleventh period P11' is provided in the hold cycle HOLD CYCLE WITHOUT EM GAP, a length of the tenth period P10' as an emission period in the hold cycle HOLD CYCLE WITHOUT EM GAP may be equal to the length of the tenth period P10 in the data writing cycle DATA WRITING CYCLE WITH EM GAP (see FIG. 26).

Figure 28B:
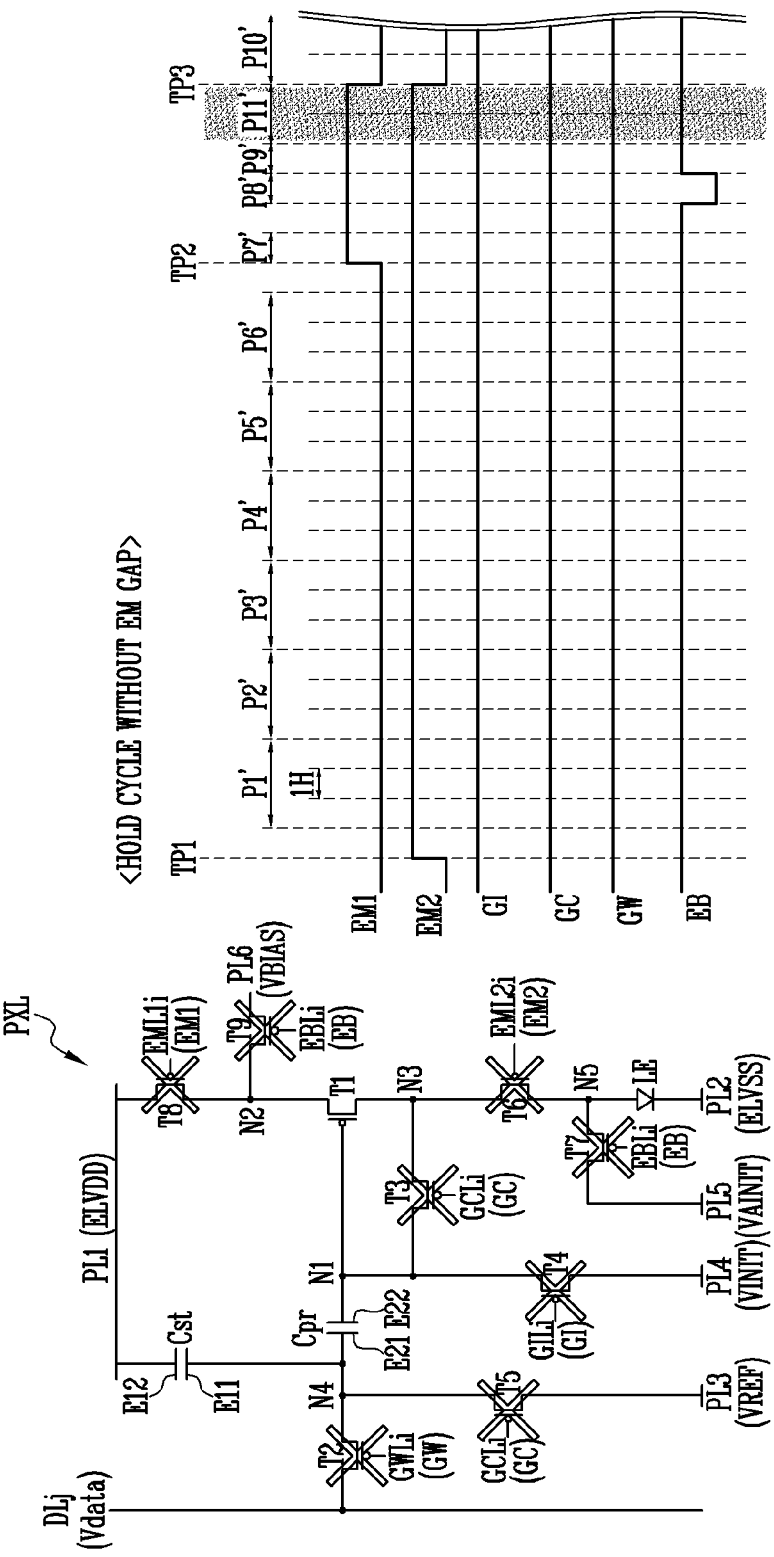
FIG. 28B is a diagram illustrating an eleventh period of the timing diagram shown in FIG. 28A together with the pixel structure shown in FIG. 2.

FIG. 28B is a diagram the eleventh period P11' of the timing diagram shown in FIG. 28A together with the pixel PXL structure shown in FIG. 2.

In the eleventh period P11', the first emission control signal EM1 having the turn-off level, the second emission control signal EM2 having the turn-off level, the third scan signal GI having the turn-off level, the second scan signal GC having the turn-off level, the first scan signal GW having the turn-off level, and the third emission control signal EB having the turn-off level may be input. That is, signals input in the eleventh period P11' may be identical to the signals input in the ninth period P9'.

In the case of a timing diagram shown in FIG. 28B, this may be slightly more suitable for a case where the sixth power voltage VBIAS which is not level-shifted is applied to the sixth power line PL6.

For example, when the display device 100 (see FIG. 1) in accordance with the embodiments of the present disclosure continuously performs low speed driving at a low frame frequency, the concern that the flicker phenomenon will occur is reduced. When the level of the level-shifted sixth power voltage VBIAS' is again lowered to the sixth power voltage VBIAS to be supplied to the sixth power line PL6, it may be advantageous in terms of power consumption.

The voltage supplied to the second node N2 of the first transistor T1 is lowered down to the sixth power voltage VBIAS from the level-shifted sixth power voltage VBIAS, a concern that the luminance of light emitting element LE will be rapidly increased is also reduced.

In these terms, in the eleventh period P11' in which the sixth power voltage VBIAS is supplied to the sixth power line PL6, the first emission control signal EM1 having the turn-off level and the second emission control signal EM2 having the turn-off level may be supplied.

Figure 29A:
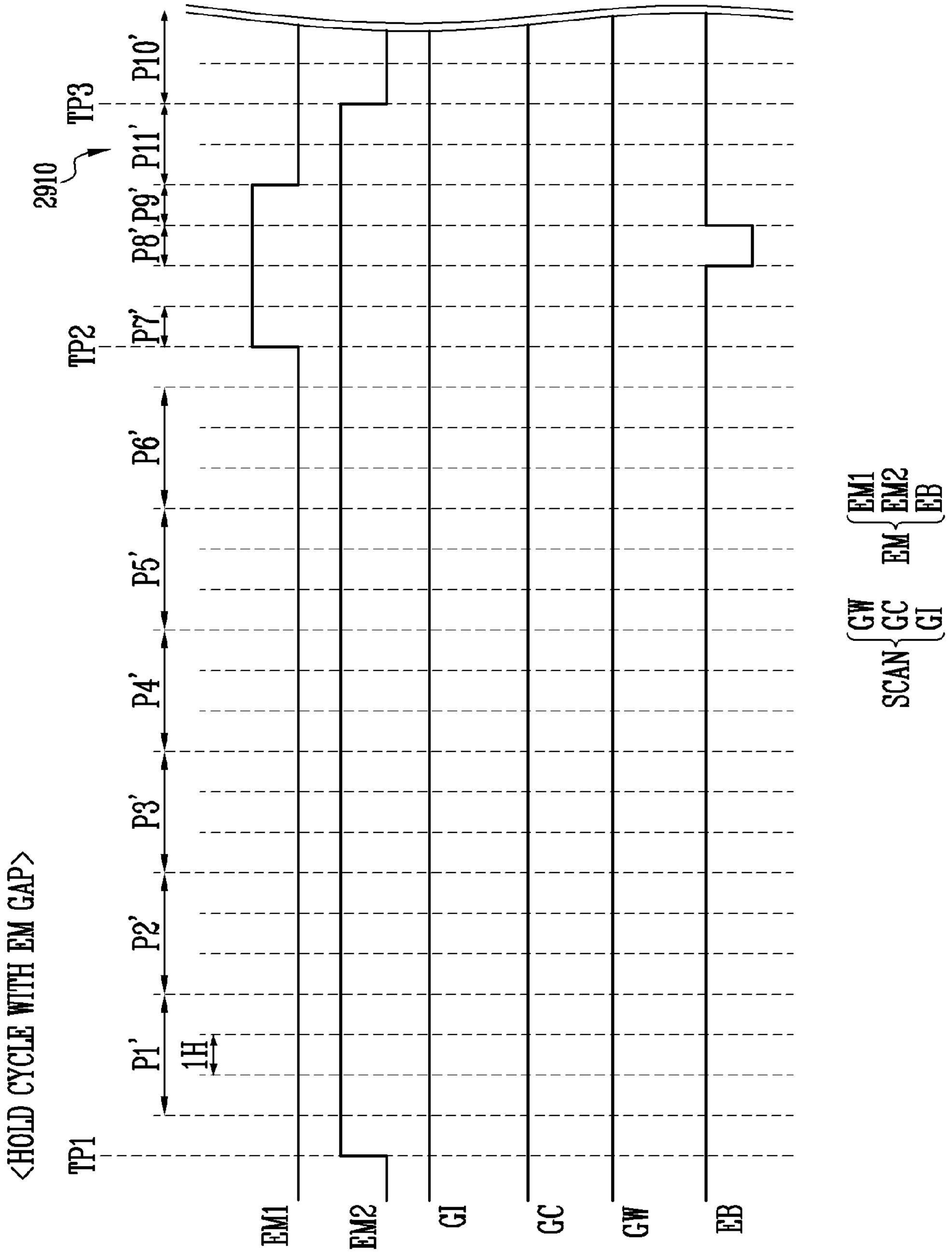
FIG. 29A is still another example of the timing diagram of the hold cycle for driving the pixel shown in FIG. 2.

FIG. 29A is still another example of the timing diagram of the hold cycle HOLD CYCLE WITH EM GAP for driving the pixel shown in FIG. 2.

The hold cycle HOLD CYCLE WITH EM GAP may include an eleventh period P11'. In the eleventh period P11', the first emission control signal EM1 having the turn-on level and the second emission control signal EM2 having the turn-off level may be input.

Referring to FIG. 29A, the eleventh period P11' may be defined as a time interval 2910 (or EM gap 2910) between a time at which the first emission control signal EM1 having the turn-on level is input and a time at which the second emission control signal EM2 having the turn-on level is input.

The time interval 2910 of the hold cycle HOLD CYCLE WITH EM GAP may be substantially equal to the above-described time interval 2610 of the data writing cycle DATA WRITING CYCLE WITH EM GAP (see FIG. 26). In some cases, a length of the time interval 2910 of the hold cycle HOLD CYCLE WITH EM GAP may be set different from a length of the time interval 2610 of the data writing cycle DATA WRITING CYCLE WITH EM GAP. Hereinafter, for convenience of description, a case where the time interval 2910 of the hold cycle HOLD CYCLE WITH EM GAP is equal to the time interval 2610 of the data writing cycle DATA WRITING CYCLE WITH EM GAP is assumed and described. However, the present disclosure is not limited thereto.

A length of the eleventh period P11' may be shorter than the length of the periods provided to compensate for the threshold voltage of the first transistor T1 (see FIG. 2). For example, the length of the eleventh period P11' may be shorter than the length of the first period P1'. The length of the eleventh period P11' may be shorter than the length of the second period P2'. The length of the eleventh period P11' may be shorter than the length of each of the third to sixth period P3', . . . , and P6'.

The length of the eleventh period P11' may be longer than the length of the data writing cycle DATA WRITING CYCLE (or DATA WRITING CYCLE WITH EM GAP). For example, the length of the eleventh period P11' may be longer than the length of the seventh period P7'.

The length of the eleventh period P11' may be longer than the length of the period in which the sixth power voltage VBIAS (see FIG. 2) is applied to the first transistor T1 (see FIG. 2). For example, the length of the eleventh period P11' may be longer than the length of the eighth period P8'.

The length of the eleventh period P11' may be longer than the length of the period provided to initialize the voltage of the first electrode (or anode electrode) of the light emitting element LE (see FIG. 2). For example, the length of the eleventh period P11' may be longer than the length of the eighth period P8'.

The length of the eleventh period P11' may be set differently from the above-described length. The length of the eleventh period P11' is not limited to the above-described embodiments.

Figure 29B:
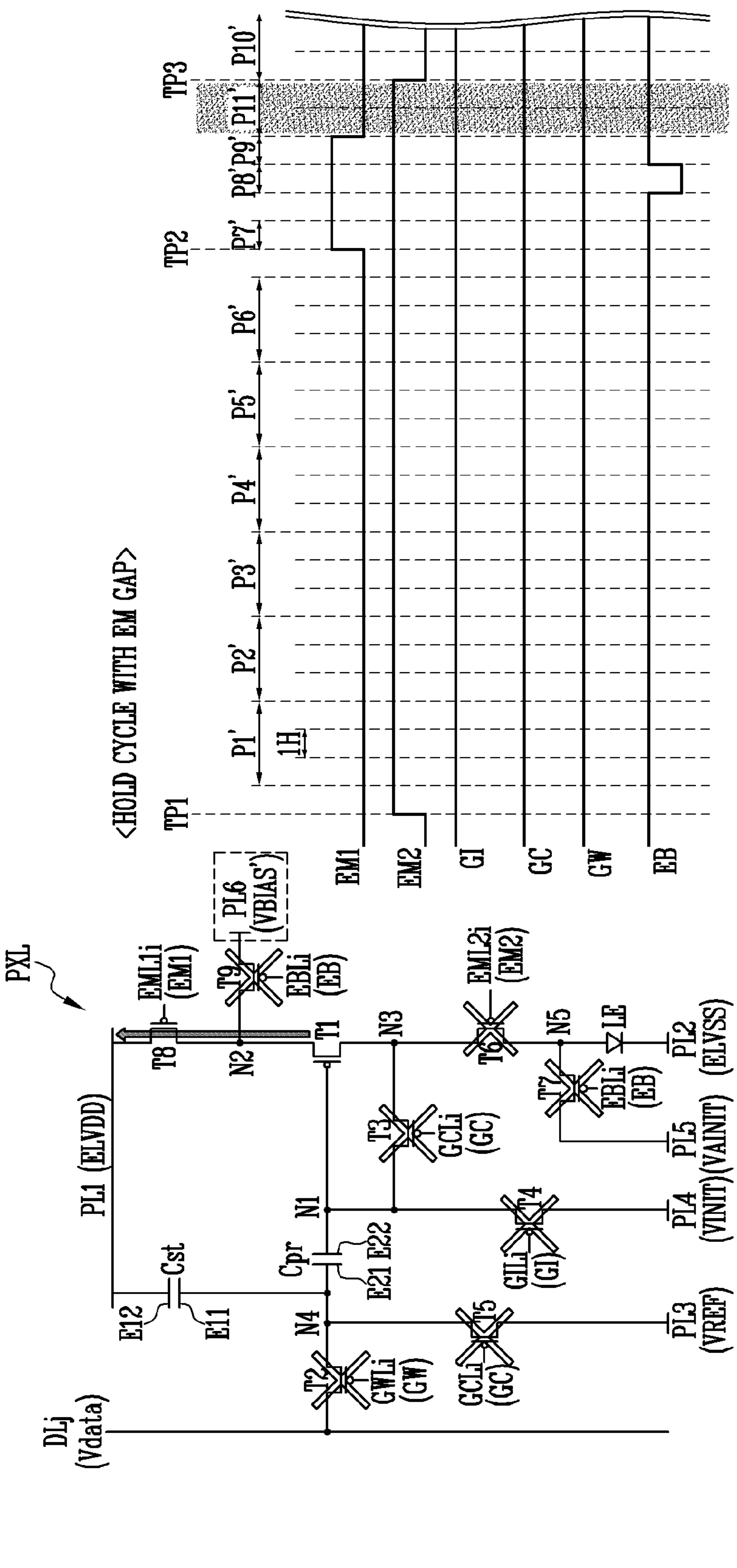
FIG. 29B is a diagram illustrating an eleventh period of the timing diagram shown in FIG. 29A together with the pixel structure shown in FIG. 2.

FIG. 29B is a diagram the eleventh period P11' of the timing diagram shown in FIG. 29A together with the pixel PXL structure shown in FIG. 2.

In the eleventh period P11', the first emission control signal EM1 having the turn-on level may be input. In the eleventh period P11', the second emission control signal EM2 having the turn-off level, the third scan signal GI having the turn-off level, the second scan signal GC having the turn-off level, the first scan signal GW having the turn-off level, and the third emission control signal EB having the turn-off level may be input.

As the first emission control signal EM1 having the turn-on level is input and the second emission control signal EM2 having the turn-off level is input in the eleventh period P11', a current path in a direction toward the first power line PL1 may be formed at the second node N2 of the first transistor T1.

In the eighth period P8', a level-shifted sixth power voltage VBIAS' may be applied to the second node N2. The level-shifted sixth power voltage VBIAS' has a voltage level higher than the voltage level of the first power voltage ELVDD. In the eleventh period P11, a current path in a direction toward the first power line PL1 may be formed at the second node N2 of the first transistor T1.

Accordingly, the voltage level of the second node N2 may be lowered down to the first power voltage ELVDD from the level-shifted sixth power voltage VBIAS'.

Accordingly, the voltage of the second node N2 of the first transistor T1 at a time at which the hold cycle HOLD CYCLE WITH EM GAP enters into the tenth period P10' after the eleventh period P11' is the first power voltage ELVDD. And therefore, charges corresponding to the above-described voltage difference (i.e., VBIAS'-ELVDD) (see FIG. 23) are not charged in the capacitor component of the light emitting element LE.

In summary of FIGS. 28A to 29B, the display device 100 (see FIG. 1) in accordance with the embodiments of the present disclosure may be provided with the eleventh period P11' in which an EM gap exists when the display device 100 is driven in the hold cycle HOLD CYCLE WITH EM GAP. Accordingly, a phenomenon in which the luminance of the light emitting element LE suddenly becomes bright can be prevented, and thus the average luminance in one frame can be lowered.

Also, the display device 100 (see FIG. 1) in accordance with the embodiments of the present disclosure may be provided with the eleventh period P11' in which the EM gap does not exist when the display device 100 is driven in the hold cycle HOLD CYCLE WITHOUT EM GAP. Accordingly, there can be provided a display device in which display quality is improved while reducing power consumption of the display device.

In the display device 100 (see FIG. 1) in accordance with the embodiments of the present disclosure, both a hold cycle HOLD CYCLE WITHOUT EM GAP in which the pixel is operated according to the timing diagram shown in FIG. 28A and a hold cycle HOLD CYCLE WITH EM GAP in which the pixel is operated according to the timing diagram shown in FIG. 29A may exist in one frame.

In some cases, in the display device 100 (see FIG. 1) in accordance with the embodiments of the present disclosure, a hold cycle HOLD CYCLE WITHOUT EM GAP in which the pixel is operated according to the timing diagram shown in FIG. 28A may exist in any one frame, and a hold cycle HOLD CYCLE WITH EM GAP in which the pixel is operated according to the timing diagram shown in FIG. 29A may exist in another frame.

Accordingly, there can be provided a display device 100 (see FIG. 1) in which the flicker phenomenon is reduced while implementing various frame frequencies.

FIG. 30 is a diagram illustrating a table describing an effect of the level-shifted sixth power voltage VBIAS' and an effect when the EM gap exists.

In the table shown in FIG. 30, when each of a peak luminance PLM and an average luminance ALM in an embodiment (hereinafter, referred to as a reference embodiment) in which the sixth power voltage VBIAS is not level-shifted and high speed driving is made at a frame frequency of 240 Hz is defined as 100%, a peak luminance PLM and an average luminance ALM in each embodiment are represented.

In the case of an embodiment in which the low speed driving is made at a frame frequency of 30 Hz, the sixth power voltage VBIAS which is not level-shifted is input, and the EM gap is not provided, a peak luminance PLM may be 115% higher by 15% than the reference value, and an average luminance ALM may be 109% higher by 9% than the reference value.

In the case of an embodiment (hereinafter, referred to a first embodiment) in which the low speed driving is made at the frame frequency of 30 Hz, the level-shifted sixth power voltage VBIAS' is input, and the EM gap is not provided, a peak luminance PLM may be 110% higher by 10% than the reference value, and an average luminance ALM may be 112% higher by 12% than the reference value.

In the case of an embodiment (hereinafter, referred to as a second embodiment) in which the low speed driving is made at the frame frequency of 30 Hz, the level-shifted sixth power voltage VBIAS' is input, and the EM gap is provided, a peak luminance PLM may be a degree to which the peak luminance PLM is equal to or slightly less than the reference value, and an average luminance ALM may be about 98% close to the reference value. Accordingly, in terms of the peak luminance PLM and the average luminance ALM, a deviation of each of the peak luminance PLM and the average luminance ALM with 100% as the reference value is very small, and thus it is effective in terms of improvement of visibility.

Figure 31A:
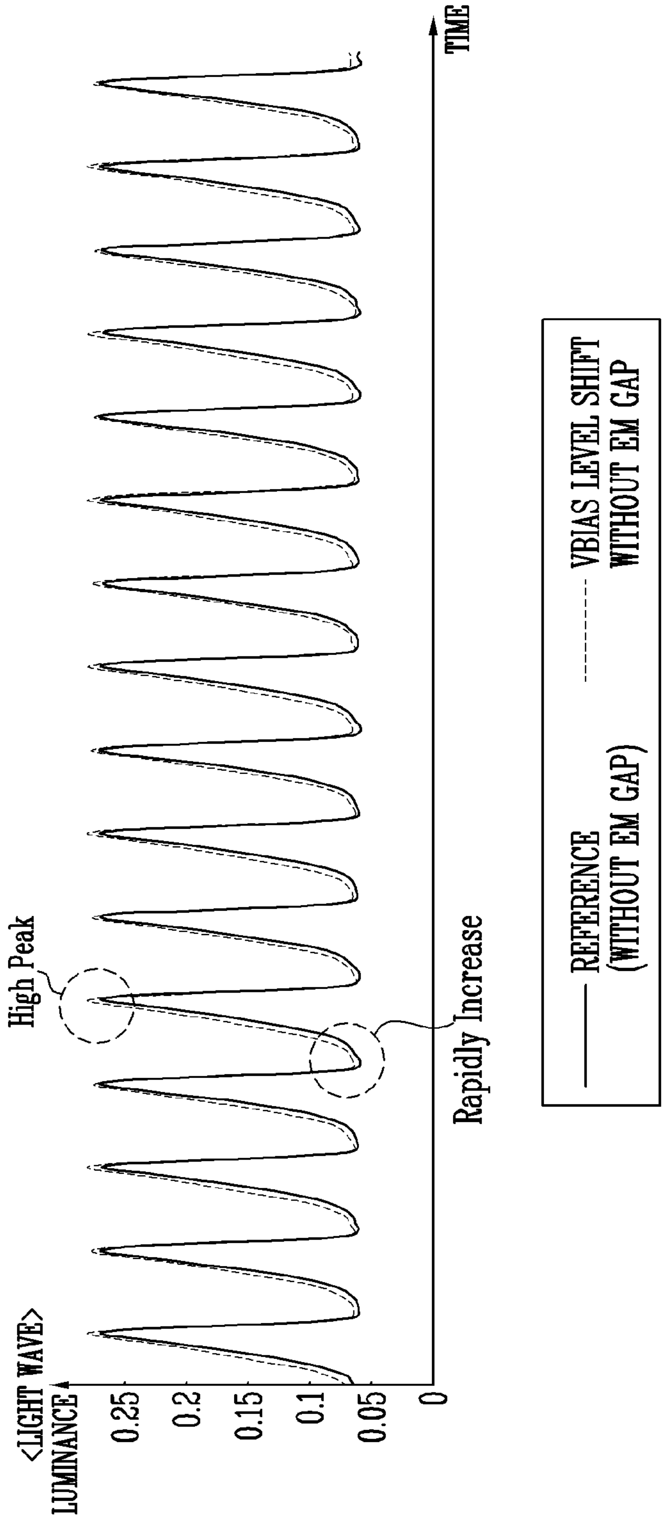
FIG. 31A is a diagram illustrating an effect of the level-shifted sixth power voltage.

FIG. 31A is a diagram illustrating an effect of the level-shifted sixth power voltage.

In FIG. 31A, a luminance graph of the reference embodiment and a luminance graph of the first embodiment are illustrated.

A peak luminance may correspond to an uppermost vertex value of the luminance graph. An average luminance of one frame may be defined as a value obtained by integrating the luminance graph with respect to a time axis and dividing the integrated value by a time length of the one frame.

Referring to this, the peak luminance of the first embodiment is about 10% higher than the peak luminance of the reference embodiment, and the average luminance of the first embodiment is about 12% higher than the average luminance of the reference embodiment.

In particular, the first embodiment includes a section in which the luminance graph slightly rapidly increases as compared with the reference embodiment. This causes an increase in area under the luminance graph, and thus the average luminance can be increased.

Figure 31B:
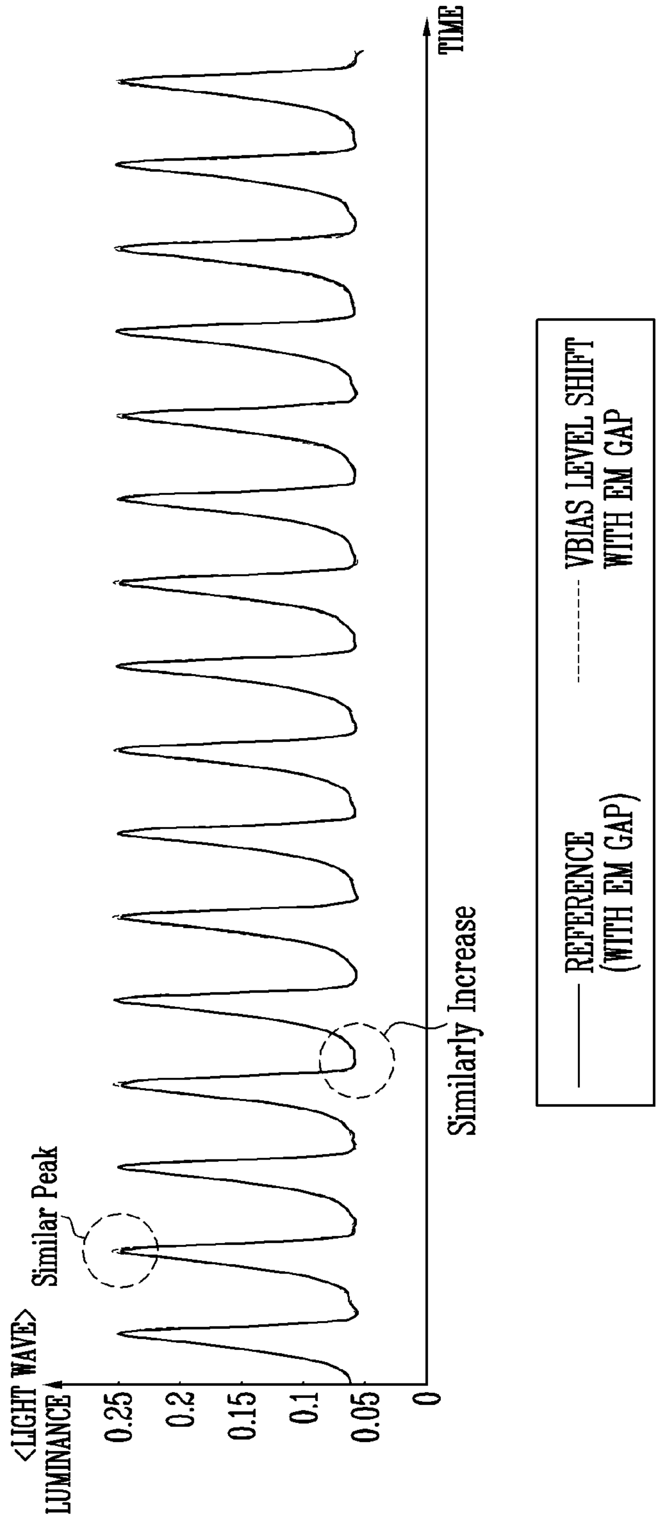
FIG. 31B is a diagram illustrating an effect when the EM gap exists together with the level-shifted sixth power voltage.

FIG. 31B is a diagram illustrating an effect when the EM gap exists together with the level-shifted sixth power voltage.

In FIG. 31B, a luminance graph of the reference embodiment and a luminance graph of the second embodiment are illustrated.

Referring to this, the peak luminance of the second embodiment is almost equal to the peak luminance of the reference embodiment, or is slightly smaller than the peak luminance of the reference embodiment.

The average luminance of the second embodiment has a difference of about 2% from the average luminance of the reference embodiment, which is very small. This means that the flicker phenomenon is reduced. Reasons why the flicker phenomenon is reduced in the display device 100 (see FIG. 1) in accordance with the embodiments of the present disclosure are summarized as follow with reference to the above-described drawings.

The display device 100 in accordance with the embodiments of the present disclosure may display an image at various frame frequencies. In an example, the display device 100 may display an image by using a low speed driving method of displaying an image at a low frame frequency. When the number of hold cycles HOLD CYCLE increases in one frame, the frame frequency becomes low. When the number of hold cycles HOLD CYCLE decreases in one frame, the frame frequency becomes high.

The display device 100 in accordance with the embodiments of the present disclosure may apply the sixth power voltage VBIAS to the second node N2 of the first transistor T1 (or driving transistor) before a period (may correspond to the above-described tenth period P10 or P10') in which the light emitting element LE of the pixel PXL emit light. The threshold voltage (Vth) of the first transistor T1 may be recovered in a period (may correspond to the above-described eighth period P8 or P8') in which the sixth power voltage VBIAS is applied to the second node N2 of the first transistor T1. However, when the number of hold cycles HOLD CYCLE increases in one frame, there occurs a phenomenon in which the threshold voltage (Vth) of the first transistor T1 is not sufficiently recovered. When the threshold voltage (Vth) of the first transistor T1 is not sufficiently recovered, the driving current flowing through the light emitting element LE varies, and therefore, a flicker phenomenon may be viewed by a user of the display device.

The display device 100 in accordance with the embodiments of the present disclosure may apply the level-shifted sixth power voltage VBIAS' to the second node N2 of the first transistor T1 in at least a portion of a period in which an image is displayed by using the low speed driving method. The level-shifted sixth power voltage VBIAS' has a voltage level higher than the voltage level of the above-described sixth power voltage VBIAS. The threshold voltage of the first transistor T1 can be sufficiently recovered by the level-shifted sixth power voltage VBIAS'. In the display device 100 in accordance with the embodiments of the present disclosure, the flicker phenomenon can be reduced.

The display device 100 in accordance with the embodiments of the present disclosure may electrically connect between the second node N2 of the first transistor T1 and the first power line PL1 before the period (may correspond to the above-described tenth period P10 or P10') in which the light emitting element LE of the pixel PXL emit light. The display device 100 may electrically connect between the second node N2 of the first transistor T1 and the first power line PL1, and sequentially, electrically connect between the third node N3 of the first transistor T1 and the light emitting element LE. The first power voltage ELVDD is applied to the first power line PL1. According to the above-described pixel structure, the display device 100 in accordance with the embodiments of the present disclosure may apply the first emission control signal EM1 having the turn-on level to the eighth transistor T8, and sequentially, apply the second emission control signal EM2 having the turn-on level to the sixth transistor T6. After the voltage of the second node N2 is lowered from the level-shifted sixth power voltage VBIAS' to the first power voltage ELVDD, the third node N3 of the first transistor T1 and the light emitting element LE may be electrically connected to each other. The display device 100 in accordance with the embodiments of the present disclosure can sufficiently recover the threshold voltage of the first transistor T1, and control an excessively high driving current not to flow through the light emitting element LE. Accordingly, the display device 100 in accordance with the embodiments of the present disclosure can reduce a flicker phenomenon which may occur in a period in which an image is disposed at a low speed.

As described above, there can be provided a display device 100 in which a flicker phenomenon can be reduced.

Figure 32:
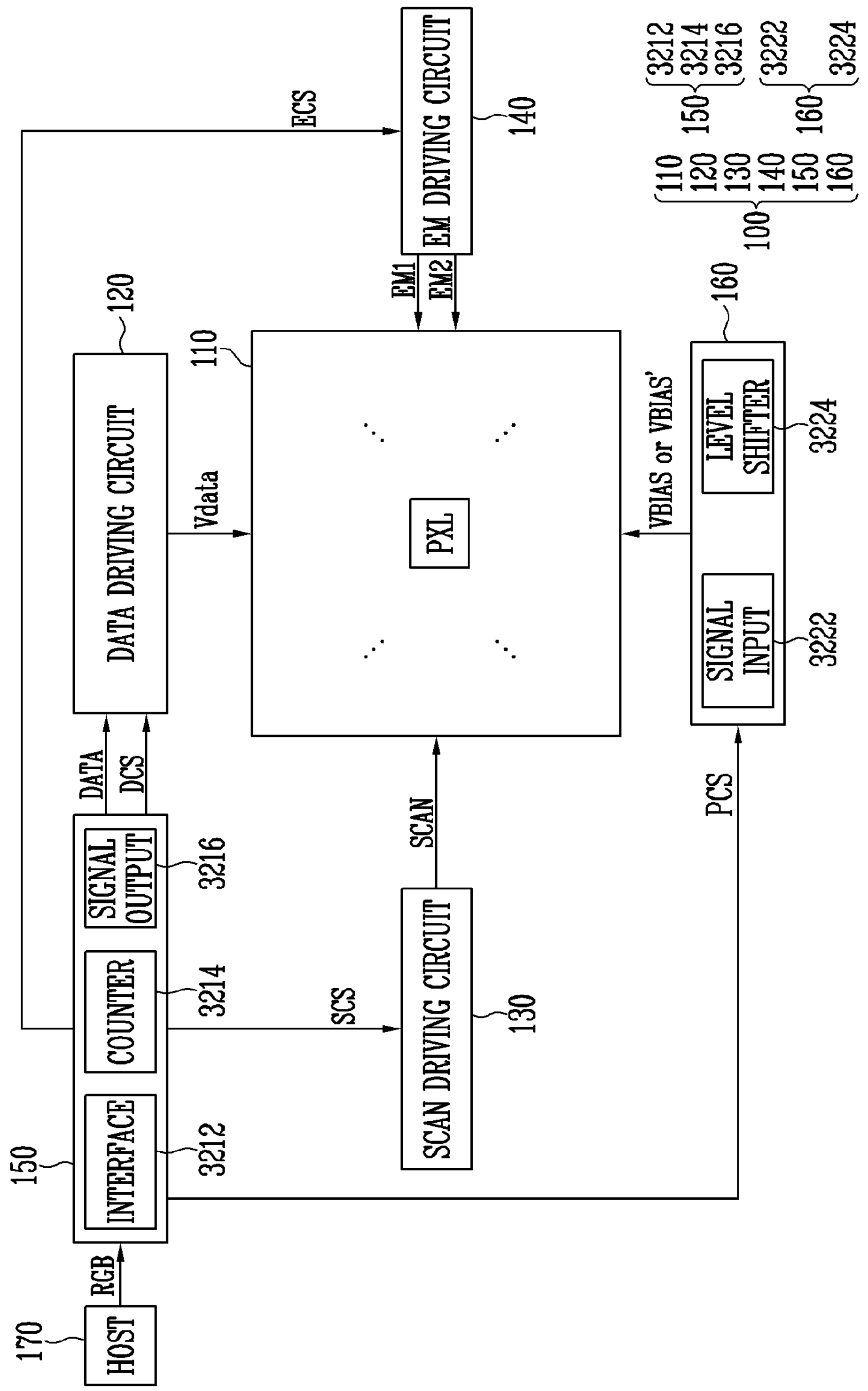
FIG. 32 is a system block diagram exemplarily illustrating a method in which the display device changes a level of the sixth power voltage in accordance with embodiments of the present disclosure.

FIG. 32 is a system block diagram exemplarily illustrating a method in which the display device 100 changes a level of the sixth power voltage VBIAS in accordance with embodiments of the present disclosure.

Referring to FIG. 32, the display device 100 in accordance with the embodiments of the present disclosure may calculate a frame frequency, based on a time interval at which valid input image data RGB is input from the external host system 170, and change the level of the sixth power voltage VBIAS, based on the calculated frame frequency.

In addition, the display device 100 in accordance with the embodiments of the present disclosure may directly receive a current frame frequency input from the external host system 170, and change the level of the sixth power voltage VBIAS, based on a frame frequency input from the host system 170.

Hereinafter, for convenience of description, a case where the display device 100 changes the voltage level of the sixth power voltage VBIAS, based on an input period of the input image data RGB input from the external host system 170, is assumed and described. However, the present disclosure is not limited thereto.

Meanwhile, in the display device 100 in accordance with the embodiments of the present disclosure, the above-described "EM gap" may exist in a frame in which the level of the sixth power voltage VBIAS is changed. The first emission control signal EM1 having the turn-on level and the second emission control signal EM2 having the turn-on level may be input to the display panel 110 at different timings.

Alternatively, in the display device 100 in accordance with the embodiments of the present disclosure, the first emission control signal EM1 having the turn-on level and the second emission control signal EM2 having the turn-on level may be input to the display panel 110 at different timings, regardless of whether the level of the sixth power voltage VBIAS has been changed.

Hereinafter, for convenience of description, a case where the EM gap exists in only a frame in which the level-shifted sixth power voltage VBIAS' is input to the display panel 110. However, the present disclosure is not limited thereto.

Referring to FIG. 32, the timing controller 150 may include an interface 3212, a counter 324, and a signal output 3216.

The interface 3212 may be configured to receive input image data RGB input from the external host system 170. The interface 3212 may be implemented as, for example, a display port including a main link, an auxiliary channel, and a Hot Plug Detect ("HPD") line. When the interface 3212 is implemented as the display port, the input image data RGB may be transmitted in a direction from the host system 170 to the timing controller 150 through the main link of a simplex channel. When the input image data RGB is input to the interface 3212, an image of a next frame may be displayed on the display panel 110 by using the corresponding input image data RGB.

The counter 3214 may be configured to calculate a cycle in which the input image data RGB is input through the interface 3212. The counter 3214 may calculate a cycle in which the input image data RGB is input to the timing controller 150, for example, by using an external clock input through the interface 3212 or the like or by using an internal clock generated inside the timing controller 150. The counter 3214 may include, for example, at least two flip flops, and calculate the cycle by using a method of detecting a rising edge or a falling edge of the clock.

Meanwhile, a reciprocal number of the cycle in which the input image data RGB is input to the timing controller 150 corresponds to a frame frequency of a corresponding frame, and therefore, the frame frequency of the corresponding frame may be calculated by the counter 3214.

The signal output 3216 may output various control signals, based on the frame frequency calculated by the counter 3214. For example, when the frame frequency calculated by the counter 3214 becomes low, the signal output 3216 may determine that low speed driving is started. For example, when the frame frequency calculated by the counter 3214 becomes high, the signal output 3216 may determine that high speed driving is started.

When it is determined that the low speed driving is started, the signal output 3216 may output an emission driving circuit control signal ECS for outputting the first emission control signal EM1 having the turn-on level and the second emission control signal EM2 having the turn-on level to the display panel 110 at different timings.

When it is determined that the low speed driving is started, the signal output 3216 may output a power supply circuit control signal PCS for outputting the level-shifted sixth power voltage VBIAS' to the display panel 110.

Meanwhile, when the frame is changed, the scan driving circuit 130 outputs the scan signal SCAN having the turn-on level in a direction toward the display panel 110. Hence, the frame frequency may be identified by identifying a frequency at which the scan signal SCAN having the turn-on level is output. Therefore, when the frequency at which the scan signal SCAN having the turn-on level is output in the scan driving circuit 130, the level-shifted sixth power voltage VBIAS' may be output from the power supply circuit 160.

The power supply circuit 160 may include a signal input 3222 and a level shifter 3224.

The signal input 3222 may be configured to receive the power supply circuit control signal PCS output from the timing controller 150.

The level shifter 3224 may output the sixth power voltage VBIAS having a set voltage level, based on the power supply circuit control signal PCS input to the signal input 3222.

For example, the power supply circuit 160 may receive a static voltage having a high voltage level from the outside, and the level shifter 3224 may lower the voltage level of the static voltage, based on the power supply circuit control signal PCS, to output the sixth power voltage VBIAS.

The sixth power voltage VBIAS having different voltage levels may be output from the power supply circuit 160 according to a degree to which the level of the static voltage is shifted in the level shifter 3224.

In some cases, the static voltage input to the power supply circuit 160 may be output as it is, thereby outputting the static voltage as the sixth power voltage (i.e., VBIAS') having a high voltage level.

As described above, in a frame in which the first emission control signal EM1 having the turn-on level and the second emission control signal EM2 having the turn-on level are input to the display panel 110 at different timings under the control of the timing controller 150, the sixth power voltage VBIAS' which is level-shifted to a higher voltage level can be input in a direction toward the display panel 110.

Accordingly, the display device 100 in accordance with the embodiments of the present disclosure can perform both high speed driving and low speed driving, and a flicker phenomenon in the low speed driving can be remarkably reduced.

In accordance with the present disclosure, there can be provided a pixel PXL, a display device 100, and a driving method of the display device 100, which can display an image at various frame frequencies.

In accordance with the present disclosure, there can be provided a pixel PXL, a display device 100, and a driving method of the display device 100, which can reduce a flicker phenomenon when an image is displayed at various frame frequencies.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A pixel comprising:

a light emitting element;

a first transistor including a gate electrode electrically connected to a first node, a second node to which a first power voltage for driving the light emitting element is applied, and a third node electrically connected to the light emitting element;

a second transistor having an on-off timing controlled by a first scan signal, the second transistor being electrically connected to a data line to which a data voltage is applied, the second transistor being configured to transfer a voltage corresponding to the data voltage to the first node in response to the first scan signal having a turn-on level;

a first emission control transistor having an on-off timing controlled by a first emission control signal, the first emission control transistor being configured to switch an electrical connection between the second node and a first power line configured to supply the first power voltage; and a second emission control transistor having an on-off timing controlled by a second emission control signal, the second emission control transistor being configured to switch an electrical connection between the third node and the light emitting element, wherein a time interval exists between a time at which the first emission control signal having a turn-on level is input such that a voltage of the second node is dropped from a bias voltage having a voltage level higher than a voltage level of the first power voltage and a time at which the second emission control signal having a turn-on level is input.

2. The pixel of claim 1, further comprising a third emission control transistor having an on-off timing controlled by a third emission control signal, the third emission control transistor being configured to apply the bias voltage to the second node.

3. The pixel of claim 1, wherein, in a period in which the first emission control signal having the turn-on level and the second emission control signal having the turn-on level are sequentially input, a current path is formed in a direction from the second node to the first power line.

4. The pixel of claim 1, further comprising a third transistor having an on-off timing controlled by a second scan signal, the third transistor being configured to switch an electrical connection between the first node and the third node, wherein the time interval is shorter than a length of a period in which the second scan signal having a turn-on level is applied.

5. The pixel of claim 1, further comprising a fourth transistor having an on-off timing controlled by a third scan signal, the fourth transistor being configured to switch an electrical connection between a fourth power line to which a first initialization voltage is applied and the first node, wherein the time interval is shorter than a length of a period in which the third scan signal having a turn-on level is applied.

6. The pixel of claim 1, further comprising a fifth transistor having an on-off timing controlled by a second scan signal, the fifth transistor being electrically connected to the second transistor at a fourth node, the fifth transistor being configured to switch an electrical connection between a third power line to which a reference voltage is applied and the fourth node, wherein the time interval is shorter than a length of a period in which a second scan signal having a turn-on level is applied.

7. The pixel of claim 1, wherein the light emitting element includes a first electrode electrically connected to the second emission control transistor and a second electrode electrically connected to a second power line to which a second power voltage is applied, wherein the pixel further comprises an anode reset transistor having an on-off timing controlled by a third emission control signal, and the anode reset transistor is configured to switch an electrical connection between a fifth power line to which a second initialization power voltage is supplied and the first electrode of the light emitting element, and wherein, after the third emission control signal having a turn-on level is input to the anode reset transistor, the first emission control signal having the turn-on level and the second emission control signal having the turn-on level are sequentially input.

8. A display device comprising:

a display panel in which a plurality of pixels, each including a light emitting element and a first transistor configured to drive the light emitting element, are disposed, a power line configured to supply a power voltage applied to the first transistor is disposed, a plurality of data lines electrically connected to the plurality of pixels are disposed, and a plurality of scan lines electrically connected to the plurality of pixels are disposed;

a data driving circuit configured to supply a data voltage to the plurality of data lines;

a scan driving circuit configured to output, to the plurality of scan lines, a scan signal for controlling a timing at which the data voltage is input to the plurality of pixels;

a first emission driving circuit configured to output a first emission control signal for switching an electrical connection between the power line and the first transistor to a first emission control line disposed in the display panel; and a second emission driving circuit configured to output a second emission control signal for switching an electrical connection between the first transistor and the light emitting element to a second emission control line disposed in the display panel, wherein a time interval exists between a time at which the first emission driving circuit outputs the first emission control signal having a turn-on level to the first emission control line electrically connected to any one pixel among the plurality of pixels, thereby inputting the power voltage to the one pixel and a time at which the second emission driving circuit outputs the second emission control signal having a turn-on level to the second emission control line electrically connected to the one pixel.

9. The display device of claim 8, wherein each of the first emission driving circuit and the second emission driving circuit sequentially outputs the first emission control signal having the turn-on level and the second emission control signal having the turn-on level.

10. The display device of claim 8, wherein the first transistor includes a gate electrode electrically connected to a first node, a second node to which the power voltage is applied, and a third node electrically connected to the light emitting element, wherein the display device further comprises a third emission driving circuit configured to output a third emission control signal to a third emission control line disposed in the display panel, and wherein the third emission control signal is a signal for switching an electrical connection between the second node and a power line to which a bias voltage is supplied.

11. The display device of claim 10, wherein, after the third emission driving circuit outputs the third emission control signal having a turn-on level to the third emission control line electrically connected to any one pixel among the plurality of pixels, the first emission driving circuit outputs the first emission control signal having a turn-on level to the first emission control line electrically connected to the one pixel, and sequentially, the second emission driving circuit outputs the second emission control signal having a turn-on level to the second emission control line electrically connected to the one pixel.

12. The display device of claim 10, wherein the time interval is longer than a length of a period in which the third emission driving circuit outputs the third emission control signal having a turn-on level to the third emission control line.

13. The display device of claim 10, further comprising a power supply circuit configured to change a voltage level of the bias voltage into at least two voltage levels and output the changed voltage.

14. The display device of claim 13, further comprising a timing controller configured to control operation timings of the scan driving circuit and the power supply circuit.

15. The display device of claim 14, wherein the timing controller includes:

an interface configured to receive input image data;

a counter configured to calculate an input cycle of the input image data; and a signal output configured to output a power supply circuit control signal for controlling a timing at which the power supply circuit changes the level of the bias voltage, based on the input cycle calculated by the counter.

16. The display device of claim 13, wherein one frame includes one data writing cycle and at least two hold cycles after the one data writing cycle, and wherein, when a total number of the at least two hold cycles is equal to or greater than a predetermined number, the power supply circuit sequentially increases the voltage level of the bias voltage and outputs the bias voltage having the increased voltage level during the one frame.

17. The display device of claim 8, wherein, in a period in which the first emission driving circuit and the second emission driving circuit outputs the first emission control signal having a turn-on level and the second emission control signal having a turn-on level, respectively and sequentially, a voltage of the power line for supplying the power voltage increases.

18. A method of driving a display device, the method comprising:

outputting, by a data driving circuit, a data voltage for displaying an image to a plurality of data lines extending in a first direction in a display panel, and outputting, by a first scan driving circuit, a first scan signal having a turn-on level to a scan line extending in a second direction different from the first direction in the display panel, thereby writing a voltage corresponding to the data voltage to a first node of a first transistor of a pixel;

outputting, by a first emission driving circuit, a first emission control signal having a turn-on level to a first emission control line extending in the second direction in the display panel, thereby electrically connecting a second node of the first transistor and a power line; and outputting, by a second emission driving circuit, a second emission control signal having a turn-on level to a second emission control line extending in the second direction in the display panel, thereby electrically connecting the first transistor and a light emitting element of the pixel to the power line.

19. The method of claim 18, wherein the pixel includes the light emitting element, the first transistor, a first emission control transistor to switch an electrical connection between the first transistor and the power line, and a second emission control transistor to switch an electrical connection between the first transistor and the light emitting element.

20. The method of claim 19, wherein the first transistor includes a gate electrode electrically connected to the first node, the second node to which a power voltage for driving the light emitting element is applied, and a third node electrically connected to the light emitting element, and wherein the method further comprises:

a threshold voltage compensation phase of outputting, by a second scan driving circuit, a second scan signal having a turn-on level, thereby electrically connecting the first node and the third node of the first transistor; and a first-node initialization phase of outputting, by a third scan driving circuit, a third scan signal having a turn-on level, thereby applying an initialization voltage to the first node.

* * * * *